United States Patent [19]
Ohta et al.

[11] Patent Number: 5,754,266
[45] Date of Patent: May 19, 1998

[54] LIQUID CRYSTAL DISPLAY DEVICE WITH WIDE VIEWING ANGLE CHARACTERISTICS

[75] Inventors: Masuyuki Ohta; Kazuhiko Yanagawa; Keiichiro Ashizawa; Yasuyuki Mishima; Kazuhiro Ogawa; Masahito Ohe; Masahiro Yanai, all of Mobara; Katsumi Kondo, Hitachinaka, all of Japan

[73] Assignee: Hitachi, Ltd., Tokyo, Japan

[21] Appl. No.: 610,340

[22] Filed: Mar. 4, 1996

[30] Foreign Application Priority Data

| Mar. 17, 1995 | [JP] | Japan | 7-058874 |
| Apr. 28, 1995 | [JP] | Japan | 7-105862 |
| Jul. 27, 1995 | [JP] | Japan | 7-191341 |

[51] Int. Cl.$^6$ .................. G02F 1/1333; G02F 1/1343
[52] U.S. Cl. .................. 349/139; 349/110; 349/143
[58] Field of Search ................ 349/42, 139, 143, 349/110

[56] References Cited

U.S. PATENT DOCUMENTS

| 5,412,494 | 5/1995 | Ishiwata et al. | 349/110 |
| 5,568,291 | 10/1996 | Murata et al. | 349/110 |
| 5,598,285 | 1/1997 | Kondo et al. | 349/42 |
| 5,600,464 | 2/1997 | Ohe et al. | 349/138 |

FOREIGN PATENT DOCUMENTS

| 6-202127 | 7/1994 | Japan | 349/143 |
| 6-214244 | 8/1994 | Japan | 349/143 |

*Primary Examiner*—William L. Sikes
*Assistant Examiner*—Toan Ton
*Attorney, Agent, or Firm*—Antonelli, Terry, Stout & Kraus, LLP

[57] ABSTRACT

A liquid crystal display device has a pair of substrates at least one of which is transparent, a liquid crystal layer sandwiched by the pair of substrates, a video signal line, a drain electrode, a pixel electrode which receives a video signal from the video signal line through the drain electrode and a thin-film transistor, a gate electrode for turning the thin-film transistor on, a counter electrode to which a counter voltage is applied through a counter voltage signal line, and a storage capacitor formed by superposing part of said pixel electrode on part of said counter voltage signal line via an interlayer insulating film. In the liquid display device are formed pixels where the light transmission factor of the liquid crystal is changed by use of an electric field which is established between the pixel electrode and the counter electrode and has the component in parallel with the surface of the substrate, the dielectric constant anisotropy $\Delta\epsilon$, the effective thickness $d_{eff}$ of the liquid crystal layer, the width $W_p$ of the pixel electrode in the short-side direction, the width $W_c$ of the counter electrode in the short-side direction, and the gap L between the pixel electrode and the counter electrode satisfy the following relationships, $\Delta\epsilon>0$, 2.8 $\mu m \leq d_{eff} \leq 4.5$ $\mu m$, and $1.2 \times d_{eff} \leq W_p \leq L/1.2$, $1.2 \times d_{eff} \leq W_c \leq L/1.2$, or $\Delta\epsilon<0$, 4.2 $\mu m \leq d_{eff} \leq 8.0$ $\mu m$, and $1.2 \times d_{eff} \leq W_p \leq L/1.2$, $1.2 \times d_{eff} \leq W_c \leq L/1.2$.

When the scanning signal lines connected to the gate electrodes and the counter voltage signal lines connected to the counter electrodes are arranged in parallel in the direction of row of a plurality of pixels arranged in the form of a matrix and when the video signal lines connected to the drain electrodes are arranged in parallel in the direction of column, the counter voltage signal line is used in common by the two pixels adjacent to each other in the direction of column. Alternatively, both ends of the counter voltage signal lines are connected to the common bus line and are further connected to the counter electrode driver means.

8 Claims, 39 Drawing Sheets

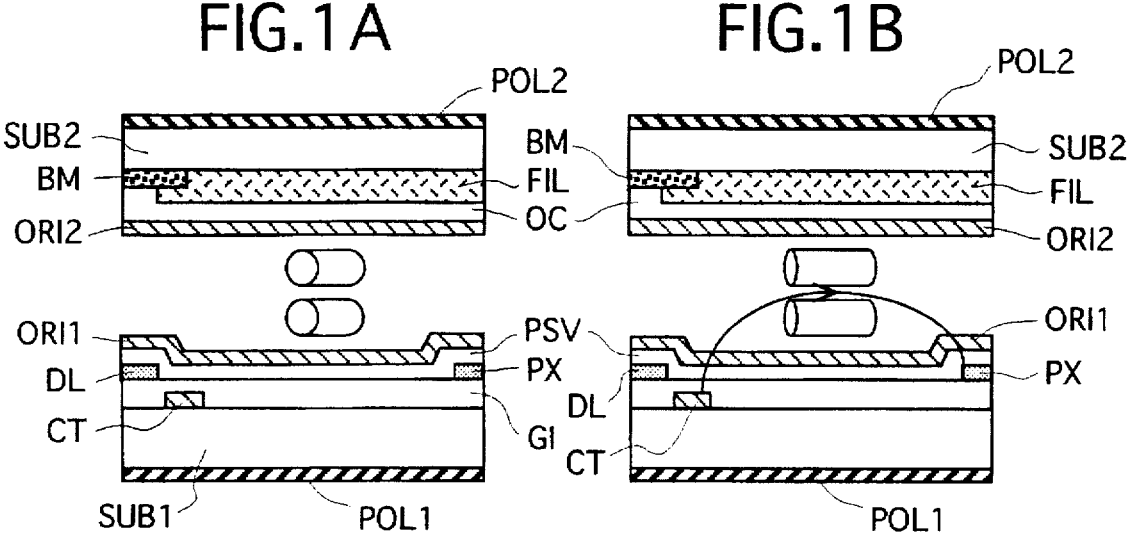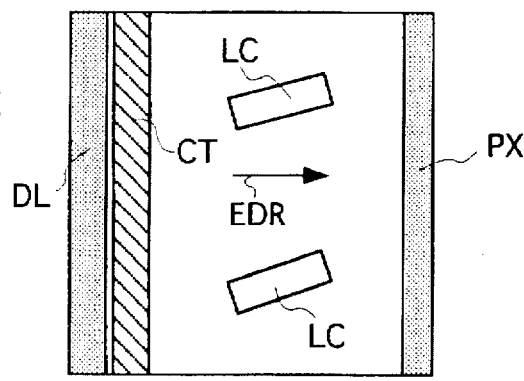

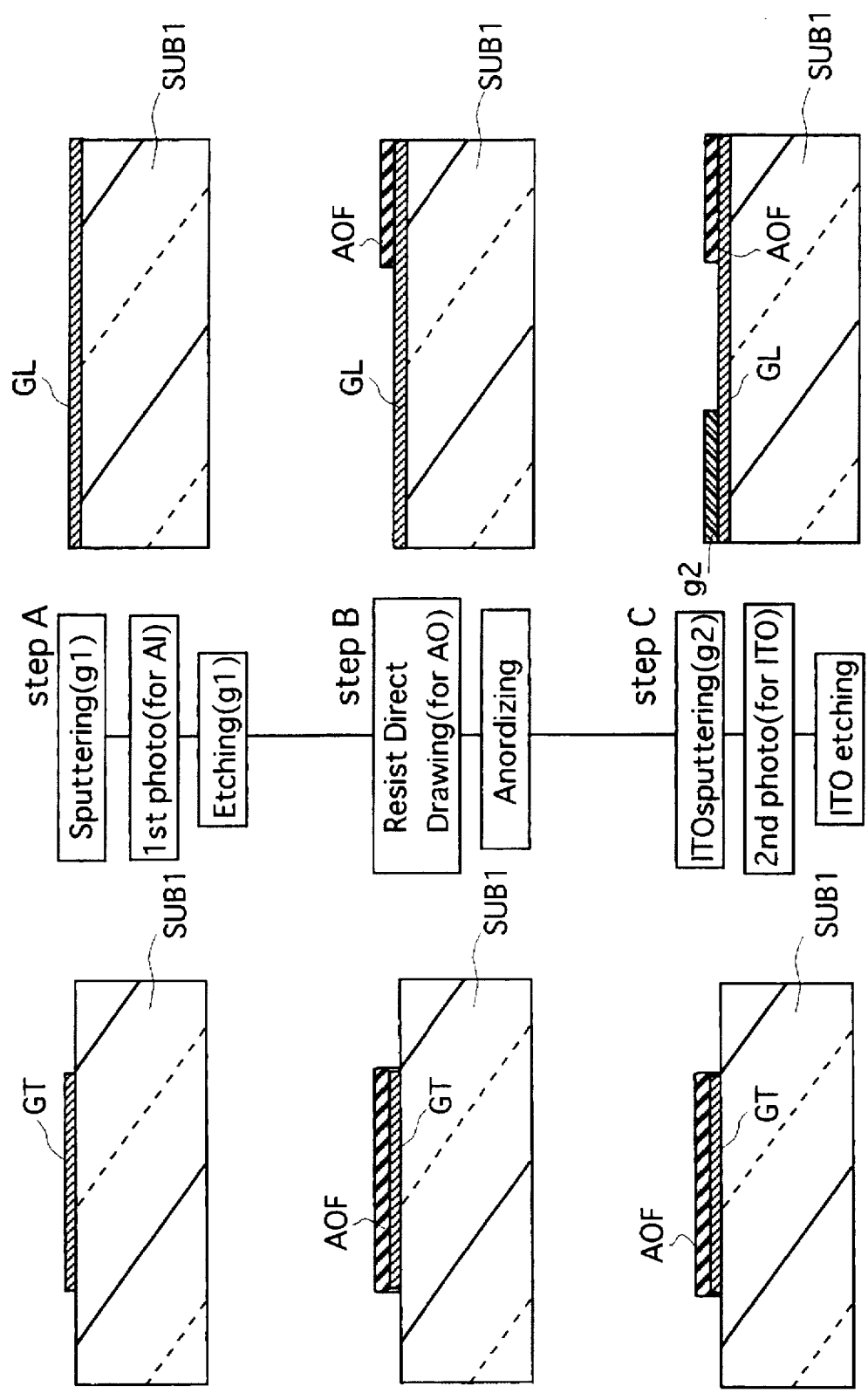

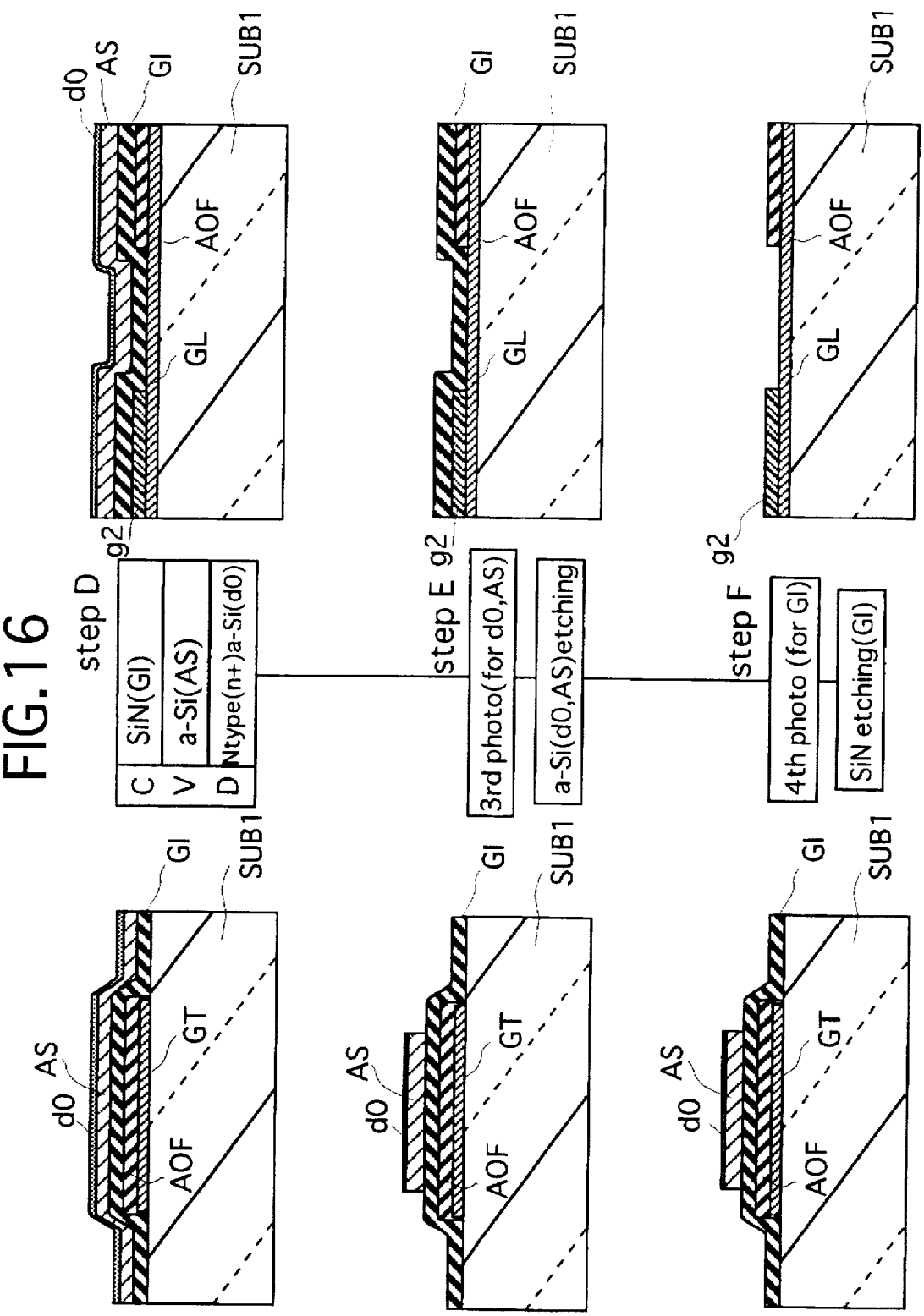

FIG.30A
FIG.30C
FIG.30B
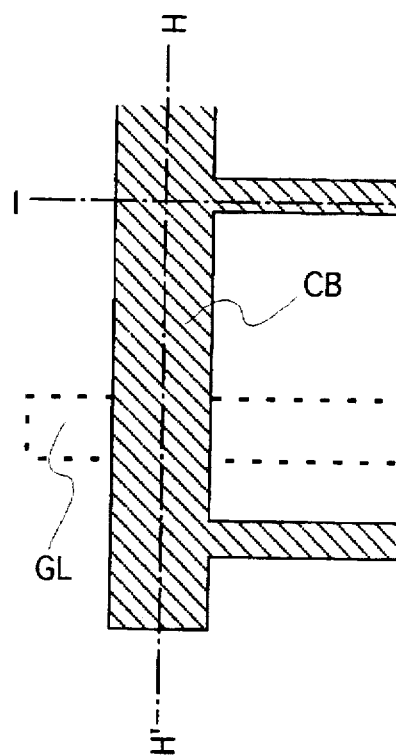
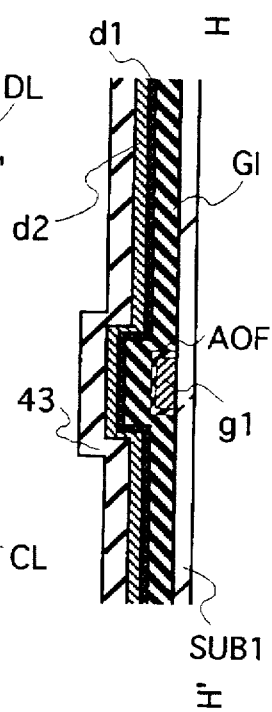
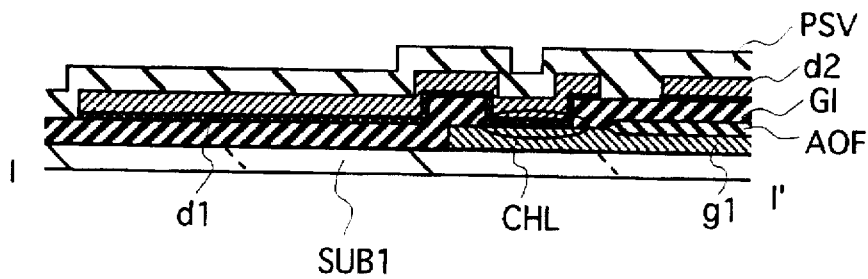

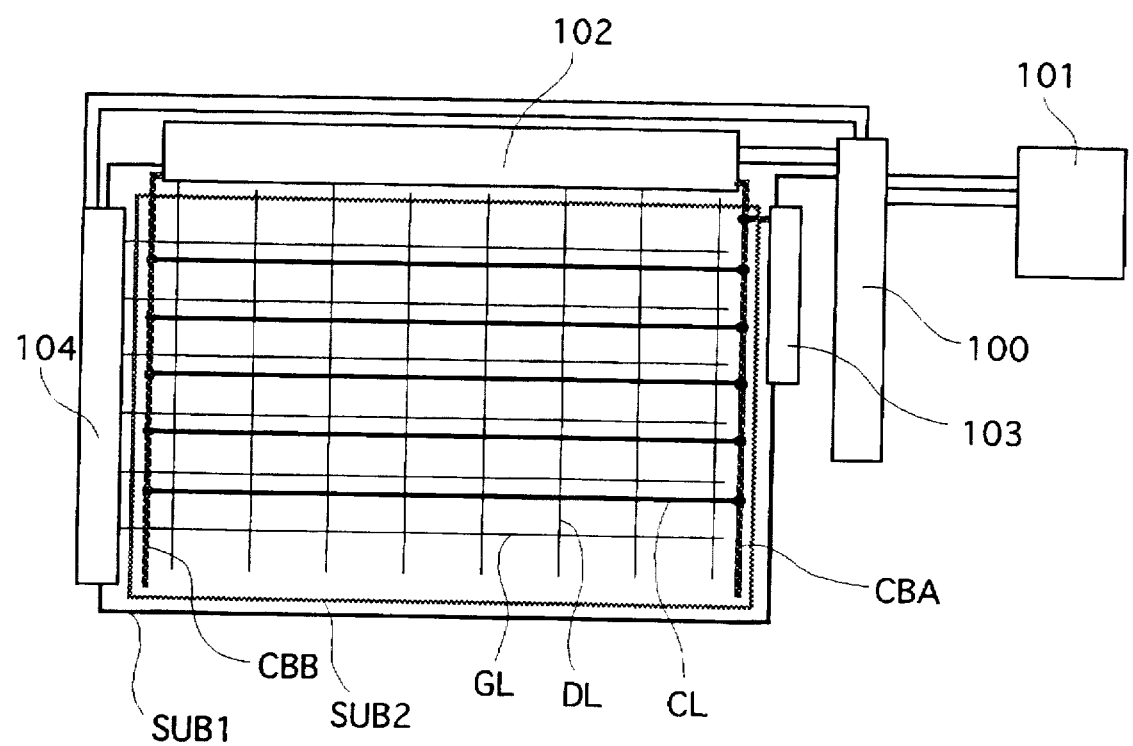

LIQUID CRYSTAL DISPLAY DEVICE WITH WIDE VIEWING ANGLE CHARACTERISTICS

BACKGROUND OF THE INVENTION

1. Field of the Invention

The present invention relates to a liquid crystal display device and, more particularly, to a liquid crystal display device with wide viewing angle characteristics of the active matrix system using thin-film transistors.

2. Description of the Prior Art

Active matrix liquid crystal display devices using active elements as represented by thin-film transistors (TFT) have now been widely used as display terminals of OA equipment since they are light in weight and have a high picture quality equivalent to that of cathode-ray tubes.

The display system of the liquid crystal display devices can be roughly divided into two. One is a system in which liquid crystals are sandwiched by two substrates having transparent electrodes and are driven by a voltage applied to the transparent electrodes, and light incident upon the liquid crystals and transmitted through the transparent electrodes is modulated to achieve display. All of the products that are now available are based upon this system. Another one is a system in which liquid crystals are driven by an electric field which is nearly in parallel with the surface of a substrate between two electrodes that are formed on the same substrate, and light incident upon the liquid crystals through a gap between the two electrodes is modulated to provide display. Though no product which is based upon this system has yet been provided, it has a feature of a very wide viewing angle and a promising art in connection with active matrix liquid crystal display devices.

Features of the latter system have been disclosed in, for example, Japanese Patent Laid-Open No. 505247/1993, Japanese Patent Publication No. 21907/1988 and Japanese Patent Laid-Open No. 160878/1994.

SUMMARY OF THE INVENTION

A first problem that is to be solved by the present invention will be described below.

In a conventional liquid crystal display device of the latter system, an electric field which is substantially in parallel with the surface of the substrate is generated via thin-film electrodes having thicknesses of about several thousand angstroms, making it difficult to effectively generate the electric field in the liquid crystal layer compared with the former system.

Therefore, an electric field stronger than that of the former system must be generated between the electrodes, resulting in an increase in the consumption of electric power and making it necessary to employ, as a driver unit, an LSI having an increased breakdown voltage.

A second problem is that in the former system, a metal material having good light-shielding property has been used as a black matrix (light-shielding film) that covers the portions where undesired light passes through. When this metal material is used for the latter system, however, the electric field between the electrodes is absorbed by the black matrix, making it difficult to generate an effective electric field between the electrodes.

A third problem is that in the former system, the electric field from a video signal line is absorbed by a counter electrode that is formed on nearly the whole surface of a substrate opposed to the substrate on which the video signal line is formed, and the electric field formed by the video signal line does not affect the electric field established between the electrodes. In the latter system in which no electrode exists on the substrate opposed to the substrate on which the video signal line is formed, however, the electric field formed by the video signal line affects the electric field established between the electrodes, giving rise to the occurrence of crosstalk (particularly in the vertical direction of the screen) in which video information of other rows affect the display and, hence, appearance of striped image called vertical smear.

A fourth problem is that in the latter system in which the counter electrode can be formed linearly, the resistance of the counter electrode from the input end to the other end thereof becomes very larger than that of when the counter electrode is formed in a planar shape in the former system. Therefore, the counter voltage is not sufficiently fed to the terminal pixels, and the counter voltage is distorted by the video signals due to the capacitance at a portion where the counter voltage signal line intersects the video signal line, resulting in the occurrence of crosstalk (particularly, in the horizontal direction of the screen) and appearance of striped image called lateral smear.

A fifth problem is that in the latter conventional system in which the pixel electrode PX and the counter electrode CT are arranged on the same substrate, the opening area that contributes to the display decreases by the amount corresponding to the arrangement of the counter voltage signal line CL compared with that of the former conventional system.

Moreover, an increase in the number of intersecting points of the wirings arranged in the form of a matrix results in increased chances of short-circuiting among the wirings and in an increase in the parasitic capacitance among the signal lines, hindering smooth transfer of signals.

Besides, while the pixel electrode PX in the former system has a planar shape, the pixel electrode PX of the latter system has a narrow strip shape or a line shape, often causing pixels to become defective due to disconnection of the line.

A sixth problem is that the latter conventional system may employ an AC driving method to apply an AC voltage to the liquid crystal layer, e.g., an AC driving method which inverts a drive voltage applied to the liquid crystal layer after every horizontal scanning interval. In this case, when a pulse voltage is applied to the counter voltage signal line CL having a resistance R and a capacitance C, the pulse voltage is distorted. Hereinafter, the sixth problem will be described with reference to FIGS. 25 and 26.

FIG. 25 is a diagram of an equivalent circuit of a transmission passage for transmitting a drive voltage applied to the counter voltage signal line CL in a liquid crystal display device of the latter system, and FIG. 26 is a diagram showing waveforms of a drive voltage applied to the counter electrode CT at each of the points.

The transmission passage for transmitting a drive voltage applied to the counter electrode CT includes chiefly resistors 50 of the counter voltage signal line CL, a resistor 51 of a common bus line CB between a common voltage driver unit 52 and the counter voltage signal line CL, and storage capacitors 53 in the pixels. Therefore, when a liquid crystal layer is driven by an AC drive voltage, the waveform of the drive voltage (pulse voltage) fed to the counter electrode CT from the common voltage driver unit 52 of a common voltage generator and driver unit 103 is distorted.

As will be understood from a counter voltage waveform 54 at point D, a counter voltage waveform 55 at point E, a counter voltage waveform 56 at point F and a counter voltage waveform 57 at point G shown in FIG. 26, the distortion of waveform of the drive voltage fed to the counter electrode CT increases with an increase in the distance, from point D, to point G.

As a result, the electric field between the pixel electrode PX and the counter electrode CT in the pixels differs, irregular brightness (irregular display) occurs along the counter voltage signal line CL, and the display quality of the liquid crystal display panel is impaired.

This becomes a serious problem particularly when there is employed an AC drive system which inverts the drive voltage applied to the liquid crystal layer after every horizontal scanning interval.

When the counter voltage signal line CL is broken even at one place, furthermore, it is impossible to drive the liquid crystals since the drive voltage is no longer fed to the counter electrode CT of the pixels after the broken portion, impairing the display quality of the liquid crystal display panel.

According to the constitution of the prior art, furthermore, the thickness differs by a thickness of the signal line depending upon the portions where the video signal line DL and the scanning signal line GL are led out and the portions where such signal lines are not led out. Therefore, the gap becomes irregular in the whole panel impairing the display quality of the liquid crystal display panel.

The object of the present invention is to provide a liquid crystal display device of high picture quality that can be efficiently fabricated, that is powered on a low voltage and consumes small amounts of electric power, and has wide viewing characteristics as a result of solving the above-mentioned problems inherent in the prior art.

Description of representatives of the invention disclosed in this specification is as follows.

Means for solving the above-mentioned first to fourth problems will be described below.

Means 1

A liquid crystal display device having a pair of substrates at least one of which is transparent, a liquid crystal layer sandwiched by the pair of substrates, a pixel electrode and a counter electrode formed between one of the substrates and the liquid crystal layer, in order to change the light transmission factor or the light reflection factor of the liquid crystals by use of an electric field which is established between the pixel electrode and the counter electrode and has a component in parallel with the one substrate, wherein the dielectric constant anisotropy $\Delta\epsilon$ and the effective thickness deff of the liquid crystal layer, the width Wp of the pixel electrode in the lateral direction, the width Wc of the counter electrode in the lateral direction, and the gap L between the pixel electrode and the counter electrode satisfy the following relationships, $\delta\epsilon > 0$, 2.8 µm < deff < 4.5 pm,
1.2'deff < Wp < L/1.2, and 1.2×deff < Wc < L/1.2

Means 2

A liquid crystal display device having a pair of substrates at least one of which is transparent, a liquid crystal layer sandwiched by the pair of substrates, a pixel electrode and a counter electrode formed between the one of the substrates and the liquid crystal layer, in order to change the light transmission factor or the light reflection factor of the liquid crystals by use of an electric field which is established between the pixel electrode and the counter electrode and has a component in parallel with the one substrate, wherein the dielectric constant anisotropy $\Delta\epsilon$ and the effective thickness deff of the liquid crystal layer, the width Wp of the pixel electrode in the lateral direction, the width Wc of the counter electrode in the lateral direction, and the gap L between the pixel electrode and the counter electrode satisfy the following relationships, $\Delta\epsilon < 0$, 4.2 µm < deff < 8.0 µm
1.2×deff < Wp < L/1.2, and 1.2×deff < Wc < L/1.2

Means 3

A liquid crystal display device having a pair of substrates at least one of which is transparent, a liquid crystal layer sandwiched by the pair of substrates, a pixel electrode and a counter electrode formed between one of the substrates and the liquid crystal layer, whereby pixels are formed such that the light transmission factor or the light reflection factor of the liquid crystals is changed by an electric field which is established between the pixel electrode and the counter electrode and has a component in parallel with the one substrate, and forming a black matrix surrounding the pixels on a plane, wherein the black matrix is made of an insulating material.

Means 4

A liquid crystal display device having a pair of substrates at least one of which is transparent, a liquid crystal layer sandwiched by the pair of substrates, a video signal line, a drain electrode, a pixel electrode to which is applied a video signal from the video signal line via the drain electrode and a thin film transistor, and a counter electrode, that are formed between one of the substrates and the liquid crystal layer, whereby pixels are formed such that the light transmission factor or the light reflection factor of the liquid crystals is changed by an electric field which is established between the pixel electrode and the counter electrode and has a component in parallel with the one substrate, wherein the counter electrodes of adjacent pixels are positioned on both sides of the video signal line, and the widths of the counter electrodes are not smaller than one-half the width of the video signal line.

Means 5

In the means 4, the counter electrode is made of an anodizable metal, and a self-anodized film of this metal covers the counter electrode.

Means 6

In the means 5, the counter electrode is made of aluminum.

Means 7

In the means 5, the counter electrode is formed simultaneously with the gate signal line which is made of a metal layer having anodized surface.

Means 8

A liquid crystal display device having a pair of substrates at least one of which is transparent, a liquid crystal layer sandwiched by the pair of substrates, a video signal line, a drain electrode, a pixel electrode to which is applied a video signal from the video signal line via the drain electrode and a thin film transistor, a gate signal line connected to a gate electrode which turns the thin film transistor on, and a counter electrode to which a counter voltage is applied via a counter voltage signal line, which are formed between one of the substrates and the liquid crystal layer, whereby pixels are formed such that the light transmission factor of the liquid crystals is changed by an electric field which is established between the pixel electrode and the counter electrode and has a component in parallel with the surface of the one substrate, wherein the gate signal line is made of a metal layer having anodized surface, and the counter voltage signal line is made of the same material as that of the gate signal line.

Means 9

In the means 8, the counter voltage signal line is made of aluminum.

Means 10

In the means 8, the counter voltage signal line and the gate signal line are formed through the same step.

Means 11

A liquid crystal display device having a pair of substrates at least one of which is transparent, a liquid crystal layer sandwiched by the pair of substrates, a video signal line, a drain electrode, a pixel electrode to which is applied a video signal from the video signal line via the drain electrode and a thin film transistor, a gate electrode for turning the thin film transistor on, a counter electrode to which a counter voltage is applied via a counter voltage signal line, and a storage capacitor formed by superposing part of the pixel electrode on part of the counter voltage signal line via an interlayer insulating film, which are formed between one of the substrate and the liquid crystal layer, whereby pixels are formed such that the light transmission factor of the liquid crystals is changed by an electric field which is established between the pixel electrode and the counter electrode and has a component in parallel with the surface of the substrate, wherein the counter voltage signal line is made of aluminum having anodized surface.

Means 12

A liquid crystal display device having a pair of substrates at least one of which is transparent, a liquid crystal layer sandwiched by the pair of substrates, a video signal line, a drain electrode, a pixel electrode to which is applied a video signal from the video signal line via the drain electrode and a thin film transistor, a gate electrode for turning the thin film transistor on, and a counter electrode to which a counter voltage is applied via a counter voltage signal line, which are formed between the one substrate and the liquid crystal layer, whereby pixels are formed such that the light transmission factor of the liquid crystals is changed by an electric field which is established between the pixel electrode and the counter electrode and has a component in parallel with the substrate, wherein a common bus line is provided to connect in common the counter voltage signal lines of the plurality of pixels, and the common bus line has a multilayer structure of two or more conductive layers.

Means 13

In the means 12, the common bus line is made up of a conductive layer of the same material as that of the gate electrode and a conductive layer of the same material as that of the video signal line, and these conductive layers are formed simultaneously with the formation of the gate electrode and the video signal line.

In order to solve the above-mentioned fifth problem according to the present invention, the counter voltage signal line and the drain electrode are used in common by two pixels adjacent to each other in the direction of column, and the storage capacitor is formed in a part of the counter voltage signal line.

Means 14

A liquid crystal display device having a pair of substrates at least one of which is transparent, a liquid crystal layer sandwiched by the pair of substrates, a video signal line, a drain electrode, a pixel electrode to which is applied a video signal from the video signal line via the drain electrode and a thin film transistor, a gate electrode for turning the thin film transistor on, a counter electrode to which a counter voltage is applied via a counter voltage signal line, and a storage capacitor formed by superposing part of the pixel electrode on part of the counter voltage signal line via an interlayer insulating film, which are formed between the one of the substrates and the liquid crystal layer, whereby pixels are formed such that the light transmission factor of the liquid crystals is changed by an electric field which is established between the pixel electrode and the counter electrode and has a component in parallel with the substrate, wherein the scanning signal lines connected to the gate electrodes and the counter voltage signal lines connected to the counter electrodes are arranged in parallel in a first direction of the plurality of pixels that are arranged in the form of a matrix, and the video signals connected to the drain electrodes are arranged in parallel in a second direction, and wherein the counter voltage signal line is used in common by two pixels adjacent to each other in the second direction.

Means 15

In the means 14, the gate electrodes, scanning signal lines and thin-film transistor elements of the two pixels adjacent to each other in the direction of column are so arranged as to be opposed to each other, the drain electrodes are used in common by the two pixels, and the wirings from the drain electrodes to the video signal lines are arranged between the opposing scanning signal lines.

Means 16

In the means 15, the thin-film transistors are formed along the scanning signal line in such a way that the plurality of the thin-film transistors are connected to the pixel electrodes in a pixel.

Means for solving the above-mentioned sixth problem will be described below.

Means 17

A liquid crystal display device having a pair of substrates at least one of which is transparent, a liquid crystal layer sandwiched by the pair of substrates, a video signal line, a drain electrode, a pixel electrode to which is applied a video signal from the video signal line via the drain electrode and a thin film transistor, a gate signal line connected to a gate electrode for turning the thin film transistor on, and a counter electrode to which a counter voltage is applied via a counter voltage signal line, which are formed between one of the substrates and the liquid crystal layer, whereby pixels are formed such that the light transmission factor of the liquid crystals is changed by an electric field which is established between the pixel electrode and the counter electrode and has a component in parallel with the substrate, wherein the ends on both sides of the counter voltage signal line are connected to a common bus line and are, further, connected to a common voltage generating and driving means.

Means 18

In the means 17, thickness adjustment patterns are provided on the non-display area of one of the substrates, and the thickness adjustment patterns are made of the same material and have the same thickness as that of the common bus line.

Means 19

In the means 17 or 18, a thickness adjustment film made of the same material and having the same thickness as that of the gate electrode is provided over or under the common bus line in the non-intersecting areas except the areas where the common bus line intersects the gate signal line or the video signal line and except the areas where the common bus line is connected to the counter voltage signal line.

Means 20

In the means 17 or 18, a thickness adjustment film made of the same material and having the same thickness as that of the drain electrode is provided over or under the common bus line in the non-intersecting areas except the areas where the common bus line intersects the gate signal line or the video signal line and except the areas where the common bus line is connected to the counter voltage signal line.

According to the constitution of means 1, when a liquid crystal composition having positive dielectric constant anisotropy is used, it is possible to obtain a transmission characteristic little depending upon the wavelength in the birefringence mode, i.e., to obtain good white display, and to apply an electric field component to the liquid crystal layer in parallel with the substrate, which is much stronger than the component of the electric field in the direction perpendicular to the substrate. It is therefore possible to utilize the most efficient transmission state enabling the voltage between the pixel electrode and the counter electrode to be efficiently converted into the component in the direction in parallel with the substrate without raising the voltage for driving the liquid crystal.

According to the constitution of means 2, when a liquid crystal composition having negative dielectric constant anisotropy is used, it is possible to obtain a transmission characteristic little depending upon the wavelength in the birefringence mode, i.e., to obtain good white display, and to apply an electric field component to the liquid crystal layer in parallel with the substrate, which is much stronger than an electric field component in the direction perpendicular to the substrate. It is therefore possible to utilize the most efficient transmission state enabling the voltage between the pixel electrode and the counter electrode to be efficiently converted into the one in the direction in parallel with the substrate without raising the voltage for driving the liquid crystal.

According to the constitution of means 3, it is possible to eliminate the effect upon the electric field between the pixel electrode and the counter electrode because the black matrix is constituted by an insulating material. The black matrix cuts off the effect upon the electric field between the pixel electrode and the counter electrode enabling the distance to be decreased among the electrodes. It is therefore allowed to increase the aperture ratio, and to effectively apply an electric field component in parallel with the surface of the substrate to the liquid crystal layer without raising the voltage for driving the liquid crystals.

According to the constitution of means 4, the lines of electric force from the video signal line can be absorbed by the counter electrodes that are located on both sides thereof, making it possible to prevent the occurrence of so-called crosstalk. In this case, the lines of electric force from the video signal line are equally divided by the counter electrodes on both sides each by 50%; i.e., 100% of the lines of electric force are absorbed in total.

According to the constitution of means 5, short-circuiting is prevented from occurring even when the counter electrodes on both sides are brought as close to each other as possible or even when they are arranged to intersect with the video signal line. This makes it possible to increase the aperture ratio.

According to the constitution of means 6, the counter electrodes have a small resistance. Therefore, a nearly uniform and stable current flows through the counter electrodes, and the counter voltage is sufficiently transmitted even to the pixels at the terminals, making it possible to further heighten the effect of means 4.

According to the constitution of means 7, it is possible to obtain the effect of means 5 without increasing the number of steps of production.

According to the constitution of means 8, it is possible to decrease the probability of short-circuiting at the areas where the counter voltage signal line intersects the video signal line.

According to the constitution of means 9, the counter voltage signal line has a small resistance and a nearly uniform and stable current flows through each of the counter electrodes. Therefore, a counter voltage is sufficiently transmitted to the pixels even at the terminals making it possible to achieve uniform pixel display.

According to the constitution of means 10, the effect of means 7 is gained without increasing the number of production steps.

According to the constitution of means 11, the electrode of the lower side formed via an interlayer insulating film is made of aluminum having an anodized surface, making it possible to form a storage capacitor little permitting the occurrence of troubles that are caused by point defects due to so-called whiskers.

According to the constitution of means 12, it is possible to decrease the resistance without increasing the width of the common bus line and to apply a sufficiently large voltage up to the ends of the counter electrodes. This makes it possible to decrease crosstalk (particularly, crosstalk in the horizontal direction of the screen) that is caused by distortion of the counter voltage according to the video signals.

According to the constitution of means 13, it is possible to obtain the effect of means 12 without increasing the number of steps of production.

According to the constitution of means 14, the gate signal lines GL connected to the gate electrodes GT and the counter voltage signal lines CL connected to the counter electrodes CT are arranged in parallel in the direction of row of a plurality of pixels arranged in the form of a matrix, the counter voltage signal line CL is used in common by the two pixels adjacent to each other in the direction of column, and the video signal lines DL connected to the drain electrodes SD2 are arranged in parallel in the direction of column, in order to decrease the parasitic capacitance among the wirings, to increase the production yield, to ensure the openings in the pixels and to decrease the resistances of the counter voltage signal lines CL.

According to the constitution of means 15, the gate electrodes GT, gate signal lines GL and thin-film transistor elements of two pixels adjacent to each other in the direction of column in the constitution of means 14 are so arranged as to be opposed to each other, the drain electrode SD2 is used in common by the two pixels, and the wiring from the drain electrode SD2 to the video signal line DL is arranged between the opposing gate signal lines GL, in order to decrease the parasitic capacitance among the wirings, to increase the production yield, to ensure the openings in the pixels and to decrease the resistances of the counter voltage signal lines CL.

According to the constitution of means 16, the thin-film transistors are formed along the gate signal line GL in such a way that the plurality of thin-film transistors are connected to the pixel electrodes PX in one pixel of the constitution of means 15, in order to decrease the parasitic capacitances among the wirings, to increase the production yield, to ensure the openings in the pixels and to decrease the resistances of the counter voltage signal lines CL.

According to the constitution of means 17 to 20, both ends of the counter voltage signal lines CL are connected to the common bus line CB which has a resistance smaller than the resistances of the counter voltage signal lines CL. It is therefore possible to decrease distortion in the waveform of the drive voltage applied to the counter electrodes CT from the common voltage driver unit 52, to uniformalize the electric field intensity between the pixel electrode PX and the counter electrode CT in each pixel in the panel, and to decrease irregularity in the brightness that occurs along the counter voltage signal line CL.

Even in case the counter voltage signal line CL is broken at a portion, the common voltage is supplied from both ends of the counter voltage signal line CL to drive liquid crystal of the pixels. Unlike the prior art, therefore, the liquid crystal of pixels after the broken portion can be driven, and the quality of display is not impaired.

Furthermore, the area where the common bus line CB is arranged has the same cross-sectional structure as that of an area where the common bus line CB intersects the gate signal line GL or the video signal line DL, making it possible to decrease irregularity in the film thickness at the edges of the substrate where the common bus line CB is formed, to uniform the gap length between two substrates, and to decrease gap irregularity of the liquid crystal display device.

The foregoing and other objects, advantages, manner of operation and novel features of the present invention will be understood from the following detailed description when read in connection with the accompanying drawings.

BRIEF DESCRIPTION OF THE DRAWINGS

FIG. 1 is a diagram schematically illustrating a pixel for explaining the basic operation of a liquid crystal display element of the present invention;

FIG. 15 is a flow chart of a sectional view of a pixel and a gate terminal illustrating the steps A to C of fabricating a substrate SUB1;

FIG. 16 is a flow chart of a sectional view of the pixel and the gate terminal illustrating the steps D to F of fabricating the substrate SUB1;

FIGS. 30A to 30C are a plan view and sectional views illustrating the connection of the counter voltage signal line CL and the common bus line CB at point A on the matrix substrate of FIG. 27;

FIG. 35 is a plan view illustrating a further arrangement of the common bus line CB of embodiment 3;

DESCRIPTION OF THE PREFERRED EMBODIMENTS

Figure 2:
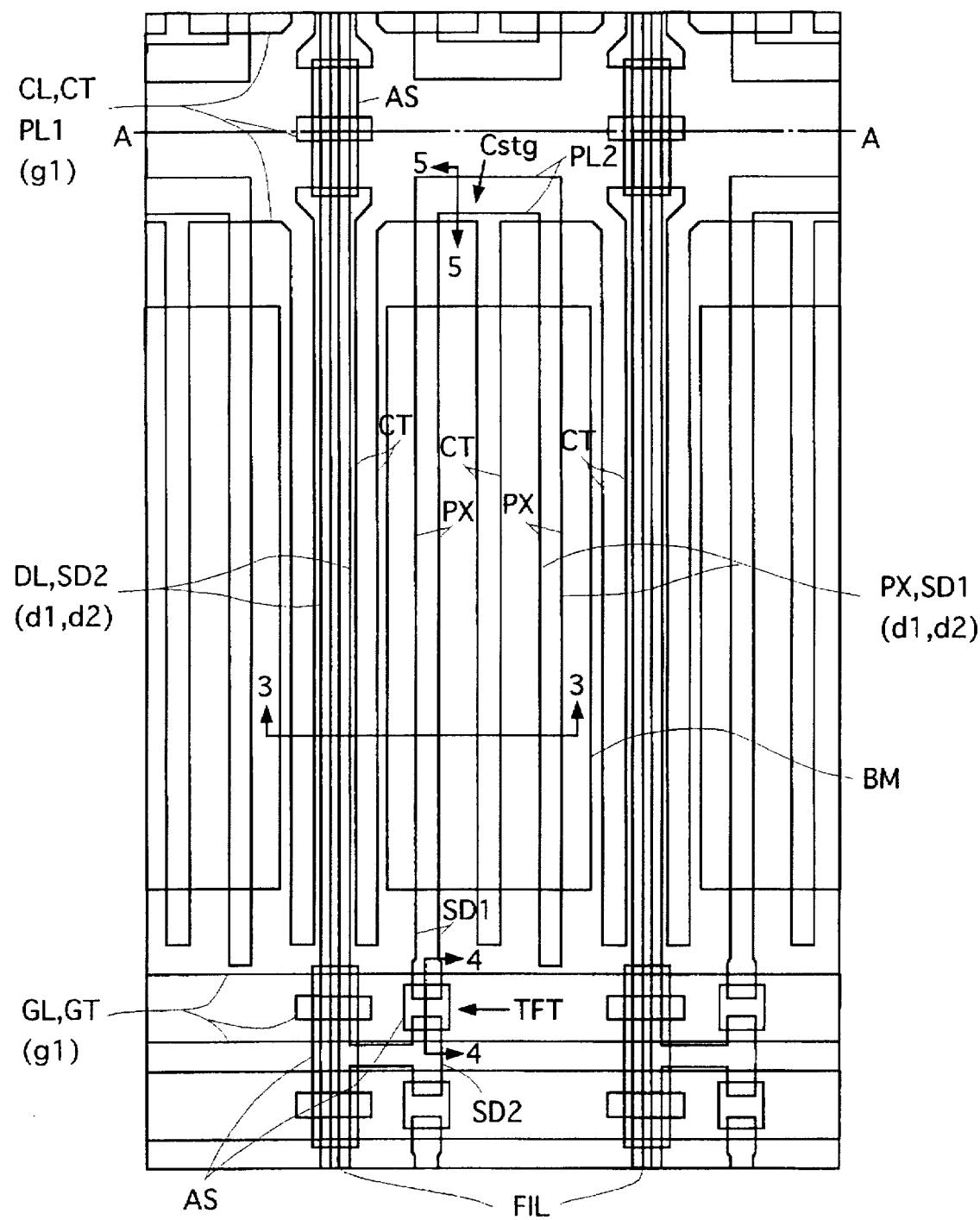
FIG. 2 is a plan view of essential portions illustrating a pixel and peripheries thereof in a liquid crystal display unit of an active matrix-type color liquid crystal display device of an embodiment 1.

Further objects and features of the present invention will become obvious from the following description in conjunction with the drawings.

[Active matrix liquid crystal display device]

An embodiment in which the present invention is adapted to a color liquid crystal display device of the active matrix system will be described below. In the drawings, those portions having the same functions are denoted by the same reference numerals and their description will not be repeated.

First, prior to illustrating embodiments of the present invention, the basic operation of the liquid crystal display element to which the present invention is applied will be explained.

FIGS. 1A to 1D are schematic diagrams of a pixel for explaining the operation of a liquid crystal display element to which the present invention is applied, wherein FIG. 1A is a sectional view of when no voltage is applied, FIG. 1B is a sectional view of when a voltage is applied, FIG. 1C is a plan view of when no voltage is applied, and FIG. 1D is a plan view of when a voltage is applied. In these drawings, SUB1 and SUB2 denote transparent glass substrates (hereinafter often referred to simply as substrates), CT denotes a counter electrode, GI denotes an insulating film, DL denotes a video signal line, PX denotes a pixel electrode, POL1 and POL2 denote polarizer plates, MAX1 denotes the polarizing axis of the lower polarizer plate, MAX2 denotes the polarizing axis of the upper polarizer plate, RDR denotes the initial orientation of liquid crystal molecules, EDR denotes the direction of electric field, BM denotes a black matrix, FIL denotes a color filter, OC denotes a flattening film, ORI1 and ORI2 denote orientation films, and LC denotes liquid crystals (rod-like liquid crystal molecules).

In the liquid crystal display element, the polarizer plate POL2, light-shielding black matrix BM, color filter FIL, protective film OC and orientation film ORI2 are formed on one substrate SUB2 of the two transparent glass substrates SUB1 and SUB2. On the other substrate SUB1, via the liquid crystals LC, are formed the polarizer plate POL1, orientation film ORI1, drain electrode SD2, pixel electrode PX, counter electrode CT, wirings and thin-film transistor. These drawings do not show wirings and thin-film transistors.

Referring to FIGS. 1A and 1C, liquid crystals LC have been oriented in advance by the orientation films ORI1 and ORI2 in the orientation RDR that is substantially in parallel with the surface of the substrate SUB1. In this state, the initial orientation RDR of the liquid crystals LC is nearly in agreement with the polarizing axis MAX1 of the polarizing plate POL1, the polarizing axis MAX1 and the polarizing axis MAX2 of the other polarizing plate POL2 intersect at right angles, and the pixel is in a non-display state.

Next, referring to FIGS. 1B and 1D, when a voltage is applied between the counter electrode CT and the pixel electrode PX formed on the glass substrate SUB1 in order to create an electric field (having a direction EDR) substantially in parallel with the surface of the substrate SUB1, the liquid crystal molecules LC are twisted on a plane substantially in parallel with the surface of the substrate SUB1. Then, the pixel becomes a display state. A large number of pixels are arranged to constitute a display panel.

[Planar constitution of a matrix unit (pixel unit)]

FIG. 2 is a plan view illustrating a pixel and peripheries thereof in the active matrix-type color liquid crystal display device of a first embodiment of the present invention.

Referring to FIG. 2, each pixel is provided in a region (surrounded by four signal lines) where the gate signal line (gate signal line or horizontal signal line) GL, counter voltage signal line (counter electrode wiring) CL and two adjacent video signal lines (drain signal lines or vertical signal lines) DL intersect. Each pixel includes a thin-film transistor TFT, a storage capacitor Cstg, a pixel electrode PX and a counter electrode CT. The gate signal lines GL and the counter voltage signal lines CL extend in the right-and-left direction in the drawing and are arranged in a plural number in the up-and-down direction. The video signal lines DL extend in the up-and-down direction and are arranged in a plural number in the right-and-left direction. The pixel electrode PX is connected to the thin-film transistor TFT, and the counter electrode CT is formed integrally with the counter voltage signal line CL.

The two adjacent pixels along the video signal line DL have a planar constitution such that they have the same size and pattern. The reason is that the counter voltage signal line CL is used in common by the two vertically adjacent pixels along the video signal line DL, the width of the counter voltage signal line CL is increased and, hence, the resistance of the counter voltage signal line CL is decreased. This makes it easy to sufficiently feed a counter voltage to the counter electrodes CT of the pixels arranged in the right-and-left direction from an external circuit.

The pixel electrode PX and the counter electrode CT are opposed to each other, and the optical state of the liquid crystals LC is controlled by an electric field between each pixel electrode PX and the counter electrode CT, thereby to control the display. The pixel electrodes PX and the counter electrodes CT are formed like comb teeth, and extend in a slender form in the up-and-down direction.

When the pixel electrodes PX and the counter electrodes CT are arranged on the surface of the same substrate, the liquid crystal display element of this embodiment makes it possible to increase the area of the opening portion of the pixel that transmits light and to increase the width of the counter voltage signal line CL compared with the wiring constitution in which the counter voltage signal line CL is not used in common by the two pixels adjacent to each other in the direction of column.

As a result, the counter voltage signal line CL has a decreased resistance, the common signals are smoothly propagated, the picture quality is improved, and the common signal generator unit consumes a reduced amount of electric power.

By commonly using the counter voltage signal line CL, furthermore, the number of portions where the video signal line DL intersects the counter voltage signal line CL is decreased by about 25% compared with that of the conventional structure, and probability of short-circuiting between the video signal line DL and the counter voltage signal line CL decreases.

Figure 6:
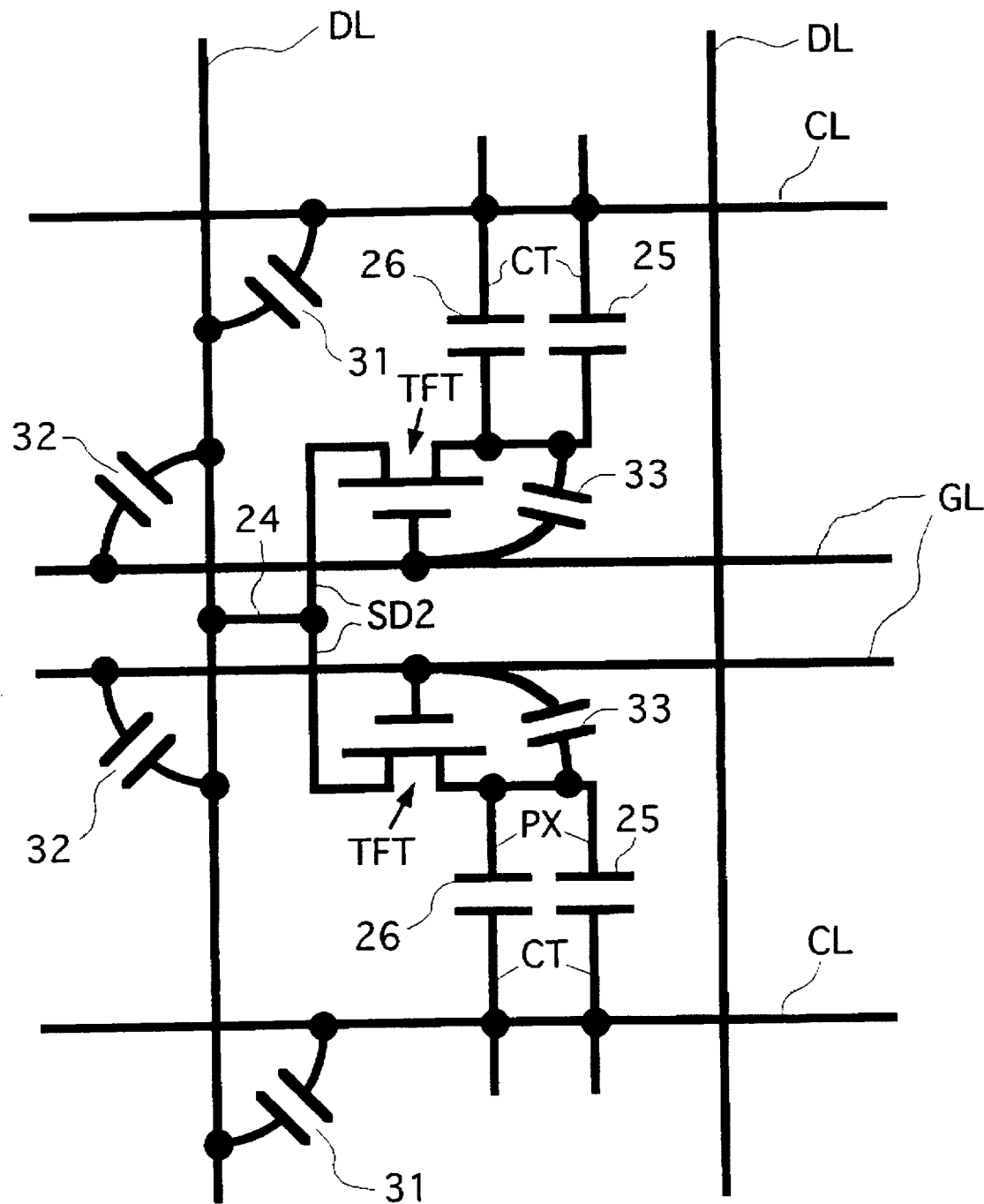
FIG. 6 is a diagram of an electrically equivalent circuit of two pixels adjacent to each other in the direction of column of embodiment 1.

FIG. 6 is a diagram of an electric equivalent circuit of two pixels adjacent to each other in the direction of column, constituting the liquid crystal display element of a lateral electric field system of the embodiment.

In FIG. 6, reference numeral 24 denotes a wiring from the video signal line DL to the drain electrode SD2, 31 denotes the interline capacitance between the counter voltage signal line CL and the video signal line DL, 32 denotes the interline capacitance between the gate signal line GL and the video signal line DL, and 33 denotes the interline capacitance between the gate electrode GT and the pixel electrode PX.

The constitution of embodiment 1, as shown in the drawings, makes it possible to decrease the parasitic capacitance 31 between the video signal line DL and the counter voltage signal line CL, and to smoothly propagate liquid crystal drive signals to the drain electrodes SD2 and to the counter electrodes CT through the active filter wiring.

According to this embodiment as described above, it is possible to improve the picture quality and to decrease the consumption of electric power by the signal generator unit.

As shown in FIG. 2, furthermore, the gate electrodes GT, gate signal lines GL and thin-film transistors TFT are devided by the two pixels adjacent to each other in the direction of column, the drain electrode SD2 is used in common, and the wiring 24 from the commonly used drain electrode SD2 to the video signal line DL is provided between the opposing gate signal lines GL. The constitution of this embodiment makes it possible to decrease the area where the drain electrode SD2 intersects the gate signal line GL and to decrease the probability of short-circuiting between the drain electrode SD2 and the gate signal line GL.

Referring to the equivalent circuit of FIG. 6, the parasitic capacitance (interline capacitance) 32 decreases between the drain electrode SD2 and the gate signal line GL, signals can be smoothly propagated to the gate electrodes GT, the picture quality is improved, and a decreased amount of electric power is consumed by the signal generator unit.

The constitution of this embodiment in which the counter voltage signal line CL is used in common and the drain electrode SD2 is used in common by the two pixels adjacent to each other in the direction of column, can be further applied to a conventional liquid crystal display panel of vertical electric field system.

The position of the thin-film transistor TFT can be moved on the gate signal line GL without increasing the area of intersection of the drain electrode SD2 and the gate electrode GT.

Here, the pixel electrode PX in the liquid crystal display element according to the present invention is of a narrow linear form, which may cause the pixel to become defective when it is broken.

Figure 4:
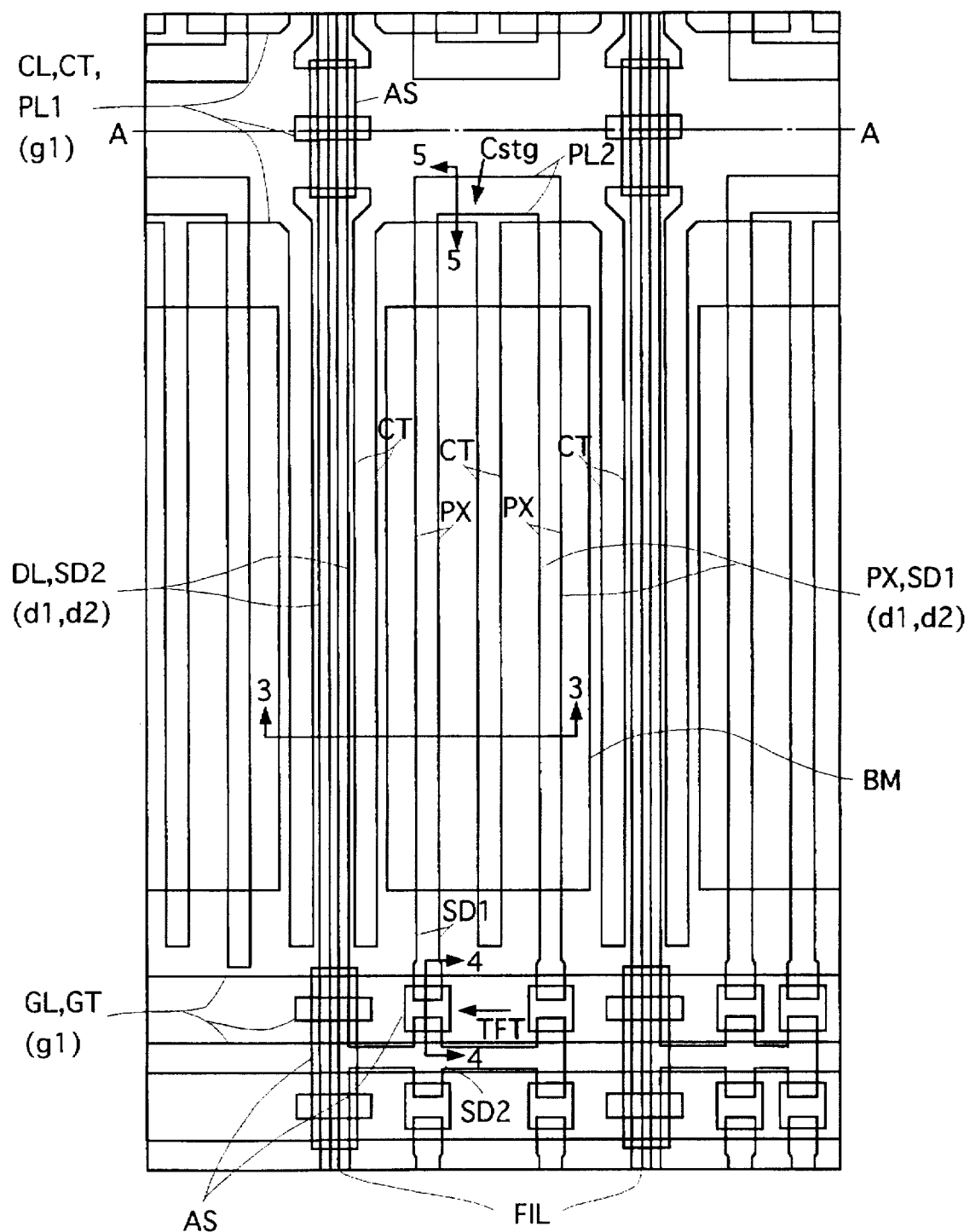
FIG. 4 is a plan view of essential portions illustrating a pixel and peripheries thereof in a liquid crystal display unit of an active matrix-type color liquid crystal display device of embodiment 2.

FIG. 4 is a plan view illustrating the structure of a pixel constituting a liquid crystal display element of a second embodiment according to the present invention. As shown in FIG. 2, the thin-film transistors TFT are so provided that the plurality of thin-film transistors TFT are connected to the number of the pixel electrodes PX while utilizing the features of the first embodiment, the drain electrode SD2 is used in common, and the wiring from the drain electrode SD2 to the video signal line DL is formed between the opposing gate signal lines GL. Hence the display of pixel is in an almost normal state even in case one of the pixel electrodes PX is broken at a portion.

When any one of the thin-film transistors becomes defective, furthermore, the pixel electrode PX connected to the defective thin-film transistor is cut by using a laser correction means or the like, and the image is displayed using other normal thin-film transistors.

According to the second embodiment as described above, it is possible to obtain an active matrix-type liquid crystal display element having a high picture quality and fabricated efficiently.

Figure 5:
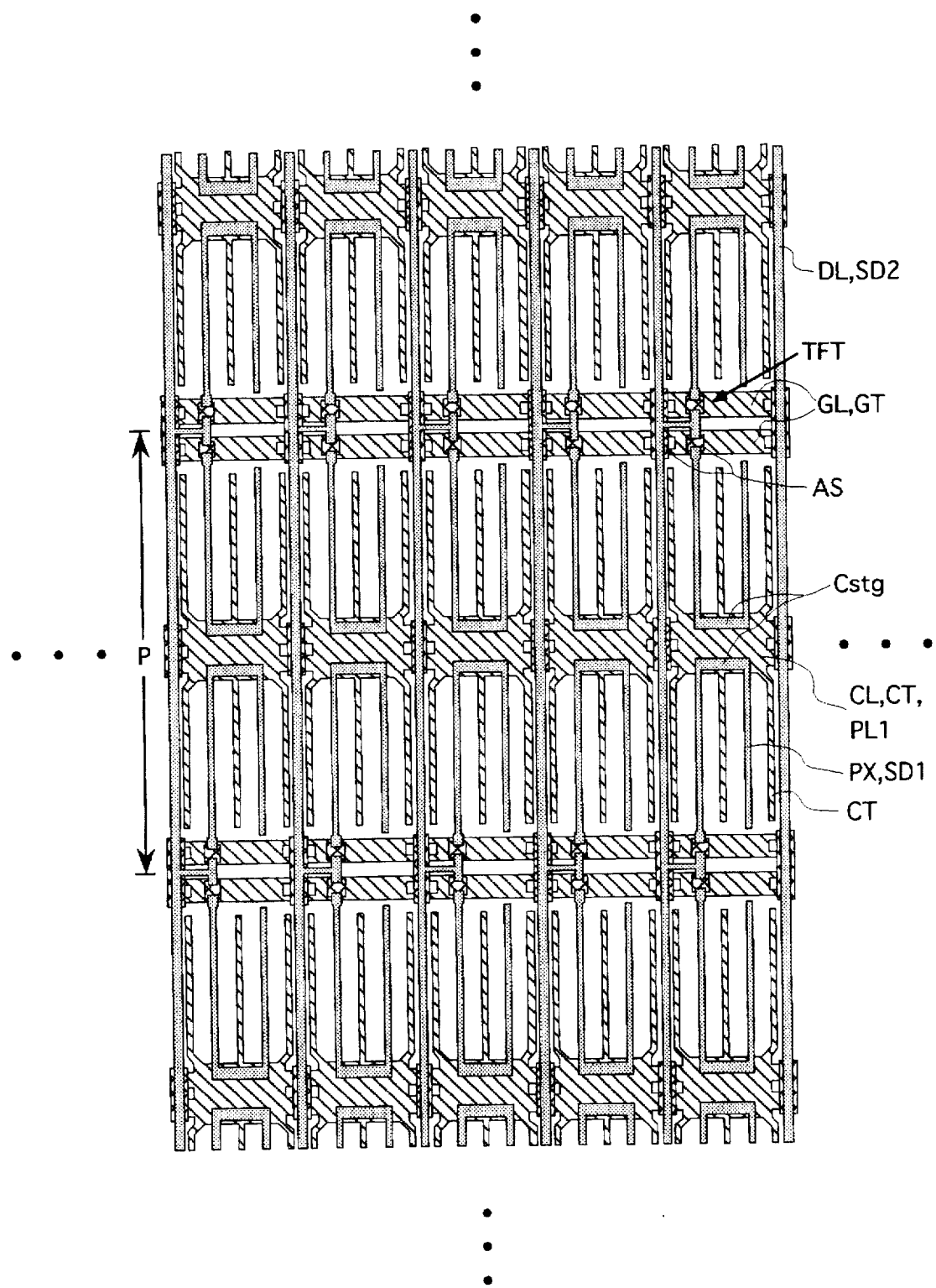
FIG. 5 is a plan view of a plurality of pixels on a liquid crystal display panel formed by arranging the pixels of embodiment 1.

FIG. 5 is a plan view illustrating a plurality of pixels in a liquid crystal display panel of in-plane electric field system formed by arranging the pixels of the first embodiment. In FIG. 5, the counter voltage signal line CL is used in common by the two pixels adjacent to each other in the direction of column indicated by arrow P.

The number O of counter electrodes CT (number of comb teeth) in a pixel is so selected as to always maintain the relationship O=P+1 with respect to the number P of pixel electrodes PX (number of comb teeth) (O=3, P=2 in this embodiment). The reason is that the counter electrode CT and the pixel electrode PX are alternately arranged and the counter electrodes CT are provided on both sides of the video signal line DL on a plane. This makes it possible to shield the lines of electric force from the video signal line DL with the counter electrodes CT, so that the electric field between the counter electrode CT and the pixel electrode PX is not affected by the electric field generated by the video signal line DL. The counter electrode CT is fed with a potential at all times from an external unit, i.e., from a counter voltage signal line CL that will be described later, and takes a stable potential. Therefore, the potential of the counter electrode CT changes very little even when it is laid close to the video signal line DL. This further causes the pixel electrode Px to be located geometrically away from the video signal line DL. Therefore, the parasitic capacitance between the pixel electrode PX and the video signal line DL, greatly decreases, making it possible to suppress fluctuation in the pixel electrode potential Vs caused by the video signal voltage. Therefore, crosstalk (image defect called vertical smear) that occurs in the up-and-down direction is suppressed.

The pixel electrode PX and the counter electrode CT have widths Wp and Wc which are 6 μm, respectively, and are very larger than a maximum predetermined thickness of 4.5 μm of a liquid crystal layer that will be described later. By taking variation during the production into consideration, it is desired that a margin of not smaller than 20% is maintained. Desirably, therefore, these electrodes should have widths of much larger than 5.4 μm. Therefore, the electric field component which is applied to the liquid crystal layer and is in parallel with the surface of the substrate becomes larger than the electric field component in the direction perpendicular to the surface of the substrate, making it possible to lower the voltage for driving liquid crystals.

It is further desirable that the maximum widths Wp and Wc of the pixel electrode PX and the counter electrode CT are smaller than the gap L between the pixel electrode PX and the counter electrode CT. The reason is that when the gap between the electrodes is too small, the lines of electric force are greatly curved whereby the area increases where the electric field component perpendicular to the surface of the substrate becomes greater than the electric field component in parallel with the surface of the substrate, making it difficult to efficiently apply the electric field component in parallel with the surface of the substrate to the liquid crystal layer. Therefore, when the margin is 20%, the gap L between the pixel electrode PX and the counter electrode CT must be greater than 7.2 μm.

The embodiments 1 and 2 have a resolution of 640×480 dots, a diagonal of 10.4 inches, and a pixel pitch of 110 μm. By dividing the pixels by four, the gap L becomes greater than 7.2 μm. That is, by dividing the pixels by not more than eight, a gap L>7.2 μm is satisfied. When the pixels are divided by 10 or a larger number, however, the gap L becomes smaller than 7 μm, which does not satisfy the required condition.

Furthermore, the video signal line DL has a width of 8 μm so that it will not be broken, which is slightly larger than that of the pixel electrode PX and the counter electrode CT. In order to prevent short-circuiting, a gap of 1 μm is formed between the video signal line DL and the counter electrode CT. Here, the video signal line DL has a width which is not larger than twice the width of the counter electrodes CT that are located on both sides thereof. Or, when the width of the video signal line DL is determined based on the production yield, the width of the counter electrodes CT located on both sides of the video signal line DL is determined to be not smaller than one-half the width of the video signal line DL. The reason is that the lines of electric force generated from the video signal line DL is absorbed by the counter electrodes CT on both sides thereof. To absorb the lines of electric force generated from the signal line having a given width, the lines that absorb the lines of electric force must have a width which is not smaller than the width of the line generating the lines of electric force.

Therefore, the lines of electric force generated from half (4 μm each) the width of the video signal line DL need to be absorbed by the counter electrodes CT on both sides thereof, respectively. For this purpose, the counter electrodes CT located on both sides of the video signal line DL has a width of not smaller than one-half thereof. This makes it possible to prevent crosstalk (particularly, crosstalk in the up-and-down (vertical) direction) caused by video signals.

The gate signal line GL has a width that satisfies a resistance capable of applying a sufficient gate voltage to the gate electrodes GT of pixels at the terminals (on the side opposite to the gate electrode terminals GTM that will be described later). Furthermore, the counter voltage signal line CL has a width, i.e., has a resistance capable of applying a sufficient counter voltage to the counter electrodes CT of pixels at the terminals (on the side opposite to the common bus line CB that will be described later).

On the other hand, the gap between the pixel electrode PX and the counter electrode CT is changed according to the liquid crystal material that is used. The reason is that the electric field intensity for accomplishing a maximum transmission factor differs with the liquid crystal material. Therefore, the gap between the electrodes is determined depending upon the liquid crystal material, such that a maximum transmission factor is obtained within a range of maximum amplitude of a signal voltage that is determined depending upon the breakdown voltage of the video signal driver unit (driver of the signal side) that is used. The gap between the electrodes becomes 16 μm when a liquid crystal material described later will be used.

[Cross-sectional constitution of the matrix unit (pixel unit)]

Figure 7:
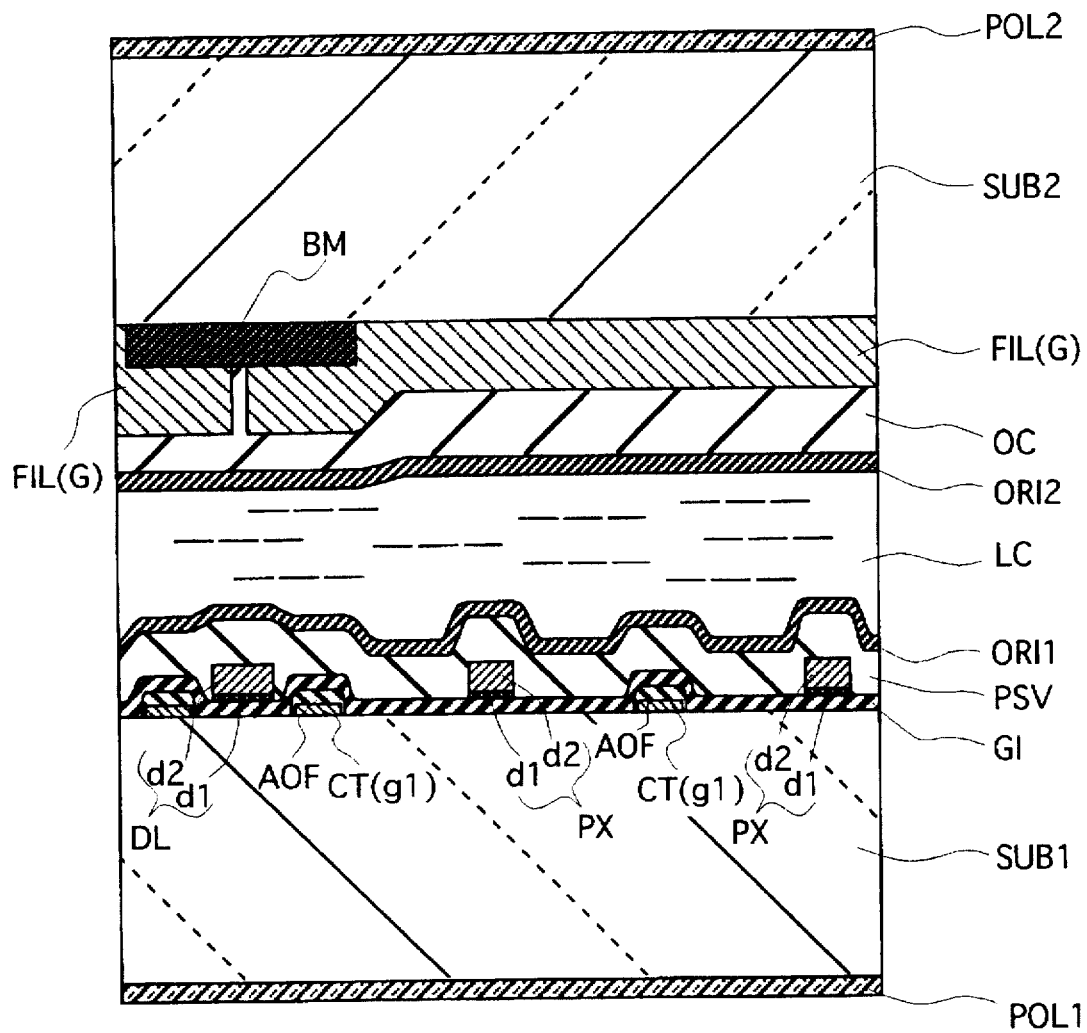
FIG. 7 is a sectional view of a pixel cut along the line 3—3 in FIG. 2.
Figure 8:
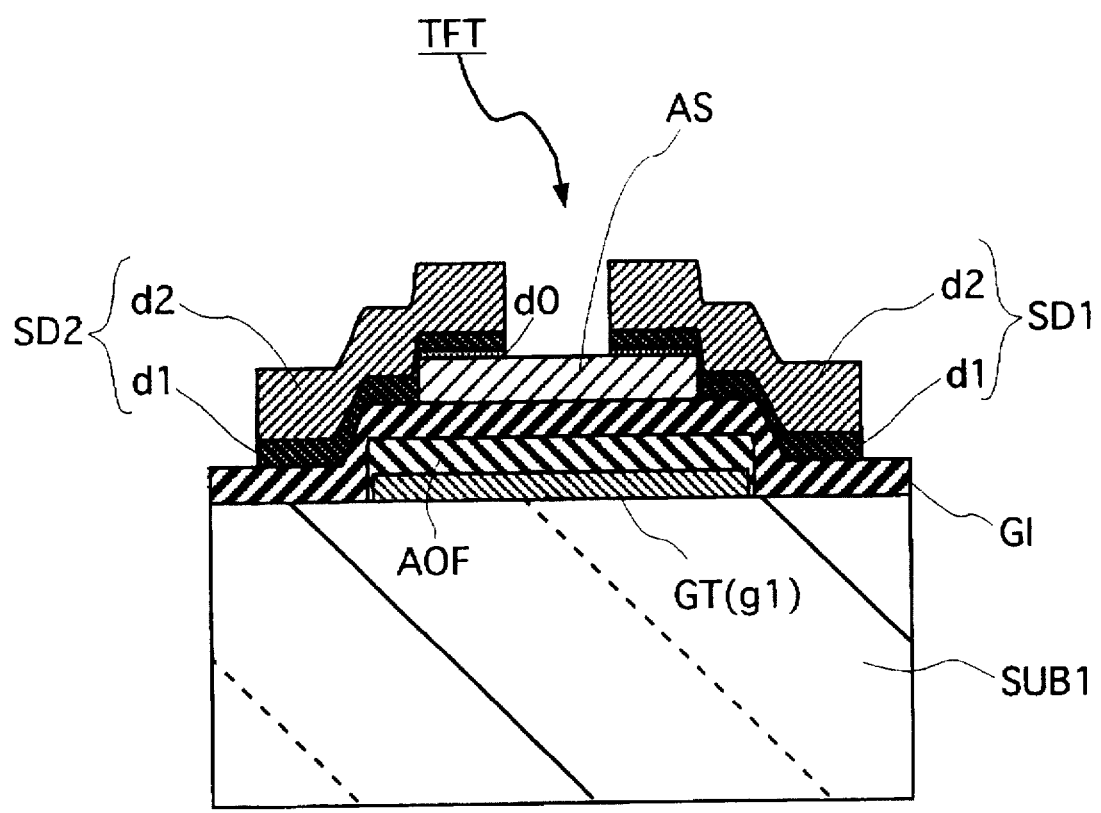
FIG. 8 is a sectional view of a thin-film transistor element TFT cut along the line 4—4 in FIG. 2.
Figure 9:
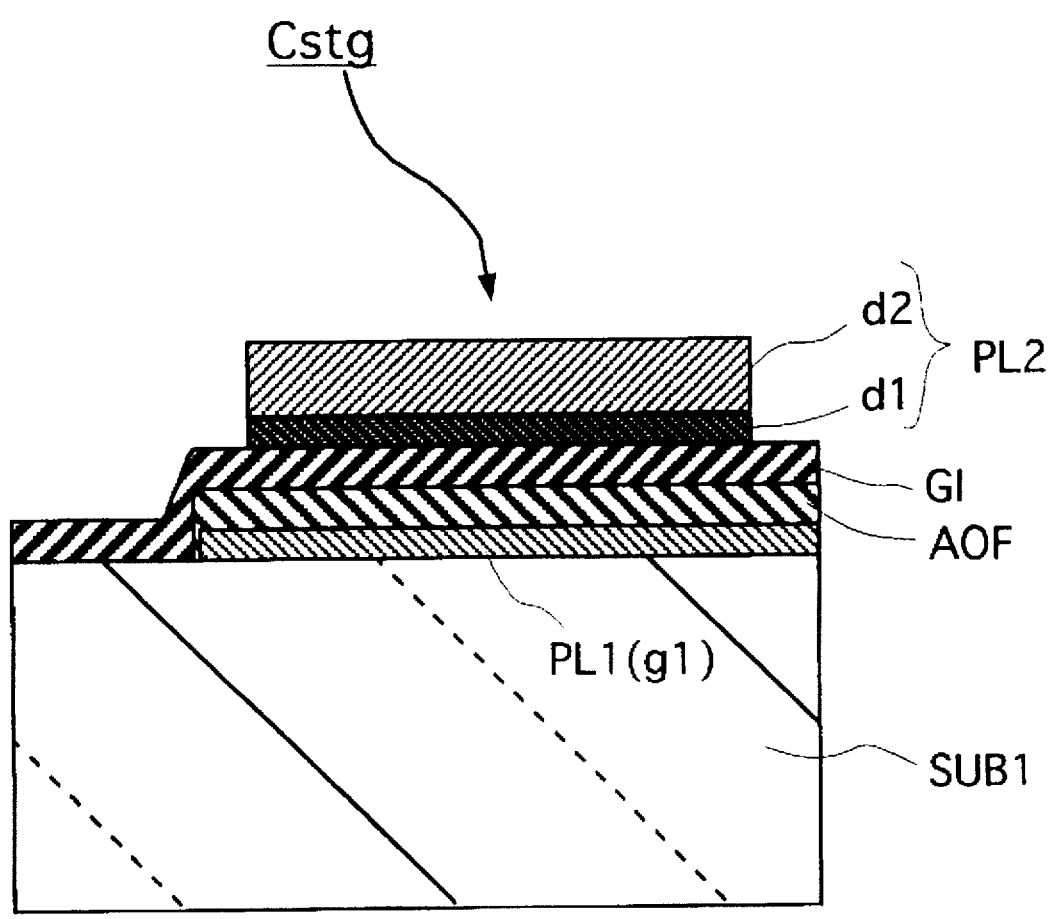
FIG. 9 is a sectional view of a storage capacitor Cstg cut along the line 5—5 in FIG. 2.

FIG. 7 is a sectional view cut along the line 3—3 in FIG. 2. FIG. 8 is a sectional view of a thin-film transistor element TFT cut along the line 4—4 in FIG. 2, and FIG. 9 is a sectional view of a storage capacitor Cstg cut along the line 5—5 in FIG. 2. As shown in FIGS. 7 to 9, on the side of the lower transparent glass substrate SUB1 are formed a thin-film transistor TFT, a storage capacitor Cstg and a group of electrodes, and on the side of the upper transparent glass substrate SUB2 are formed a color filter FIL and a black matrix pattern BM for blocking light, with respect to a liquid crystal layer LC.

Furthermore, orientation films ORI1 and ORI2 for controlling the initial orientation of liquid crystals are provided on the inside surfaces (liquid crystal LC side) of the transparent glass substrates SUB1 and SUB2, and polarizer plates are provided with their polarizing axes intersecting at right angles (cross-nicol arrangement) on the outside surfaces of the transparent glass substrates SUB1 and SUB2.

[TFT substrate]

Constitution of the lower transparent glass substrate SUB1 (TFT substrate) will now be described in detail.

[Thin-film transistor TFT]

The thin-film transistor TFT so operates that the channel resistance decreases between the source and the drain when a positive bias is applied to the gate electrode GT thereof, and that the channel resistance increases when a zero bias is applied thereto.

Referring to FIG. 8, the thin-film transistor TFT includes the gate electrode GT, a gate insulating film GI, an i-type semiconductor layer AS made of i-type amorphous silicon (a-Si)(without doped with intrinsic conductivity-type-determining impurities), a pair of source electrode SD1 and drain electrode SD2. The source and drain are usually determined by the bias polarity therebetween. In the circuit of the liquid crystal display device, the polarity is inverted during the operation. It should therefore be noted that the source and drain are interchanged during the operation. In the following description, however, either of them is fixedly expressed as a source and the other as a drain only for convenience of description.

[Gate electrode GT]

The gate electrode GT is continuous to the gate signal line GL, and is formed by part of the region of the gate signal line GL. The gate electrode GT is a portion which extends over the active region of the thin-film transistor TFT, and is so formed as to completely cover the i-type semiconductor layer AS (as viewed from below). Therefore, in addition to its role, the gate electrode GT works to shield the i-type semiconductor layer AS from external light or backlight. In this embodiment, the gate electrode GT is composed of a single conductive film g1. As the conductive film g1, there can be used an aluminum film formed by, for example, sputtering and an anodically oxidized film AOF of aluminum is formed thereon.

[Scanning (gate) signal line GL]

The scanning (gate) signal line GL is constituted by a conductive film g1. The conductive film g1 forming the scanning signal line GL is formed through the same step as that of forming the conductive film g1 of the gate electrode GT and as a unitary structure. Through the scanning signal line GL, the gate voltage Vg is fed to the gate electrode GT from an external circuit. On the scanning signal line GL is formed an anodically oxidized film AOF of aluminum, too. A portion that intersects the video signal line DL is formed narrow to decrease the probability of short-circuiting relative to the video signal line, and is branched into two so that it can be separated by laser trimming in case it has short-circuited.

[Counter electrode CT]

The counter electrode CT is constituted by the conductive film g1 of the same layer as the gate electrode GT and the scanning signal line GL. On the counter electrode CT is formed an anodically oxidized film AOF of aluminum, too. The counter electrode CT is completely covered with the anodically oxidized film AOF and prevents short-circuit even when it is laid as close to the video signal line as possible. Moreover, they can be so arranged as to intersect. A counter voltage Vcom is applied to the counter electrode CT. In this embodiment, the counter voltage Vcom is set to a potential which is lower than an intermediate potential between a drive voltage Vdmin of a minimum level applied to the video signal line DL and a drive voltage Vdmax of a maximum level by a field-through voltage Δvs that generates when the thin-film transistor element TFT is turned off. When it is necessary to nearly halve the power source voltage of the integrated circuit used in the video signal driver unit, an AC voltage should be applied.

[Counter voltage signal line CL]

The counter voltage signal line CL is constituted by a conductive film g1. The conductive film g1 forming the counter voltage signal line CL is formed through the same step as that of forming the conductive film g1 of the gate electrode GT, scanning signal line GL and counter electrode CT, and as a unitary structure. Through the counter voltage signal line CL, the counter voltage Vcom is fed to the counter electrode CT from an external circuit. On the counter voltage signal line CL is formed an anodically oxidized film AOF of aluminum, too. A portion that intersects the video signal line DL is formed narrow to decrease the probability of short-circuiting relative to the video signal line like the case of the scanning signal line GL, and is branched into two so that it can be separated by laser trimming in case it has short-circuited.

[Insulating film GI]

The insulating film GI is used as a gate insulating film for imparting an electric field to the gate electrode GT and to the semiconductor layer AS in the thin-film transistor TFT. The gate insulating film GI is formed on the gate electrode GT and on the scanning signal line GL. As the gate insulating film GI, a silicon nitride film formed by, for example, plasma CVD having a thickness of 1200 to 2700 Å (about 2400 Å in this embodiment) is used. The gate insulating film GI is so formed as to surround the whole matrix unit AR, and the periphery is removed so that external connection terminals DTM, GTM are exposed. The insulating film GI contributes to electrically insulating the scanning signal line GL, counter voltage signal line CL and video signal line DL.

[i-Type semiconductor layer AS]

The i-type semiconductor layer AS is made of amorphous silicon and has a thickness of from 200 to 2200 Å (about 2000 Å in this-embodiment). A layer d0 is an N(+)-type amorphous silicon semiconductor layer doped with phosphorus (P) for ohmic contact, and is left only on a portion where the i-type semiconductor layer AS exists thereunder and conductive layers d1 (d2) exist thereover.

The i-type semiconductor layer AS is also provided at the portions (cross-over portion) where the scanning signal line GL, the counter voltage signal line CL and the video signal line DL intersect. The i-type semiconductor layer AS at the intersecting portion decreases the probability of short-circuiting at the portions where the scanning signal line GL, the counter voltage signal line CL and the video signal line DL intersect.

[Source electrode SD1, drain electrode SD2]

The source electrode SD1 and the drain electrode SD2 are, respectively, composed of the conductive film d1 that is in contact with the N(+)-type semiconductor layer d0 and the conductive film d2 formed thereon.

The conductive film d1 is composed of a chromium (Cr) film formed by sputtering and has a thickness of 500 to 1000 Å (about 600 Å in this embodiment). The Cr film is so formed as to have a thickness of not larger than about 2000 Å, since stress is produced as its thickness increases. The Cr film is used in order to improve the adhesiveness to the N(+)-type semiconductor layer d0 and to prevent aluminum conductive film d2 from diffusing into the N(+)-type semiconductor layer d0 (i.e., used as a so-called barrier layer). As the conductive film d1, there may be used a film of a high-melting metal (Mo, Ti, Ta or W) and a film of a high-melting metal silicide ($MOSi_2$, $TiSi_2$, $TaSi_2$ or $WSi_2$) in addition to Cr film.

The conductive film d2 having a thickness of 3000 to 5000 Å (about 4000 Å in this embodiment) is formed by Al sputtering. The Al film causes less stress than Cr film and can, hence, be so formed as to have a large thickness, in order to decrease the resistances of the source electrode SD1, drain electrode SD2 and video signal line DL, and to reliably extend over the steps caused by the gate electrode GT and the i-type semiconductor layer AS (to improve step coverage).

After the conductive films d1 and d2 are patterned using the same mask pattern, the N(+)-type semiconductor layer d0 is removed by using the same mask or by using the conductive films d1 and d2 as masks. That is, the N(+)-type semiconductor layer d0 remaining on the i-type semiconductor layer AS is removed in a self-alignment manner except the portions of the conductive films d1 and d2. In this case, the N(+)-type semiconductor layer d0 is removed by etching and, hence, the surface of the i-type semiconductor layer AS is etched to some extent, which, however, can be controlled by changing the etching time.

[Video signal line DL]

The video signal line DL is constituted by the first conductive film d1 and the second conductive film d2 of the same layers as the source electrode SD1 and the drain electrode SD2. Moreover, the video signal line DL is formed integrally with the drain electrode SD2.

[Pixel electrode PX]

The pixel electrode PX is constituted by the first conductive film d1 and the second conductive film d2 of the same layers as the source electrode SD1 and the drain electrode SD2. Moreover, the pixel electrode PX is formed integrally with the source electrode SD1.

[Storage capacitor Cstg]

The pixel electrode PX is so formed as to be superposed on the counter voltage signal line CL at an end on the side opposite to the end that is connected to the thin-film transistor TFT. As will be obvious from FIG. 9, this superposition constitutes a storage capacitor (capacitance element) Cstg having the pixel electrode PX as one electrode PL2 and having the counter voltage signal line CL as the other electrode PL1. The dielectric film of this storage capacitor Cstg is composed of the insulating film GT that is used as the gate insulating film of the thin-film transistor TFT and the anodically oxidized film AOF.

As shown in FIG. 2, the storage capacitor Cstg is formed, when viewed from above, on an expanded portion of the conductive film g1 of the counter voltage signal line CL.

In this case, the electrode located under the insulative film GI of the storage capacitor Cstg is made of aluminum having anodized surface. Therefore, the storage capacitor hardly causes defect (short-circuiting to the electrode of the upper side) that is caused by so-called whiskers of aluminum.

[Protective film PSV1]

A protective film PSV1 is provided on the thin-film transistor TFT. The protective film PSV1 is formed chiefly for protecting the thin-film transistor TFT from moisture and the like and must have a high transparency and a good resistance against humidity. The protective film PSV1 is composed of, for example, a silicon oxide film or a silicon nitride film formed by a plasma CVD device, and has a thickness of about 1 µm.

The protective film PSV1 is so formed as to surround the whole matrix unit AR, and its periphery is removed so that the external connection terminals DTM and GTM are exposed. As for the thicknesses of the protective film PSV1 and the gate insulative film GI, the former film is formed so as to have a large thickness in consideration of the effect of protection and the latter film is formed so as to have a small thickness in consideration of the mutual conductance gm to the transistor. Therefore, the protective film PSV1 that exhibits a high protection effect is formed in a size larger than the gate insulative film GI in order to protect even the peripheral portions as wide as possible.

[Color filter substrate]

Referring to FIGS. 2 and 7 again, the constitution of the upper transparent glass substrate SUB2 (color filter substrate) will now be described in detail.

[Light-shielding film BM]

On the upper transparent glass substrate SUB2 is formed a light-shielding BM (so-called black matrix), so that undesired light transmitted through the gaps (gaps other than the gap between the pixel electrode PX and the counter electrode CT) does not go to the side of the display surface to deteriorate the contrast and the like. The light-shielding film BM also serves to prevent external light or backlight from falling on the i-type semiconductor layer AS. That is, the i-type semiconductor layer AS of the thin-film transistor TFT is sandwiched by the light-shielding film BM and the gate electrode GT of a large size located on the upper and lower sides, and so does not receive natural light or backlight from the external side.

Figure 3:
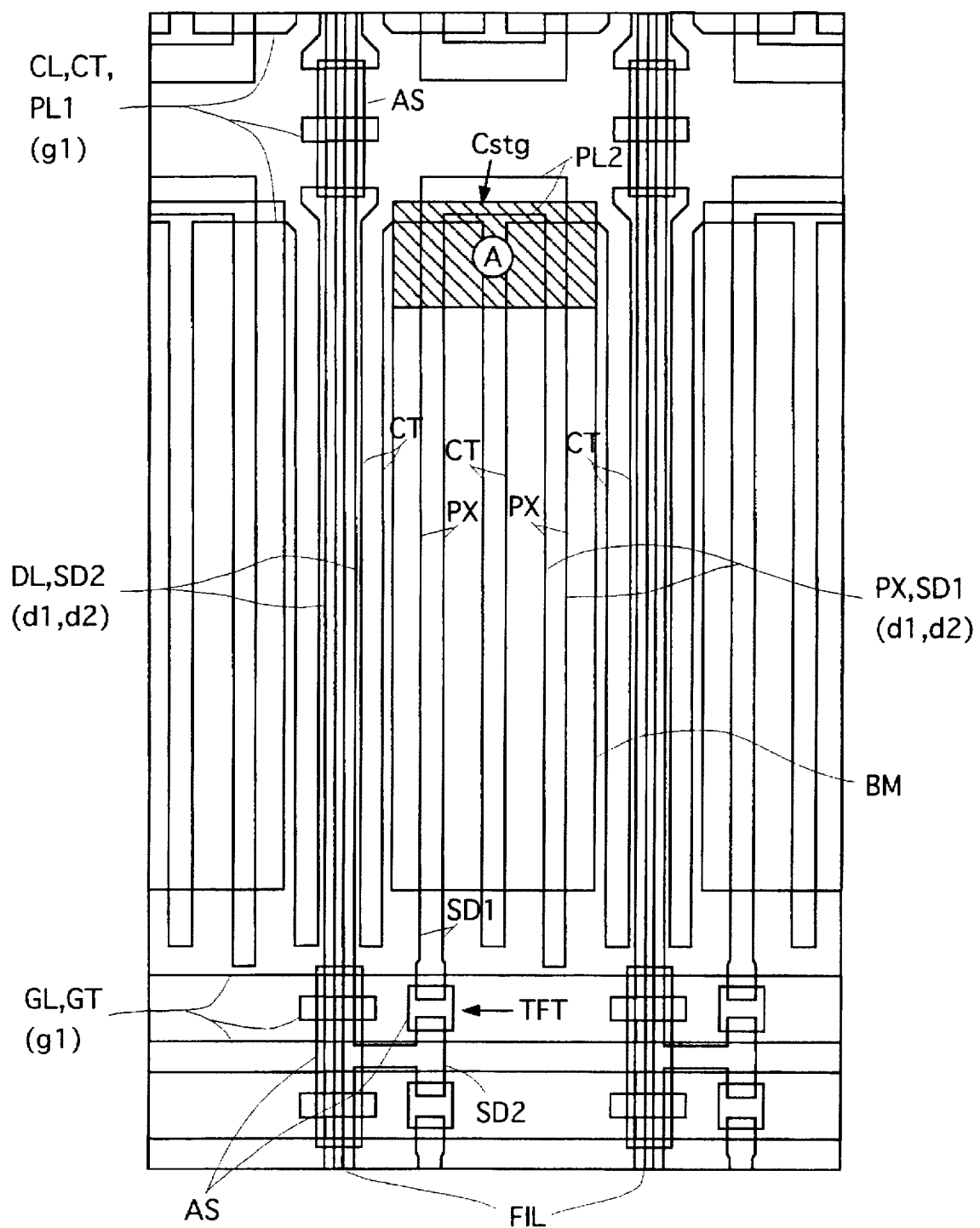
FIG. 3 is a diagram illustrating a pattern of a black matrix of embodiment 1.

A polygonal contour line of the light-shielding film BM shown in FIG. 2 represents an opening inside which no light-shielding film BM is formed. This is only an example of the contour line. The pattern may be the one shown in FIG. 3 when it is desirable to form a large opening portion. In the region A of FIG. 3, the direction of the electric field is disordered and the display of this portion corresponds to the video data in the pixel in such a 1-to-1 manner that the display is black when this portion is black, and is white when this portion is white. Therefore, this portion can be utilized as part of the display.

Furthermore, the boundary in the up-and-down direction of the drawing is determined by the precision of registration of the upper and lower substrates. When the precision registration is better than the width of the counter electrodes CT located on both sides of the video signal line DL, the opening portion can be widened by setting the boundary line within the width of the counter electrode.

The light-shielding film BM has light-shielding property against light, and is composed of a highly insulating film so as not to affect the electric field between the pixel electrode PX and the counter electrode CT. This enables the electric field component in parallel with the surface of the substrate to be effectively applied to the liquid crystal layer, and makes it possible to lower the voltage for driving liquid crystals. The light-shielding film BM is made of a material obtained by mixing a black pigment into a resist material, and has a thickness of about 1.2 µm. As another embodiment, there can be used a material obtained by mixing palladium and electroless-plated nickel into the resist material.

In this case, the gap can be increased to some extent between the pixel electrode PX and the counter electrode CT, making it possible to increase the aperture ratio.

The light-shielding film BM is formed like a lattice surrounding the pixels. The lattice partitions the effective display area of each pixel. Therefore, the contour of each pixel is clearly shown by the light-shielding film BM. That is, the light-shielding film BM has the two functions, i.e., a black matrix and shielding against light that falls on the i-type semiconductor layer AS.

The light-shielding film BM is formed like a frame even on the peripheral portions, and has a pattern that is continuous to the pattern of the matrix unit that has a plurality of dot-like openings. The light-shielding film BM on the peripheral portions outwardly extends over the sealing portion SL to prevent the leakage of light such as light reflected by a device on which the display is mounted, such as a personal computer, from entering the matrix unit. The light-shielding film BM is short of the edges of the substrate SUB2 by about 0.3 to 1.0 mm, and does not extend to the cut regions of the substrate SUB2.

[Color filter FIL]

The color filter FIL forms stripes of a repetition of red, green and blue lines at positions facing the pixels. The color filter FIL is so formed as to be superposed on the edge portions of the light-shielding film BM.

The color filter FIL is formed as described below. First, a dyeable member such as acrylic resin is formed on the surface of the upper transparent glass substrate SUB2, and is then removed by photolithographic technology, leaving it on the red filter-forming regions. Then, the dyeable member is dyed with a red dye and is fixed to form a red filter R. Next, a green filter G and a blue filter B are formed successively through the same steps.

[Overcoat film OC]

The overcoat film OC is provided to prevent the dye of the color filter FIL from leaking to the liquid crystals LC and to flatten the steps produced by the color filter FIL and light-shielding film BM. The overcoat film OC is formed by using a transparent resin material such as acrylic resin, epoxy resin or the like resins.

[Liquid crystal layer and polarizer plate]

The liquid crystal layer, orientation film and polarizer plate will be described below.

[Liquid crystal layer]

As the liquid crystal materials LC, there are used nematic liquid crystals having a positive dielectric constant anisotropy $\Delta\epsilon$ of 13.2 and a refractive index anisotropy $\Delta n$ of 0.081 (589 nm at 20° C.), and nematic liquid crystals having a negative dielectric constant anisotropy $\Delta\epsilon$ of −7.3 and a refractive index anisotropy $\Delta n$ of 0.053 (589 nm at 20°). The liquid crystal layer has a thickness (gap) of not smaller than 2.8 µm but not larger than 4.5 µm when it has a positive dielectric constant anisotropy $\Delta\epsilon$.

In this case, there is obtained a transmission factor that does not almost change with the wavelengths within a range of visible light when the retardation $\Delta n \cdot d$ is not smaller than 0.25 µm but is not larger than 0.32 µm, and most of the liquid crystals having a positive dielectric constant anisotropy $\Delta\epsilon$ have a birefringence anisotropy $\Delta n$ which is not smaller than 0.07 but is not larger than 0.09.

On the other hand, the liquid crystal layer has a thickness (gap) which is not smaller than 4.2 µm but is not larger than 8.0 µm when it has a negative dielectric constant anisotropy $\Delta\epsilon$. The reason is that it is necessary to determine the retardation $\Delta n \cdot d$ within a range of not smaller than 0.25 µm but not larger than 0.32 µm, like the case of the liquid crystals having a positive dielectric constant anisotropy $\Delta\epsilon$. In this case, most of the liquid crystals having a negative dielectric constant anisotropy $\Delta\epsilon$ have a birefringence anisotropy $\Delta n$ of not smaller than 0.04 but not larger than 0.06.

A combination of the orientation films and the polarizer plates that will be described later makes it possible to obtain a maximum transmission factor when the liquid crystal molecules are turned by about 45° toward the direction of the electric field EDR from the rubbing direction RDR.

The thickness (gap) of the liquid crystal layer is controlled by using polymer beads.

There is no particular limitation on the liquid crystal material LC so long as it is a nematic liquid crystal material. The drive voltage can be decreased with an increase in the value of the dielectric constant anisotropy $\Delta\epsilon$. The thickness (gap) of the liquid crystal layer can be increased with a decrease in the refractive index anisotropy $\Delta n$, in order to shorten the time to pour the liquid crystals and to decrease variation in the gap.

[Orientation film]

Figure 18:
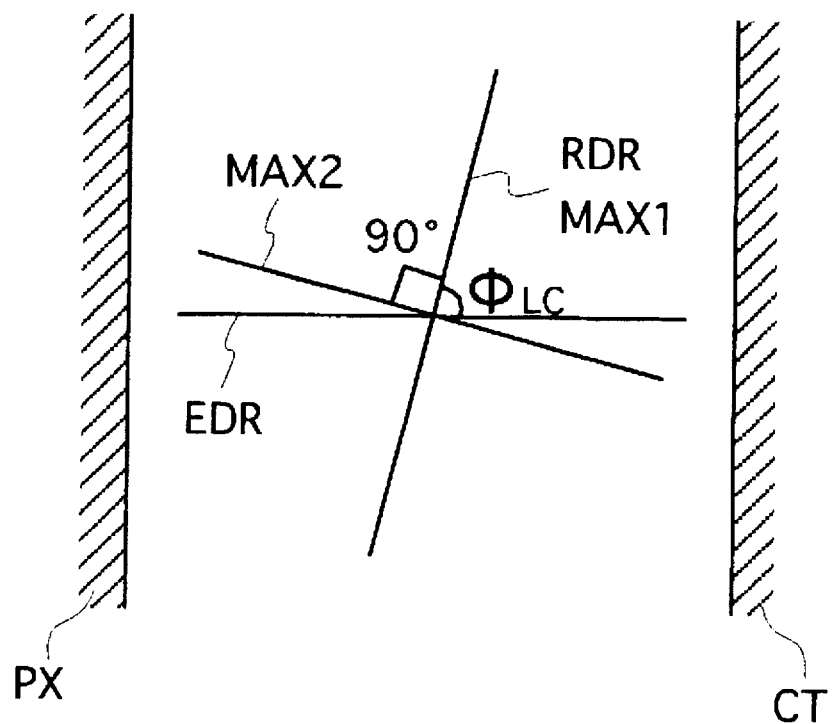
FIG. 18 is a diagram illustrating the relationships among the direction in which the electric field is applied, the direction of rubbing and the transmission axis of a polarizer plate.

The orientation film ORI is made of a polyimide. The upper and lower substrates have rubbing directions RDR which are in parallel with each other and form an angle of 75° with respect to the direction of the applied electric field EDR. FIG. 18 illustrates their relationships.

The angle formed by the rubbing direction RDR and the direction of the applied electric field EDR may be larger than 45° but is smaller than 90° when the liquid crystal material has a positive dielectric constant anisotropy $\Delta\epsilon$, and may be larger than 0° but smaller than 45° when the liquid crystal material has a negative dielectric constant anisotropy $\Delta\epsilon$.

[Polarizer plate]

FIG. 18 illustrates the relationships of the direction of the applied electric field, rubbing direction and transmission axes of the polarizer plates.

The polarizer plates POL that are used are G1220DU manufactured by Nitto Denko Co. The transmission axis MAX1 of the lower polarizer plate POL1 is appproximately parallel with the rubbing direction RDR, and intersect the transmission axis MAX2 of the upper polarizer plate POL2 at approximate right angles. FIG. 18 illustrates their relationships.

There are thus obtained normally-closed characteristics such that the transmission factor increases with an increase in the voltage (between the pixel electrode PX and the counter electrode CT) applied to the pixels.

[Constitution of the peripheries of the matrix]

Figure 10:
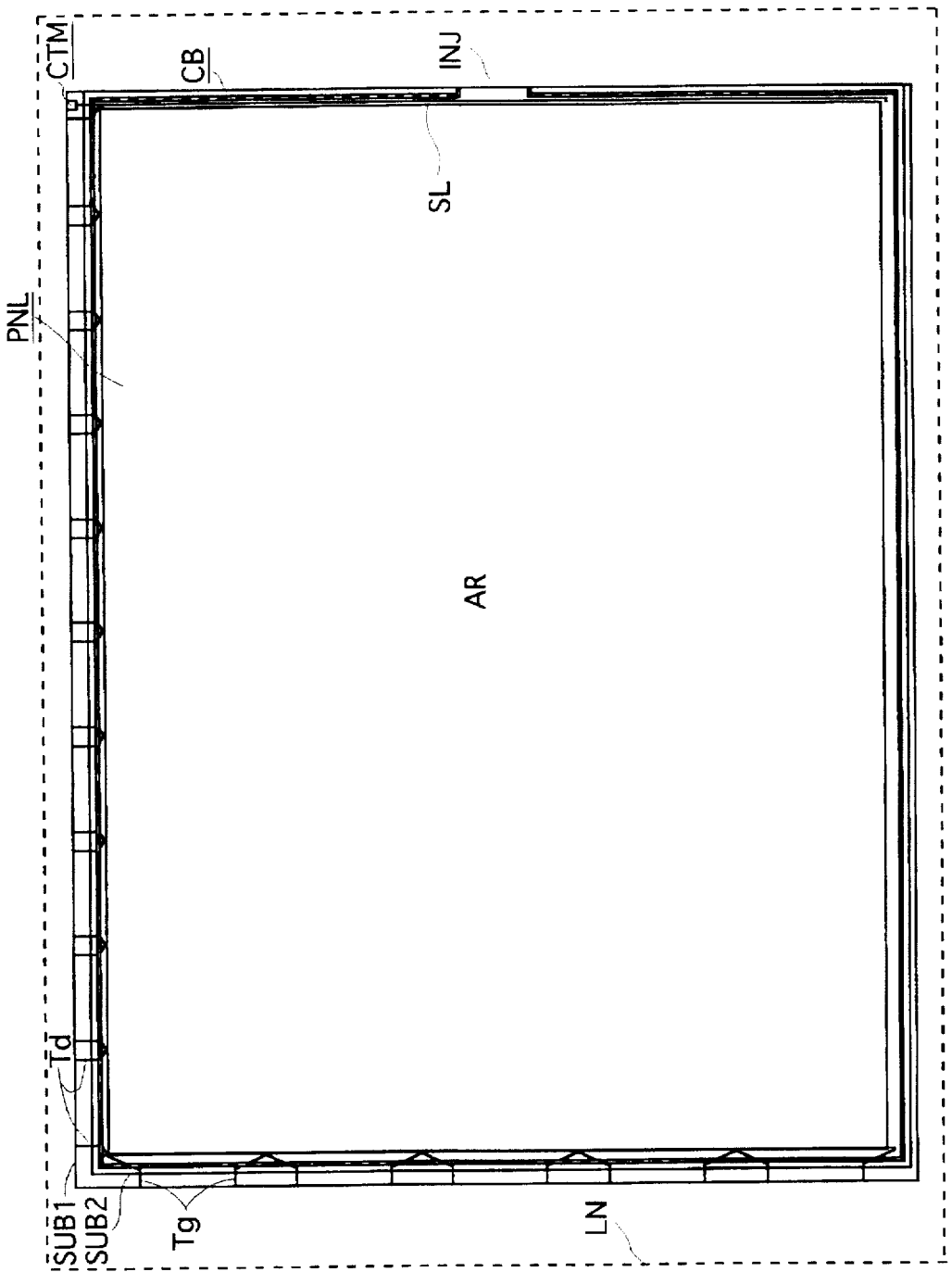
FIG. 10 is a plan view for explaining the constitution of the peripheries of a matrix of the display panel.
Figure 11:
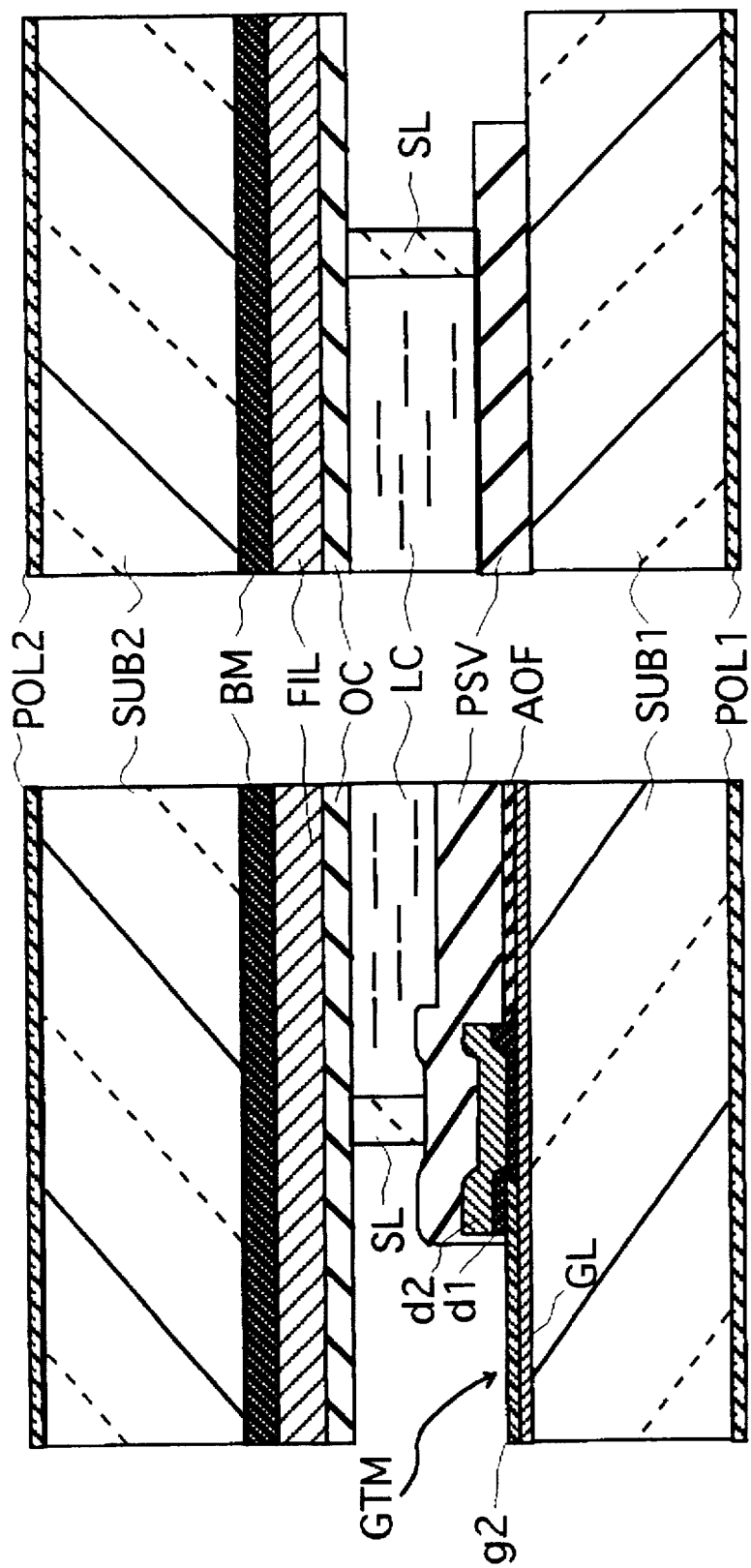
FIG. 11 is a sectional view illustrating panel edge portions with gate signal terminals on the left side but without external connection terminals on the right side.

FIG. 10 is a plan view illustrating essential portions of the peripheries of the matrix (AR) of a display panel PNL that includes the upper and lower glass substrates SUB1 and SUB2. FIG. 11 is a sectional view illustrating on the left side the external connection terminal GTM to be connected to the scanning circuit and its vicinity, and illustrating on the right side the sealing portion where there is no external connection terminal and its vicinity.

When the panel that is to be produced is of a small size, a plurality of devices are fabricated on a sheet of glass, and are divided in order to improve the throughput. When the panel is of a large size, a glass plate of standard size for common use of the production facility is worked and divided into a size that may meet the type. In either case, the glass is cut after having been processed through predetermined steps. FIGS. 10 and 11 illustrate the latter example, and illustrate the upper and lower substrates SUB1 and SUB2 after they have been cut, wherein LN represents edges of the two substrates before being cut. In the finished state in either case, the upper substrate SUB2 is smaller than the lower substrate SUB1, so that the portions where there exist external connection terminal groups Tg, Td and terminal CTM (upper side and left side in the drawings) are exposed. The terminal groups Tg, Td are named for pluralities of terminals GTM for connection to the scanning circuit, terminals DTM for connection to the video signal circuit, and lead-out wirings thereof in units of tape carrier package TCP (6, 7) on which the integrated circuit chip CHI is mounted. The lead-out wirings from the matrix unit of each group to the external connection terminal unit are slanted toward both sides. The reason is that the terminals DTM, GTM of the display panel PNL are in agreement with the pitch of arrangement of the packages TCP and the pitch of connection terminals in the packages TCP. The counter electrode terminal CTM is for applying a counter voltage to the counter electrode CT from the external circuit. The counter electrode signal lines CL of the matrix unit are led out to the opposite side (right side of the drawing) of the terminal GTM for the scanning circuit, and the counter voltage signal lines are collected together through the common bus line CB and are connected to the counter electrode terminals CTM.

Between the transparent glass substrates SUB1 and SUB2 is formed a sealing pattern SL except a liquid crystal filling port INJ in order to pour the liquid crystals LC. The sealing material is, for example, an epoxy resin.

The orientation films ORI1 and ORI2 are formed on the inside of the sealing pattern SL. The polarizer plates POL1 and POL2 are formed on the outer surfaces of the lower transparent glass substrate SUB1 and the upper transparent glass substrate SUB2. The liquid crystals LC are sealed in the regions partitioned by the sealing pattern SL between the lower orientation film ORI1 and the upper orientation film ORI2 that determine the orientation of the liquid crystal molecules. The lower orientation film ORI1 is formed on the protective film PSV1 on the side of the lower transparent glass substrate SUB1.

In the liquid crystal display device, various layers are stacked separately on the lower transparent glass substrate SUB1 and on the upper transparent glass substrate SUB2, the sealing pattern SL is formed on the substrate SUB2, the lower transparent glass substrate SUB1 and the upper transparent glass substrate SUB2 are superposed one upon the other, the liquid crystals LC are poured through the opening INJ formed in the sealing member SL, and the filling port INJ is sealed with an epoxy resin or the like resin. The upper and lower substrates are then cut to obtain the liquid crystal display device.

[Gate terminal unit]

Figure 12A:
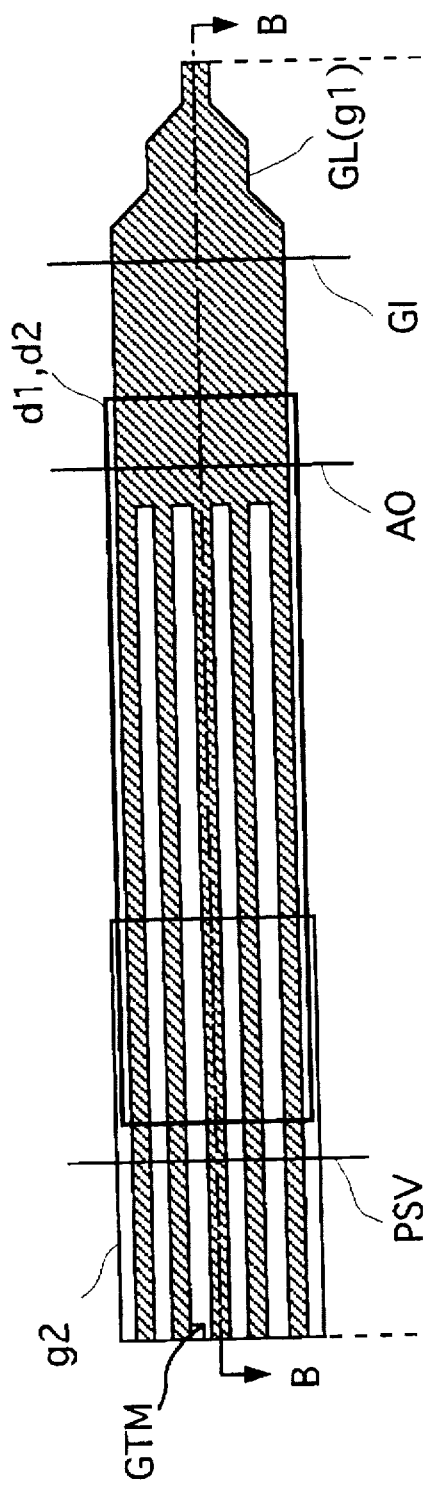
FIGS. 12A and 12B are a plan view and a sectional view illustrating the area where a gate terminal GTM is connected to a gate wiring GL.
Figure 12B:
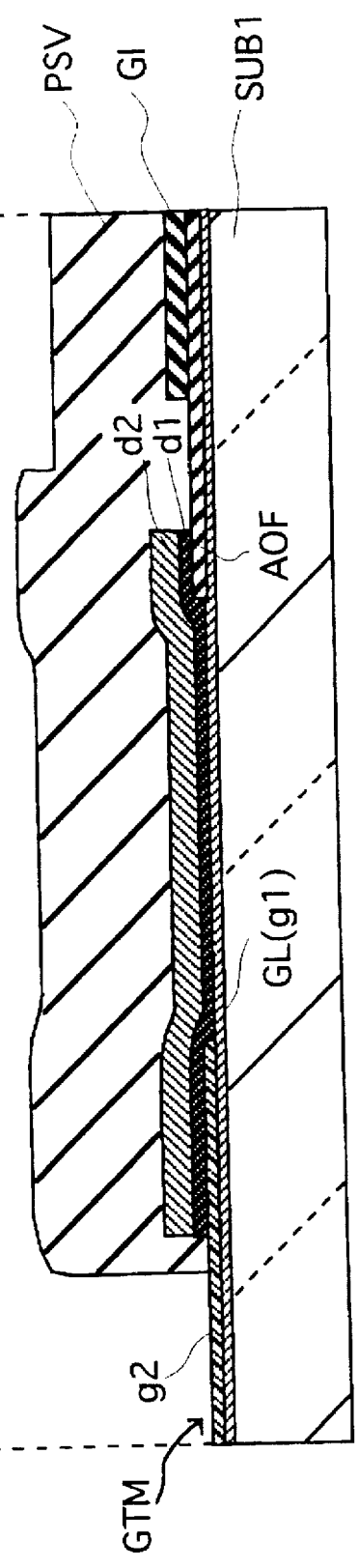

FIGS. 12A and 12B are views illustrating the connection structure from the scanning signal lines GL of the display matrix to the external connection terminals GTM thereof, wherein FIG. 12A is a plan view and FIG. 12B is a sectional view cut along the line B—B in FIG. 12A. A slant wiring is represented by a straight line only for convenience of illustration.

Symbol AO denotes the boundary line of the direct photoresist drawing or, in other words, a photoresist pattern of selective anodic oxidation. Therefore, the photoresist is removed after the anodic oxidation and the pattern AO that is shown does not remain in the finished product. As shown in the sectional view, however, the oxide film AOF is selectively formed on the gate wiring GL, and its trace remains. In the plan view, the left side with respect to the boundary line AO of photoresist is covered with a resist so as not to undergo anodic oxidation, and the right side is not covered with the resist and undergoes the anodic oxidation. The anodically oxidized Al layer g1 has an oxide $Al_2O_3$ film AOF formed on the surface thereof, and the conductive portion of the lower side thereof has a decreased volume. The anodic oxidation is carried out by determining a suitable period of time and a voltage so that the conductive portion may remain.

In the drawing, the aluminum layer g1 is hatched for easy comprehension but the region that is not anodically oxidized is patterned like comb teeth. The reason is that whiskers develop on the surface when the aluminum layer has a large width. Therefore, each line pattern is formed narrow, and a plurality of line patterns are bundled in parallel to minimize the probability of breakage and the decrease of electric conductivity while preventing the development of whiskers.

The gate terminal GTM comprises the aluminum layer g1 and a transparent conductive layer g2 that protects the surface thereof and improves the reliability of connection to the TCP (tape carrier package). The transparent conductive film g2 is a film (indium-tin-oxide ITO: Nesa film) formed by sputtering and has a thickness of 1000 to 2000 Å (about 1400 Å in this embodiment). The conductive layers d1 and d2 formed on the aluminum layer g1 and on the side surfaces thereof, connect a chromium layer d1 to both the aluminum layer and the transparent conductive layer g2 in order to compensate poor connection between the aluminum layer and the transparent conductive layer g2 and to decrease the connection resistance. The conductive layer d2 remains since it is formed using the same mask as the one for forming the conductive layer d1.

In the plan view, the gate insulative film GI is formed on the right side of the boundary line, the protective film PSV1 is formed on the right side of the boundary line, and the terminal unit GTM located at the left end is exposed so that it can be in ohmic contact with an external circuit. The drawing illustrates only a pair of gate line GL and gate terminal. In practice, however, pairs are arranged on the upper and lower sides as shown in FIGS. 12A and 12B, constituting a terminal group Tg (FIG. 10). In the production process, the left end of the gate terminal extends beyond the region for cutting the substrates and is short-circuited by the wiring SHg (not shown). In the production process, this short-circuiting line SHg serves to feed electric power during the anodic oxidation and to prevent the electrostatic breakdown at the time of rubbing the orientation film ORI1.

[Drain terminal DTM]

Figures 13A, 13B:
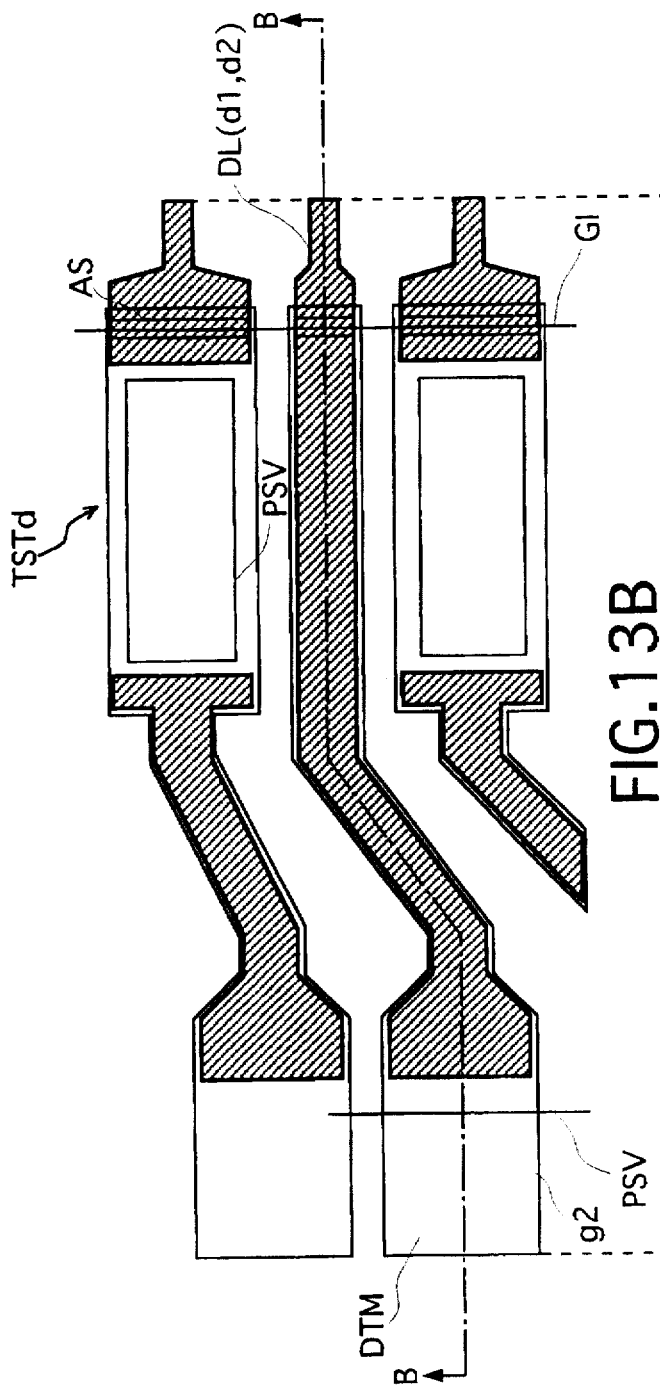
FIGS. 13A and 13B are a plan view and a sectional view illustrating the area where a drain terminal DTM is connected to a video signal line DL.

FIGS. 13A and 13B are views illustrating the connection of the video signal line DL to the external connection terminal DTM, wherein FIG. 13A is a plan view and FIG. 13B is a sectional view cut along the line B—B in FIG. 13A. These drawings correspond to the upper portion of FIG. 19. Since the directions of the drawings are changed for convenience, the direction of left end corresponds to the upper end of the substrate SUB1.

Symbol TSTd denotes a check terminal to which no external circuit is connected but which is broadened to be wider than the wiring so that it can be touched by a probe needle or the like. Similarly, the drain terminal DTM is broadened to be wider than the wiring so that it can be connected to an external circuit. The drain terminals DTM for connection to external circuit are arranged in the up-and-down direction, constitute a terminal group Td (subscript is omitted) as shown in FIG. 10, extend beyond the cutting line of the substrate SUB1, and are all short-circuited by a wiring SHd (not shown) to prevent the electrostatic breakdown during the production process. The check terminal TSTd is formed on every other video signal lines DL as shown in FIGS. 13A and 13B.

The drain connection terminal DTM is formed by a single transparent conductive layer g2 and is connected to the video signal line DL at a portion where the gate insulative film GI is removed. The semiconductor layer AS formed on the end of the gate insulative film GI serves to etch the edge of the gate insulative film GI in a tapered form. On the terminal DTM, the protective film PSV has been removed as a matter of course so that connection to the external circuit can be made.

The lead-out wiring from the matrix unit to the drain terminal DTM has layers d1, d2 of the same level as that of the video signal line DL, that are constituted in the protective film PSV and are connected to the transparent conductive film g2 in the protective film PSV. The reason is that it is necessary to protect the aluminum layer d2 that easily undergo electrolytic corrosion, as much as possible using the protective film PSV and the sealing pattern SL.

[Counter electrode terminal CTM]

Figure 14A:
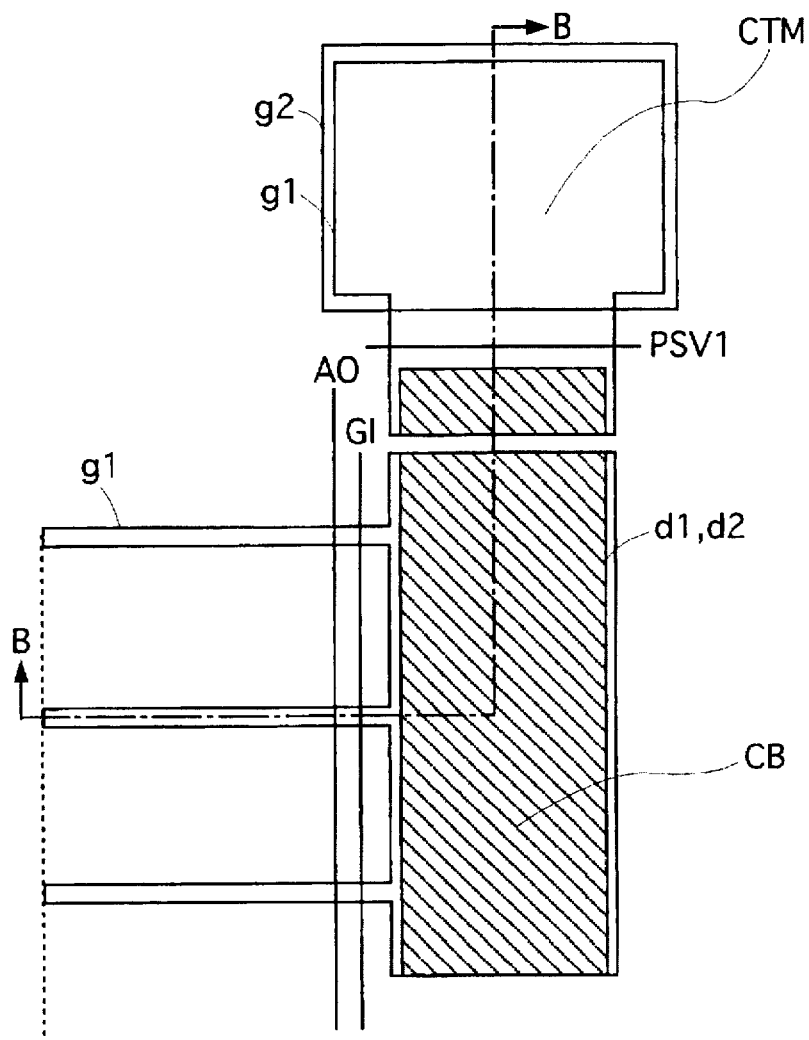
FIGS. 14A and 14B are a plan view and a sectional view illustrating the area where a common electrode terminal CTM, a common bus line CB and a common voltage signal line CL are connected together.
Figure 14B:
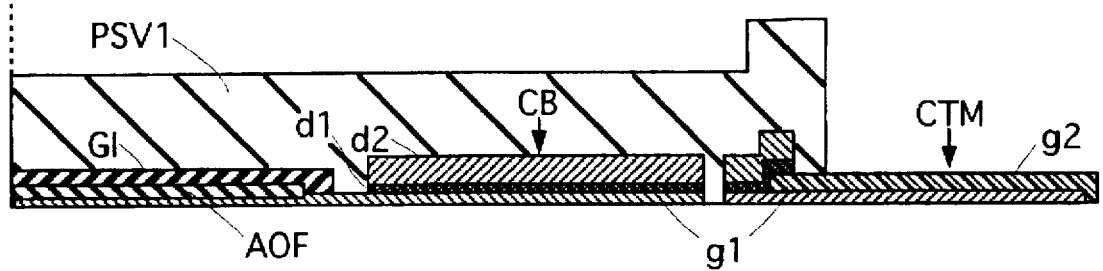

FIGS. 14A and 14B are views illustrating the connection from the counter electrode signal line CL to the external connection terminal CTM, wherein FIG. 14A is a plan view and FIG. 14B is a sectional view cut along the line B—B of FIG. 14A. These drawings correspond to the left upper portion of FIG. 19.

The counter voltage signal lines CL are collected together by the common bus line CB and are led out to the counter electrode terminals CTM. The common bus line CB has a structure in which the conductive layer d1 and the conductive layer d2 are formed on the conductive layer g1. The reason is that the resistance of the common bus line CB is decreased so that the counter voltage is sufficiently fed to the counter voltage signal lines CL from the external circuit.

Accordingly, the counter voltage is sufficiently transmitted even to the terminal pixels, making it possible to reduce the occurrence of crosstalk (particularly, crosstalk in the right-and-left direction on the screen) caused by distortion of the voltage of the counter electrodes CT in response to the video signals fed to the video signal lines DL. This structure has a feature that the resistance of the common bus line is decreased without additionally providing conductive layers. The conductive layer g1 of the common bus line CB is not anodized so that it can be electrically connected to the conductive layer d1 and to the conductive layer d2. Besides, the conductive layer g1 is exposed through the gate insulative film GI.

The counter electrode terminal CTM has a structure in which the transparent conductive layer g2 is formed on the conductive layer g1. The surface is protected by the transparent conductive layer g2, and the conductive layer g1 is covered with the transparent conductive layer g2 having a good durability in order to prevent electrolytic corrosion.

In the above-mentioned embodiment, the conductive layer d1 and the conductive layer d2 are formed on the common bus line CB. The invention, however, is in no way limited to these conductive layers only. Even in this case, it is possible to decrease the resistance of the common bus line CB.

[Method of fabrication]

Figure 17:
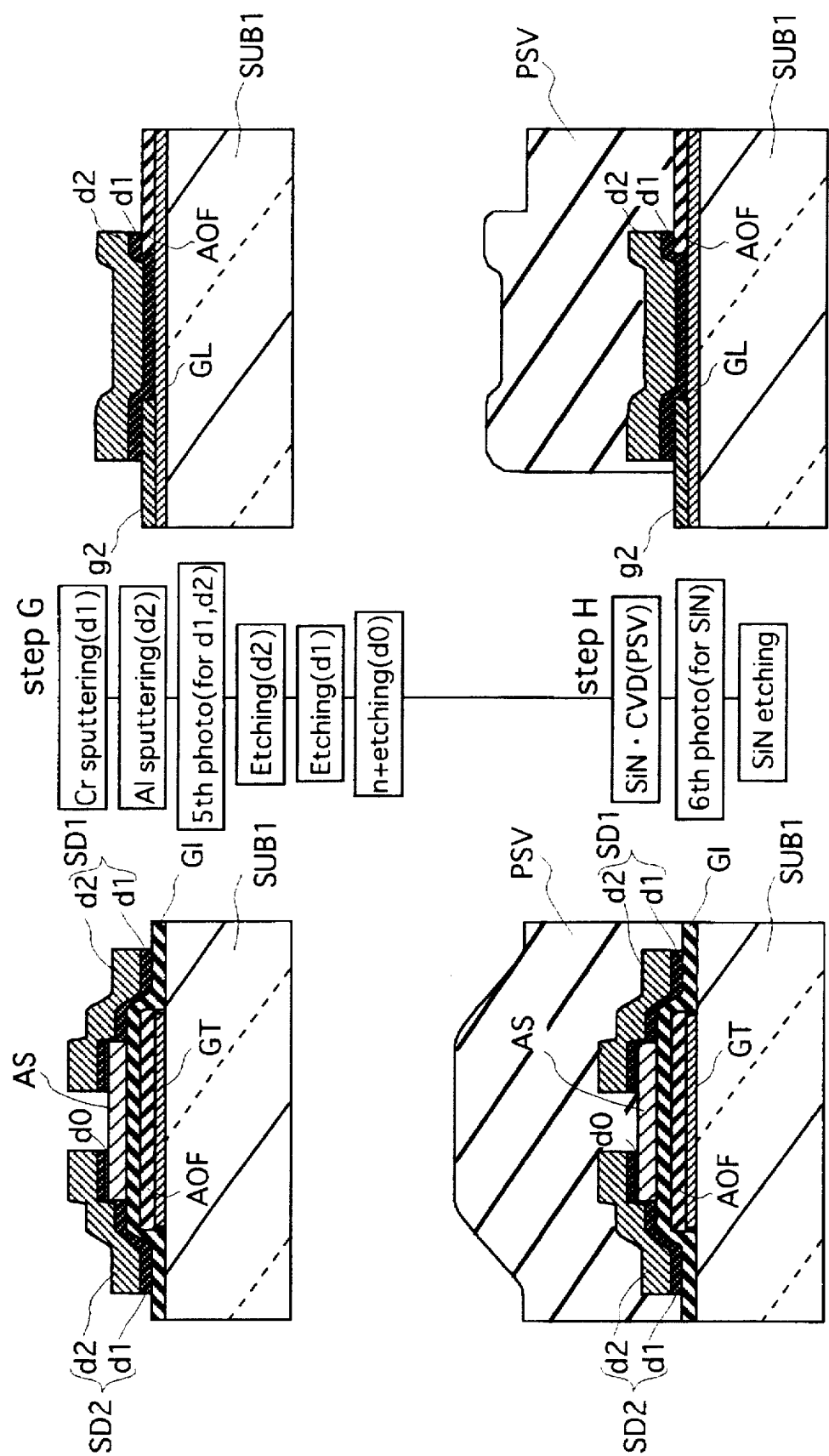
FIG. 17 is a flow chart of a sectional view of the pixel and the gate terminal, illustrating the steps G to H of fabricating the substrate SUB1.

A method of fabricating the substrate SUB1 of the above-mentioned liquid crystal display device will now be described with reference to FIGS. 15 to 17. In these drawings, characters at the center represent abbreviations of the names of the steps, wherein the left side represents the portion of the thin-film transistor shown in FIG. 8, and the right side illustrates the flow of process near the gate terminal shown in cross sections of FIGS. 12A and 12B. Except steps B and D, steps A to I are divided according to the photographic treatment. The sectional view of each step represents a stage after the photographic treatment is finished and the photoresist is removed. The photographic treatment in this embodiment means a series of operations from the application of the photoresist to the developing thereof through selective exposure by using a mask. The treatment will now be described for each of the sectionalized steps.

Step A. FIG. 15

A conductive film g1 made of Al1'Pd, Al—Si, Al—Ta, Al—Ti—Ta or the like having a thickness of 3000 Å is formed by sputtering on the lower transparent glass substrate SUB1 made of the AN635 glass (trade name). After the photographic treatment, the conductive film g1 is selectively etched by using a mixed acid solution of phosphoric acid, nitric acid and glacial acetic acid. There are thus formed gate electrodes GT, scanning signal lines GL, counter electrodes CT, counter voltage signal lines CL, electrodes PL1, gate terminals GTM, a first conductive layer of common bus line CB, a first conductive layer of counter electrode terminals CTM, an anodically oxidized bus line SHg (not shown) for connecting the gate terminals GTM, and anodically oxidized pads (not shown) connected to the anodically oxidized bus line SHg.

Step B. FIG. 15

After the anodically oxidized mask AO is formed by direct drawing, the substrate SUB1 is dipped in an anodically oxidizing solution which is obtained by diluting a solution containing 3% of tartaric acid of which the pH value is adjusted with ammonia to 6.25±0.05, with an ethylene glycol solution into 1:9, and the anodizing current density is adjusted to 0.5 mA/cm$^2$ (constant-current anodization). The anodic oxidation is carried out until an anodizing voltage of 125 V is reached, which is necessary for obtaining an Al$_2$O$_3$ film having a predetermined thickness. Desirably, this state is then held for several tens of minutes (constant-voltage anodization). This is important in view of forming a uniform Al$_2$O$_3$ film. Thus, the conductive film g1 is anodically oxidized, and anodically oxidized film AOF having a thickness of 1800 Å is formed on the gate electrodes GT, scanning signal lines GL, counter electrodes CT, counter voltage signal lines CL and electrodes PL1.

Step C. FIG. 15

The transparent conductive film g2 of the ITO film having a thickness of 1400 Å is formed by sputtering. After the photographic treatment, the transparent conductive film g2 is etched with a mixed acid solution of hydrochloric acid and nitric acid as an etching solution, in order to form the uppermost layer of the gate terminal GTM, and second conductive layers of the drain terminal DTM and the counter electrode terminal CTM.

Step D. FIG. 16

Ammonia gas, silane gas and nitrogen gas are introduced into a plasma CVD apparatus to form a silicon nitride film having a thickness of 2200 Å. Then, silane gas and hydrogen gas are introduced into the plasma CVD apparatus to form an i-type amorphous silicon film having a thickness of 2000 Å. Thereafter, hydrogen gas and phosphine gas are introduced into the plasma CVD apparatus to form an N(+)-type amorphous silicon film having a thickness of 300 Å.

Step E. FIG. 16

After the photographic treatment, the N(+)-type amorphous silicon film and i-type amorphous silicon film are selectively etched by using SF$_6$ and CCl$_4$ as dry etching gases, in order to form islands of the i-type semiconductor layer AS.

Step F. FIG. 16

After the photographic treatment, the silicon nitride film is selectively etched by using SF$_6$ as a dry etching gas.

Step G. FIG. 17

The conductive film d1 made of chromium and having a thickness of 600 Å is formed by sputtering, and the conductive film d2 made of Al—Pd, Al—Si, Al—Ta, Al—Ti—Ta or the like having a thickness of 4000 Å is formed by sputtering. After the photographic treatment, the conductive film d2 is etched using the same solution as the one used in step A and the conductive film d1 is etched using a ceric ammonium nitrate solution, in order to form video signal lines DL, source electrodes SD1, drain electrodes SD2, pixel electrodes PX, electrodes PL2, second and third conductive layers of common bus line CB, and bus line SHd (not shown) for short-circuiting the drain terminals DTM. Next, CCl$_4$ and SF$_6$ gases are introduced into the dry etching device in order to etch the N(+)-type amorphous silicon film and, hence, to selectively remove the N(+)-type semiconductor layer d0 between the source and the drain.

Step H. FIG. 17

Ammonia gas, silane gas and nitrogen gas are introduced into the plasma CVD apparatus to provide a silicon nitride film having a thickness of 1 μm. After the photographic treatment, the silicon nitride film is selectively etched by a photoengraving technology by using SF$_6$ as a dry etching gas, in order to form the protective film PSV.

[Equivalent circuit of the whole display device]

Figure 19:
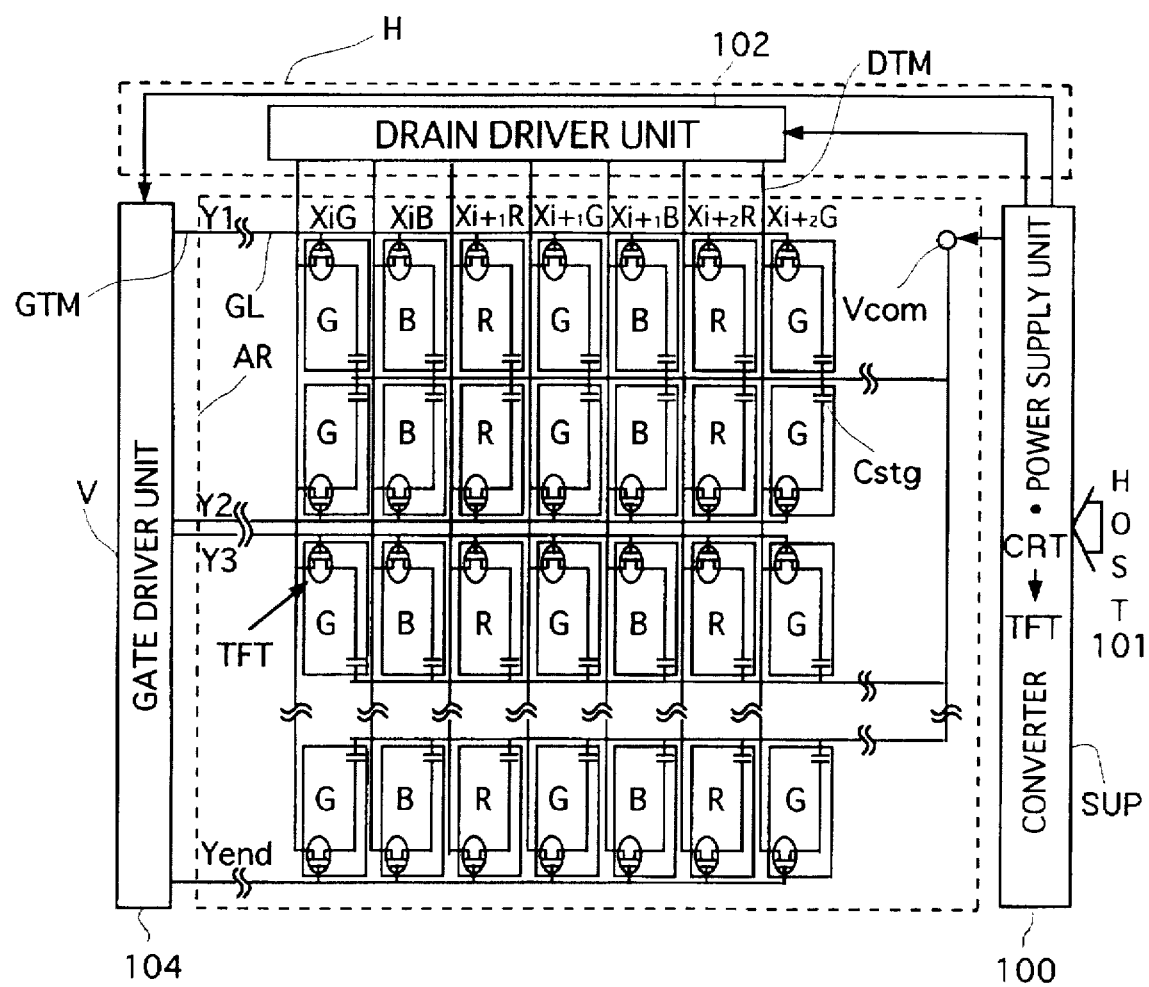
FIG. 19 is a diagram of a circuit illustrating a matrix unit and the peripheries thereof of a active matrix-type color liquid crystal display device of the present invention.

FIG. 19 is a diagram of connection of an equivalent circuit of the display matrix unit and of the peripheral circuits thereof. This circuit diagram is so drawn as to correspond to the practical geometrical arrangement, wherein AR denotes a matrix array in which a plurality of pixels are arranged in a two-dimensional configuration.

In the drawing, symbol X represents video signal lines DL, and subscripts G, B and R are added to green, blue and red pixels, respectively. Symbol Y denotes scanning signal lines GL, and subscripts 1, 2, 3, ———, end are added in the order of scanning timings.

The scanning signal lines Y (subscript is omitted) are connected to a vertical scanning circuit V, and the video signal lines X (subscript is omitted) are connected to a video signal driver unit H.

SUP denotes a circuit inclusive of a power-source circuit for producing a plurality of voltages that are produced by dividing the voltage of a voltage source and stabilized, and a circuit for converting the information for CRT (cathode-ray tube) from a host (higher order arithmetic unit) into information for TFT liquid crystal display device.

[Driving method]

Figure 20:
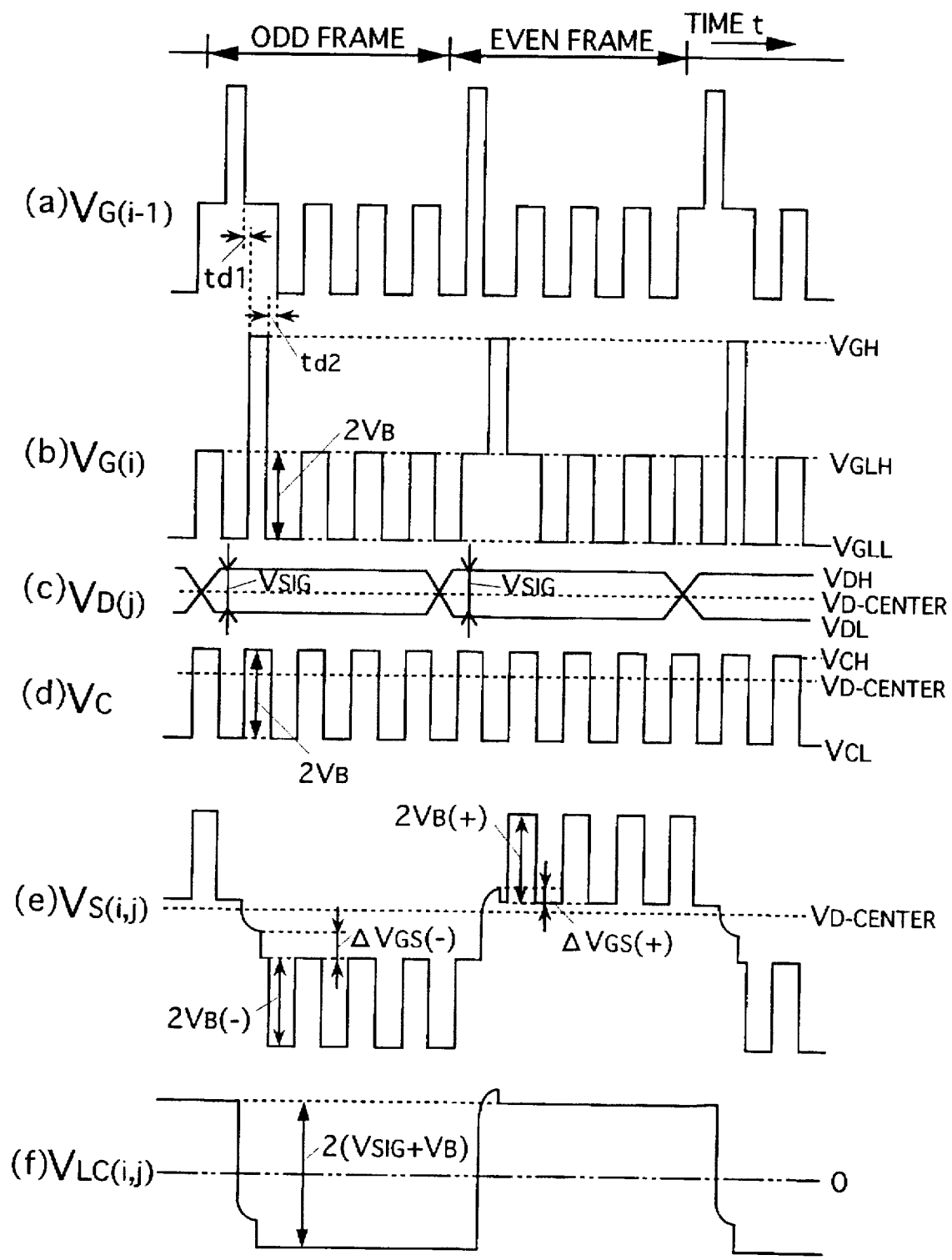
FIG. 20 is a diagram illustrating waveforms for driving the active matrix-type color liquid crystal display device of the present invention.

FIG. 20 illustrates waveforms for driving the liquid crystal display device of the present invention. The counter voltage has an AC rectangular waveform and has two values, i.e., Vch and Vcl. In synchronism therewith, the non-selection voltage of the scanning signals Vg(i-1) and Vg(i) is changed into two values, i.e., Vglh and Vgll for every scanning period. The amplitude of the counter voltage is set to be equal to the amplitude of the non-selection voltage. The video signal voltage has a value which is the remainder obtained by subtracting one-half the amplitude of the counter voltage from a voltage that is to be applied to the liquid crystal layer.

The counter voltage may be a DC voltage. By employing an AC voltage, however, it is possible to lower the maximum amplitude of the video signal voltage and, hence, to employ a video signal driver unit (signal side driver) having a decreased breakdown voltage.

[operation of storage capacitor Cstg]

The storage capacitor Cstg is provided in order to store video data written into a pixel (after the thin-film transistor TFT is turned off) for a extended period of time. According to the system in which the electric field is applied in parallel with the surface of the substrate employed by the present invention unlike the system in which the electric field is applied vertically to the surface of the substrate, there exists almost no capacitance (so-called liquid crystal capacitance)

that is created by the pixel electrode and the counter electrode. Namely, the liquid crystal capacitance is incapable of storing video data in the pixel. In the system in which the electric field is applied in parallel with the surface of the substrate, therefore, the storage capacitor Cstg is an essential constituent element.

When the thin-film transistor TFT undergoes the switching operation, furthermore, the storage capacitor Cstg serves to lower the effect of a change ΔVg in the gate potential upon the pixel electrode potential Vs. This is expressed by the following formula, $$\Delta Vs = \{Cgs/(Cgs+Cstg+Cpix)\} \times \Delta Vg$$

where Cgs is the parasitic capacitance formed between the gate electrode GT and the source electrode SD1 of the thin-film transistor, Cpix is the capacitance formed between the pixel electrode PX and the counter electrode CT, and ΔVs is the change in the pixel electrode potential caused by ΔVg, i.e., is the feedthrough voltage. This change ΔVs is a cause of the DC component applied to the liquid crystal LC, but can be decreased with an increase in the storage capacity Cstg. A decrease in the DC component applied to the liquid crystals LC leads to a long life of the liquid crystals LC and reduces the so-called printing image in which the preceding picture remains when the picture on the liquid crystal display screen is changed.

As described earlier, since the size of the gate electrode GT is increased so as to completely cover the i-type semiconductor layer AS, the area where the gate electrode GT and the source electrode SD1 overlap one upon the other is accordingly increased and, hence, the parasitic capacitance Cgs is increased, giving an adverse effect that the pixel electrode potential Vs is easily affected by the gate (scanning) signal Vg. However, the provision of the storage capacitor Cstg eliminates this demerit.

[Method of connecting counter voltage signal lines CL to common bus line CB]

Figure 27:
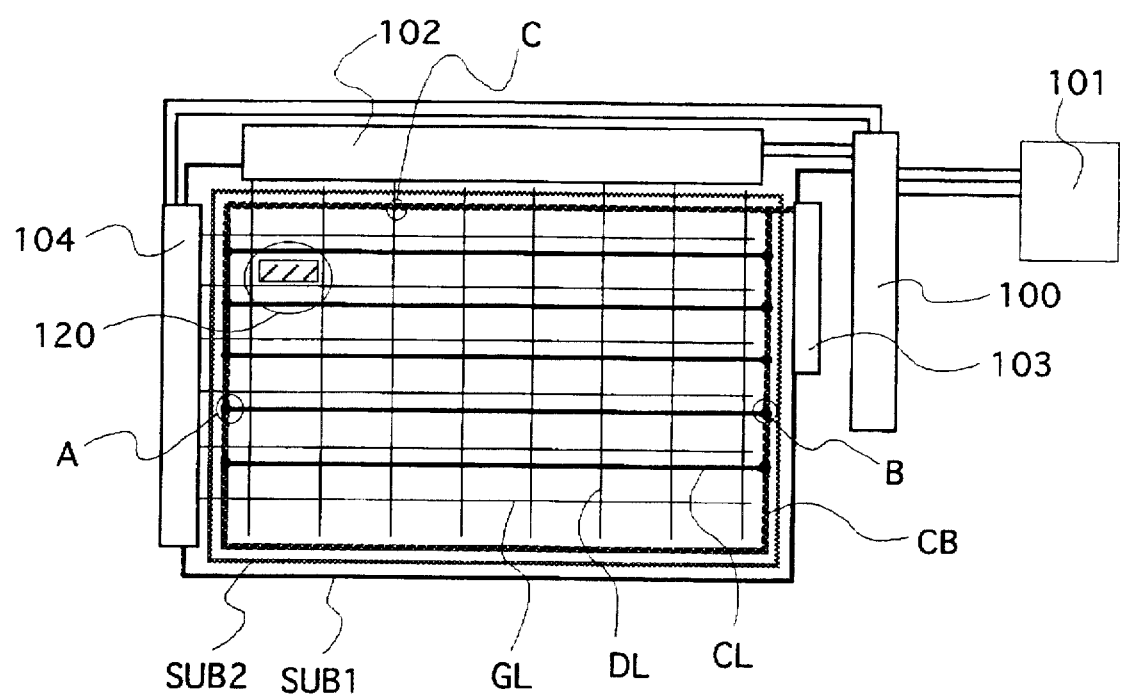
FIG. 27 is a block diagram schematically illustrating the constitution of the liquid crystal display device of embodiment 3.

FIG. 27 is a block diagram schematically illustrating the constitution of the liquid crystal display device of a third embodiment according to the present invention.

The liquid crystal display device of this embodiment is composed of a matrix substrate SUB1 in which the pixels 120 are arranged in the form of a matrix, a counter substrate SUB2, a timing controller 100, a drain driver unit 102, a gate driver unit 104, a common voltage generator and driver unit 103, and liquid crystals (not shown) sealed between the matrix substrate SUB1 and the counter substrate SUB2.

On the matrix substrate SUB1 are arranged the video signal lines DL for feeding a drive voltage necessary for driving the pixels 120 and the scanning signal lines GL. The video signal lines DL and the scanning signal lines GL are perpendicular to each other and surround the pixels 120, the video signal lines DL being connected to the drain driver unit 102 and the scanning signal lines GL being connected to the gate driver unit 104.

The counter voltage signal lines CL connected to the counter electrodes CT in the pixels 120 are arranged in parallel with the scanning signal lines GL. The counter voltage signal lines CL are further connected at their both ends to the common voltage generator and driver unit 103 via the common bus line CB.

The gate driver unit 104 and the drain driver unit 102 are connected to the timing controller 100. The timing controller 100 receives video signals and timing signals from the external host 101, and the drain driver unit 102 generates a drive voltage corresponding to the video signal and feeds it to the video signal lines DL in response to a timing signal.

The gate driver unit 104 receives timing signals fed from the timing controller 100, generates a gate drive voltage corresponding to the video signal, and feeds it to the scanning signal lines GL in response to a timing signal.

As a result, the drain voltage corresponding to the video signal is successively applied to the pixels 120 in the matrix substrate SUB1.

In this embodiment, the counter voltage signal lines CL are connected at their both ends to the common bus line CB. Here, the common bus line CB is formed on the non-display region of the matrix substrate and is allowed to have an increased width. Therefore, the resistance of the common bus line CB can be set to be smaller than the resistance of the counter voltage signal lines CL.

Figure 28:
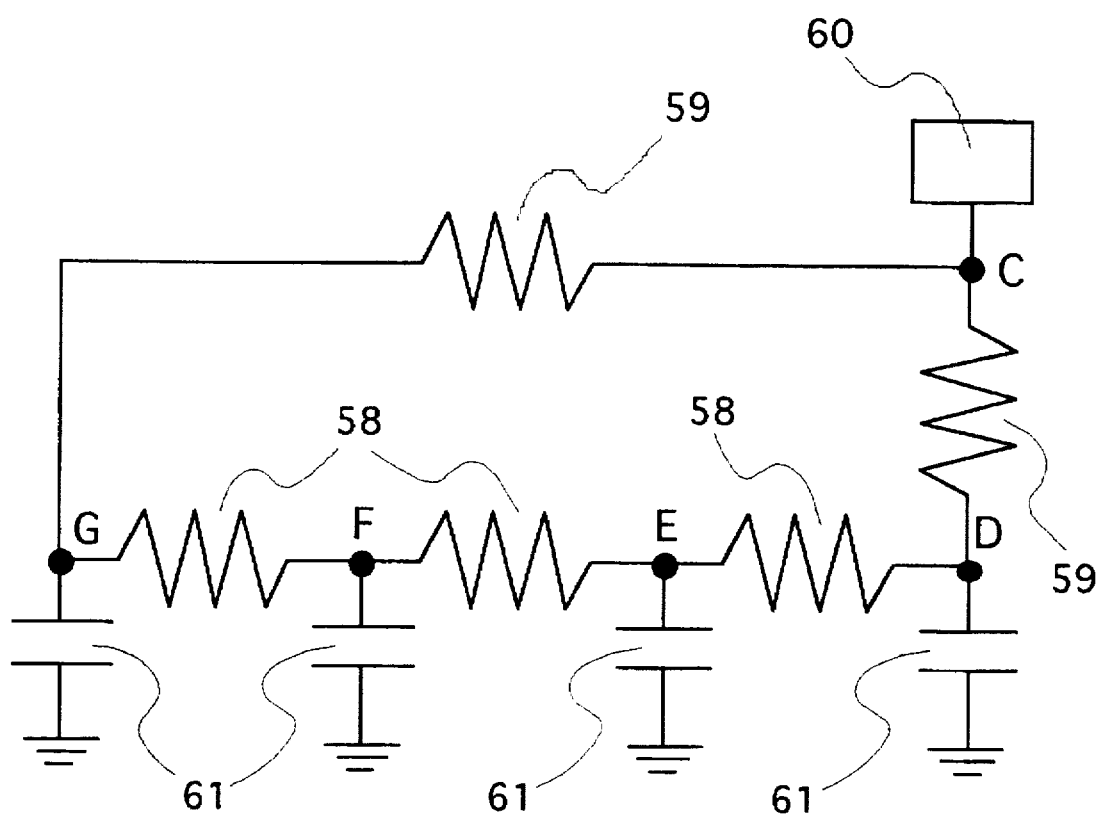
FIG. 28 is a diagram illustrating an equivalent circuit of a passage for transmitting a drive voltage to the counter electrodes CT in the liquid crystal display device of embodiment 3.
Figure 29:
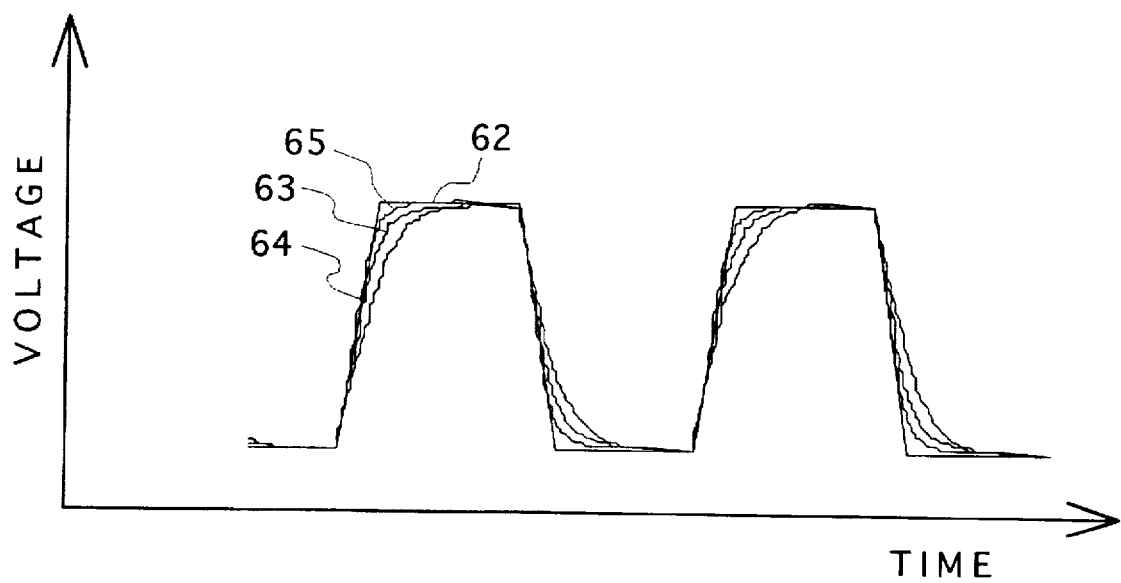
FIG. 29 is a diagram of characteristics illustrating waveforms of the drive voltage at each of the points shown in FIG. 28.

FIG. 28 is a diagram illustrating an equivalent circuit of a passage for transmitting the drive voltage applied to the counter electrodes CT in the liquid crystal display device of this embodiment, and FIG. 29 is a diagram showing waveforms of the drive voltage at the respective points of FIG. 28.

Since the resistance 59 of the common bus line CB is smaller than the resistance 58 of the counter voltage signal lines CL, the waveforms of the drive voltage fed from the common voltage driver unit 60 to the points D, E, F and G in FIG. 28 become a counter voltage 62 at point D, a counter voltage 63 at point E, a counter voltage 64 at point F and a counter voltage 65 at point G, respectively, as shown in FIG. 29.

As will be understood from FIG. 29, this embodiment makes it possible to reduce distortion in the waveform of the drive voltage fed to the counter electrodes CT from the common voltage driver unit 60 of the common voltage generator driver unit 103.

Therefore, the intensity of the electric field between the pixel electrode PX and the counter electrode CT becomes nearly uniform in the pixels 120, making it possible to decrease variation in the brightness along the counter voltage signal lines CL.

Even when the counter voltage signal line CL is broken at a portion, the drive voltage is supplied to the counter electrode CT from both ends of the counter voltage signal line CL, preventing the display quality from being impaired, unlike the prior art, when the drive voltage is no longer supplied to the counter electrode CT of the pixels 120 after the broken portion and when the liquid crystals are no longer driven.

FIG. 30A is a plan view illustrating the connection of the counter voltage signal line CL and the common bus line CB at point A on the matrix substrate of FIG. 27. FIG. 30B is a sectional view cut along the line I—I' in FIG. 30A, and FIG. 30C is a sectional view cut along the line H—H' in FIG. 30A.

At point A shown in FIG. 27, the scanning signal line GL and the counter voltage signal line CL are formed on the matrix substrate by using aluminum layer g1 and are anodically oxidized so as to form aluminum oxide AOF on the signal lines. By using a resist in this case, it is intended not to form aluminum oxide AOF at the ends of the counter voltage signal lines CL. Next, a gate oxide film GI is formed. At this moment, a contact hole CHL is formed in the ends of the counter voltage signal lines CL. Then, by using a chromium layer d1 and an aluminum layer d2, the video signal line DL and the common bus line CB are formed simultaneously. The common bus line CB is formed even on the ends of the counter voltage signal lines CL, and the common bus line CB and the counter voltage signal lines CL are electrically connected together through contact holes CHL at the ends of the counter voltage signal lines CL.

Finally, the protective film PSV is formed followed by a surface treatment.

Figure 31A:
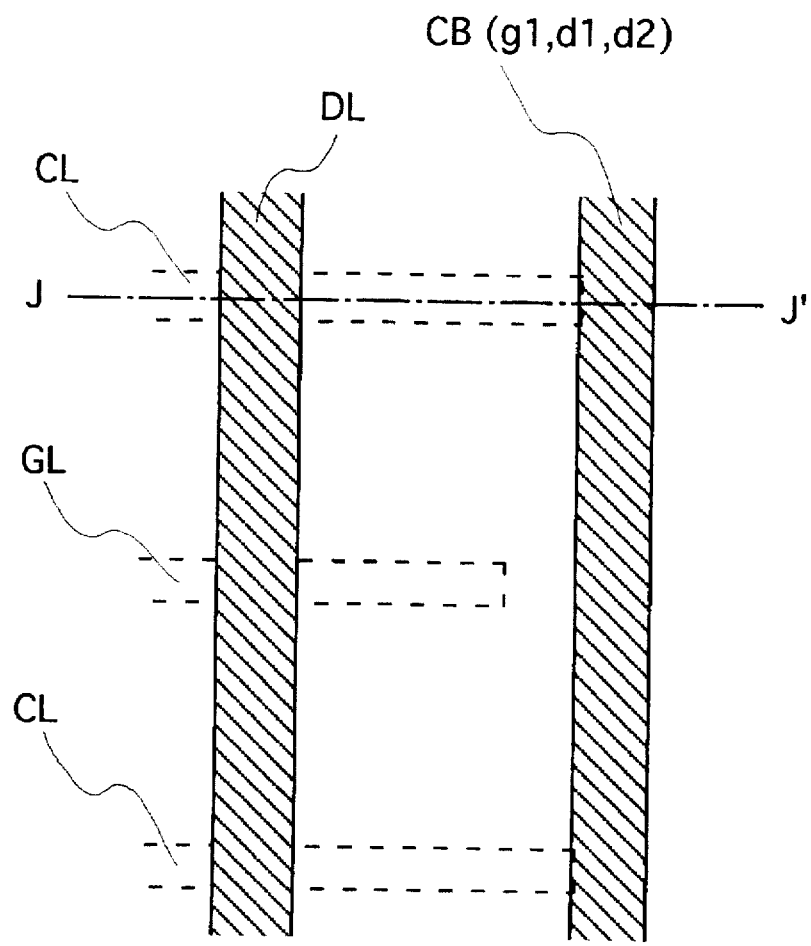
FIGS. 31A and 31B are a plan view and a sectional view illustrating the connection of the counter voltage signal line CL and the common bus line CB at point B on the matrix substrate of FIG. 27.
Figure 31B:
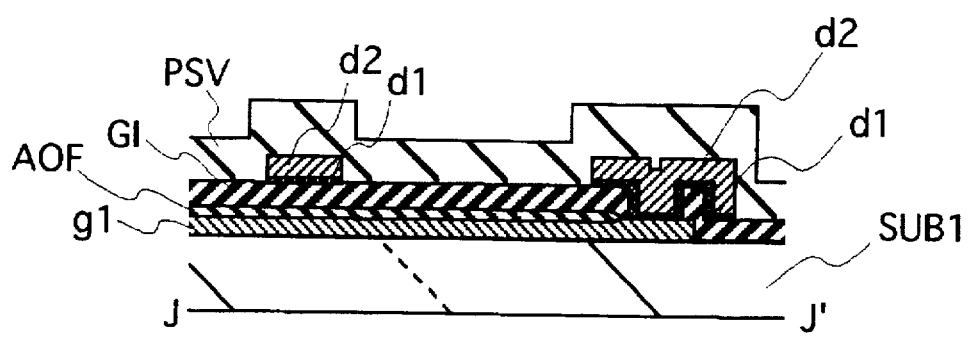

FIGS. 31A is a plan view illustrating the connection of the counter voltage signal lines CL and the common bus line CB at point B on the matrix substrate of FIG. 27, and FIG. 31B is a sectional view cut along the line J-J' of FIG. 31A.

The scanning signal lines GL, counter voltage signal lines CL and common bus line CB are simultaneously formed on the matrix substrate by using aluminum g1, and are anodically oxidized to form aluminum oxide AOF on the signal lines. Furthermore, a gate oxide film GI is formed thereon. By using a resist in this case, it is intended not to form aluminum oxide AOF and gate oxide film GI at the ends of the counter voltage signal lines CL and on the common bus line CB. Next, the video signal lines DL are formed by using two layers, i.e., chromium layer d1 and aluminum layer d2. At the same time, the chromium layer d1 and the aluminum layer d2 are formed even on the common bus line CB. Thus, the common bus line CB is constituted by the aluminum layer g1, chromium layer d1 and aluminum layer d2 and possesses a small resistance. Finally, the protective film PSV is formed followed by a surface treatment.

Figure 32A:
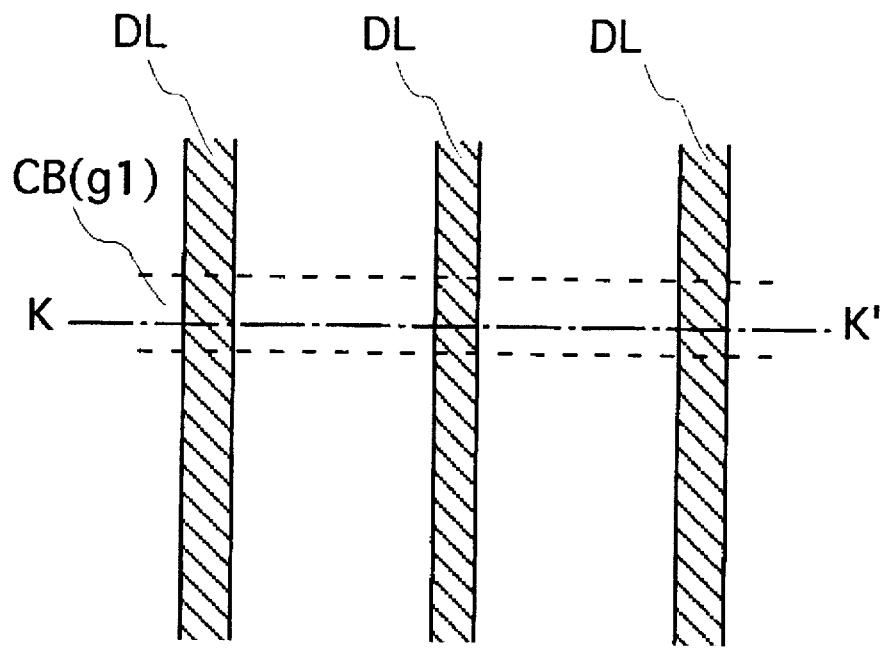
FIGS. 32A and 32B are a plan view and a sectional view illustrating the intersection of the video signal line DL and the common bus line CB at point C on the matrix substrate of FIG. 27.
Figure 32B:
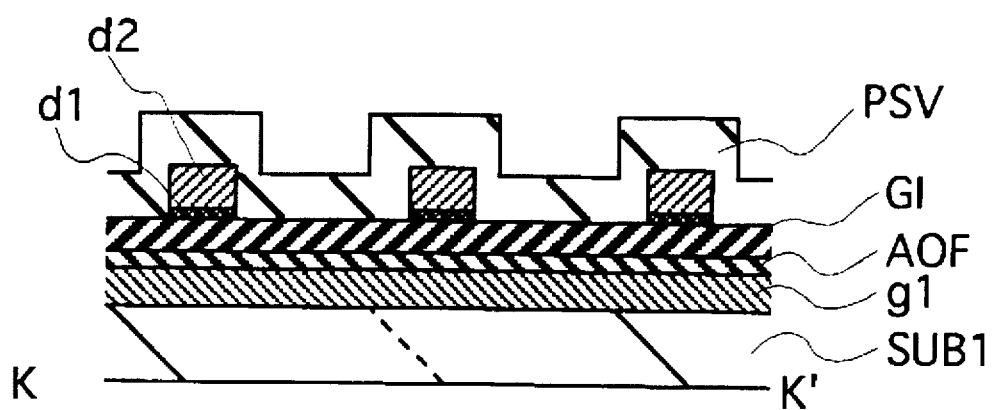

FIG. 32A is a plan view illustrating the intersection of the video signal lines DL and the common bus line CB at point C on the matrix substrate 8 of FIG. 27, and FIG. 32B is a sectional view cut along the line K—K' in FIG. 32A. The scanning signal lines GL and the counter voltage signal lines CL are formed on the matrix substrate by using aluminum layer g1, and are anodically oxidized to form aluminum oxide AOF on the signal lines.

Then, the gate oxide film GI is formed, and the video signal lines DL are formed by using two layers, i.e., chromium layer d1 and aluminum layer d2. Finally, the protective film PSV is formed followed by a surface treatment.

In FIGS. 30A to 30C, the connection portions (contact holes CHL) between the counter voltage signal lines CL and the common bus line CB are formed in the regions between the common bus line CB and the video signal lines DL. Not limited only thereto, however, the contact holes CHL may be formed in the regions on the side opposite to the video signal lines DL with respect to the common bus line CB as shown in FIGS. 33A to 33C.

Figure 33A:
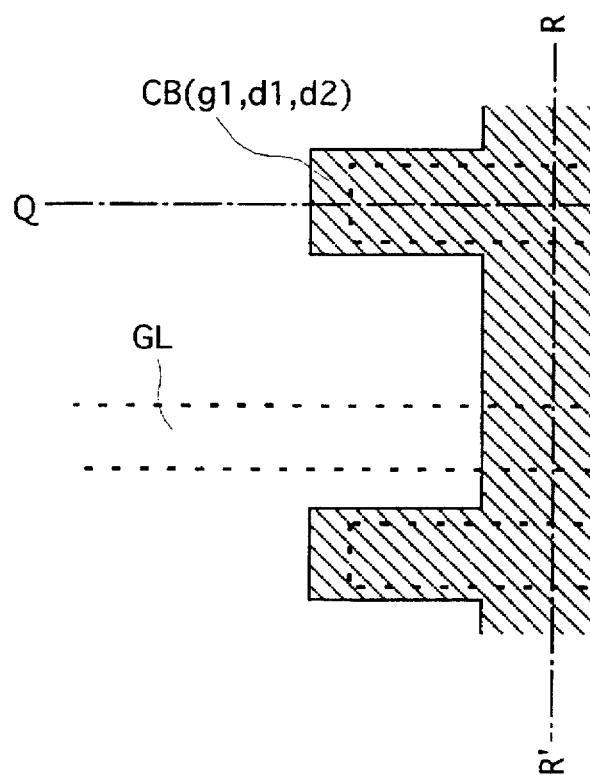
FIGS. 33A to 33C are a plan view and sectional views illustrating another example of connection of the counter voltage signal line CL and the common bus line CB at point A on the matrix substrate of FIG. 27.
Figure 33C:
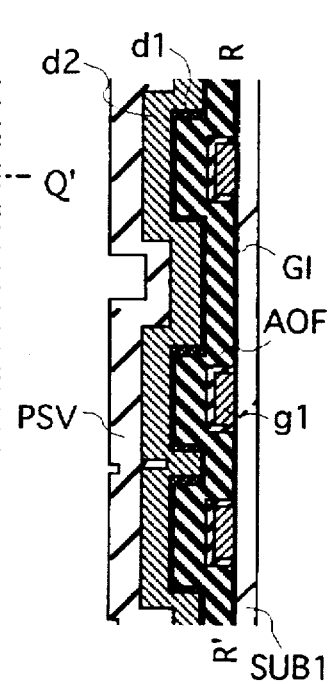
Figure 33B:
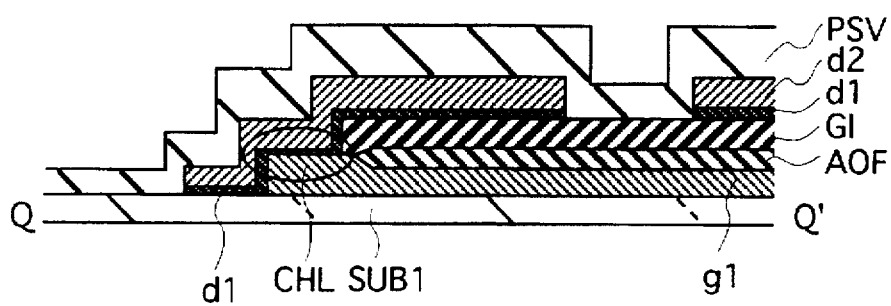

FIGS. 33A is a plan view of another example of connection of the counter voltage signal lines CL and the common bus line CB at point A on the matrix substrate of FIG. 27, FIG. 33B is a sectional view cut along the line Q-Q' in FIG. 33A, and FIG. 33C is a sectional view cut along the line R-R' in FIG. 33A.

At point A shown in FIG. 27, the scanning signal lines GL and the counter voltage signal lines CL are formed on the matrix substrate using the aluminum layer g1, and are anodically oxidized to form aluminum oxide AOF on the signal lines. By using a resist in this case, it is intended not to form the aluminum oxide AOF at the ends of the counter voltage signal lines CL. Next, the gate oxide film GI is formed. At this moment, contact holes CHL are formed in the ends of the counter voltage signal lines CL. Next, the video signal lines DL and the common bus line CB are simultaneously formed by using two layers, i.e., chromium layer d1 and aluminum layer d2.

The common bus line CB is formed even on the ends of the counter voltage signal lines CL, and the common bus line CB and the counter voltage signal lines CL are electrically connected together through the contact holes CHL formed in the ends of the counter voltage signal lines CL. Finally, the protective film PSV is formed followed by a surface treatment.

In the embodiment shown in FIGS. 33A to 33C, the aluminum oxide AOF is formed on the portions where the counter voltage signal lines CL intersect the common bus line CB.

In general, furthermore, the aluminum oxide AOF is formed even on the scanning signal lines GL and, hence, it is necessary to form a contact hole CHL even in the portions where the scanning signal lines GL are connected to the gate driver unit 104.

By using a resist, furthermore, it is intended not to form the aluminum oxide AOF on the portions where the contact holes CHL are to be formed.

In the embodiment shown in FIGS. 30A to 30C, in this case, it is necessary to precisely form the resist for forming contact holes CHL through which the counter voltage signal lines CL and the common bus line CB are connected together.

In the embodiment of FIG. 33, however, a resist is formed on the periphery on the matrix substrate on the side opposite to the video signal lines DL with respect to the common bus line CB, in order to form contact holes CHL for connecting the counter voltage signal lines CL to the common bus line CB and contact holes CHL for connecting the scanning signal lines GL to the gate driver unit 104. Besides, when the resist is directly drawn, the precision can be made loose.

As described above, the common bus line CB is formed along the edge of the panel using the same materials and through the same production steps as those of the scanning signal lines GL and the video signal lines DL. The common bus line CB is further connected to both ends of the counter voltage signal lines CL.

Figure 34:
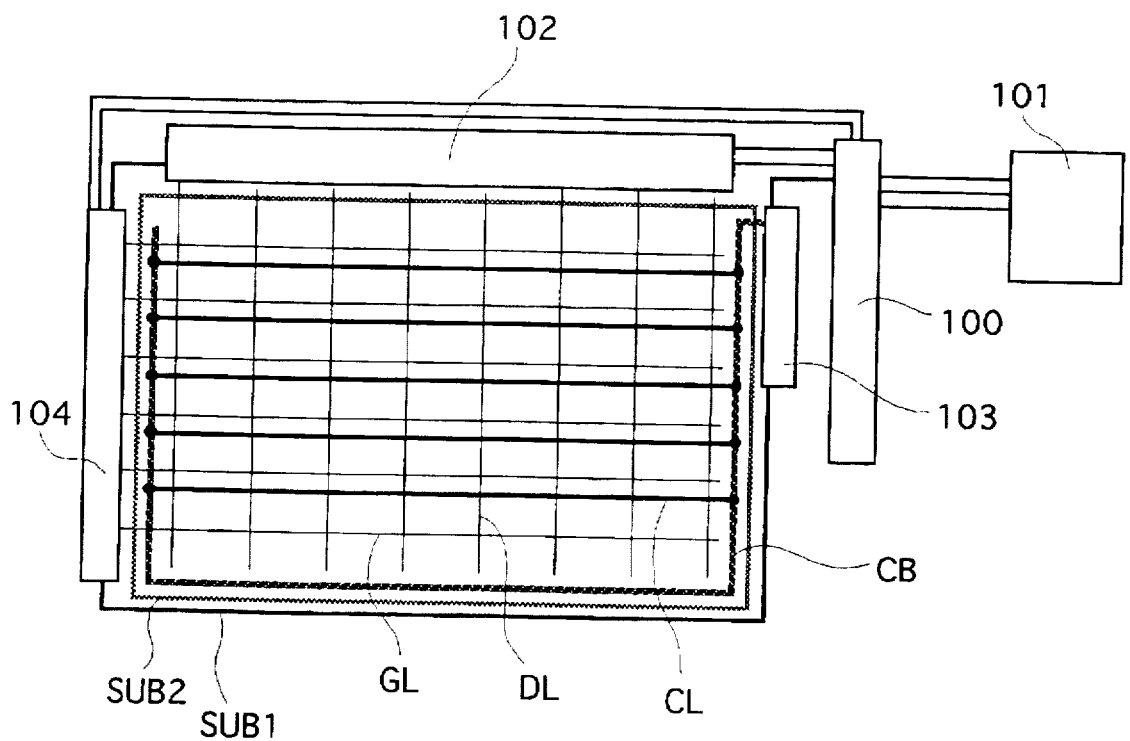
FIG. 34 is a plan view illustrating another arrangement of the common bus line CB of embodiment 3.

FIGS. 34 and 35 are diagrams illustrating further arrangements of the common bus line CB of the embodiment.

The common bus line CB need not be extended along all of the edges of the panel that is shown in FIG. 27. As shown in FIG. 34, the common bus line CB may be extended avoiding the region where the video signal lines DL are connected to the drain driver unit 102.

This makes it possible to decrease parasitic capacitance produced at portions where the video signal lines DL intersect the common bus line CB.

As shown in FIG. 35, furthermore, the common bus line CB may be divided into a plurality of common bus lines CBA, CBB which are extended from the panel and are connected together in the driver unit provided in the periphery. This makes it possible to decrease the length of the common bus line CB inside the panel.

[Thickness adjustment film AD]

A liquid crystal display device of a fourth embodiment which uses a thickness adjustment film AD as a constituent element will be described below.

Figure 36A:
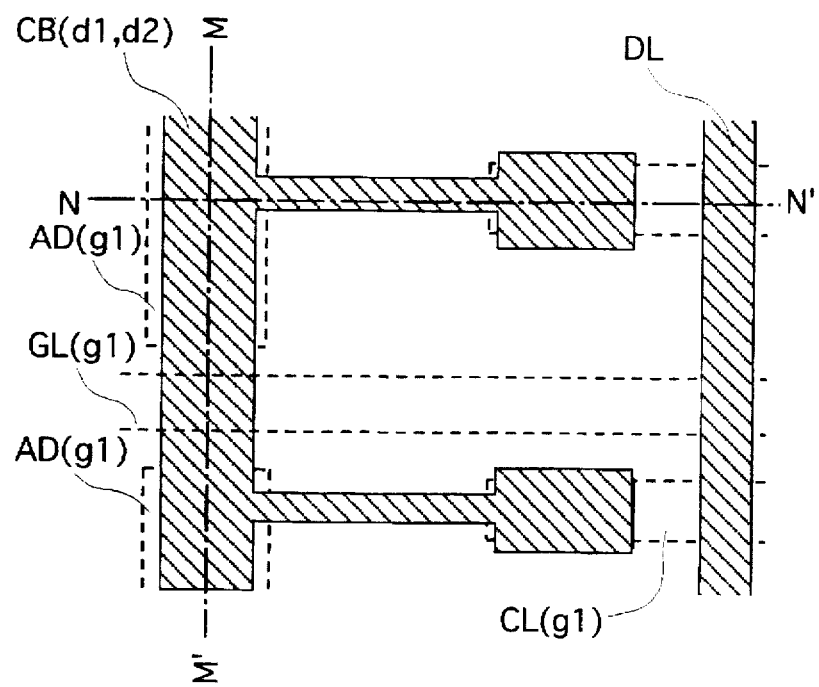
FIGS. 36A to 36C are a plan view and sectional views illustrating the connection of the counter voltage signal line CL and the common bus line CB at a point corresponding to point A on the matrix substrate of FIG. 27 in the liquid crystal display device of embodiment 4.
Figure 36C:
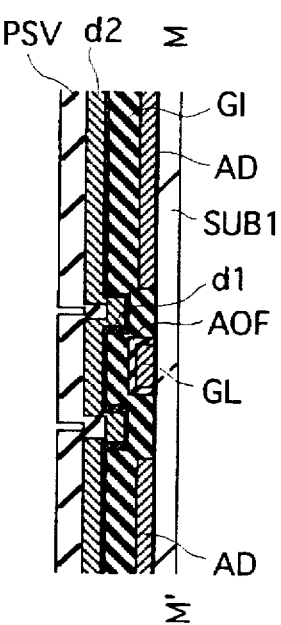
Figure 36B:
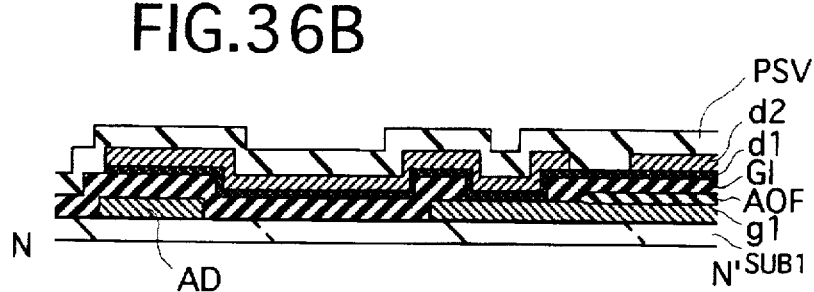

FIG. 36A is a plan view of a portion where the counter voltage signal line CL at a point corresponding to point A on the matrix substrate of FIG. 27 is connected to the common bus line CB in the liquid crystal display device of embodiment 3. FIG. 36B is a sectional view cut along the line M-M' in FIG. 36A, and FIG. 36C is a sectional view cut along the line N-N' in FIG. 36A.

At a point corresponding to point A of FIG. 27, as shown in FIG. 36A, the scanning signal lines GL and the counter voltage signal lines CL are formed on the matrix substrate using the aluminum layer g1 and, at the same time, a thickness adjustment film AD is formed. The thickness adjustment film AD is formed in the form of islands at least among the scanning signal lines GL, but are not electrically connected to the scanning signal lines GL. Then, by using the same material as that of the video signal lines DL, the common bus line CB is formed to pass at least over the thickness adjustment film AD.

Figure 37A:
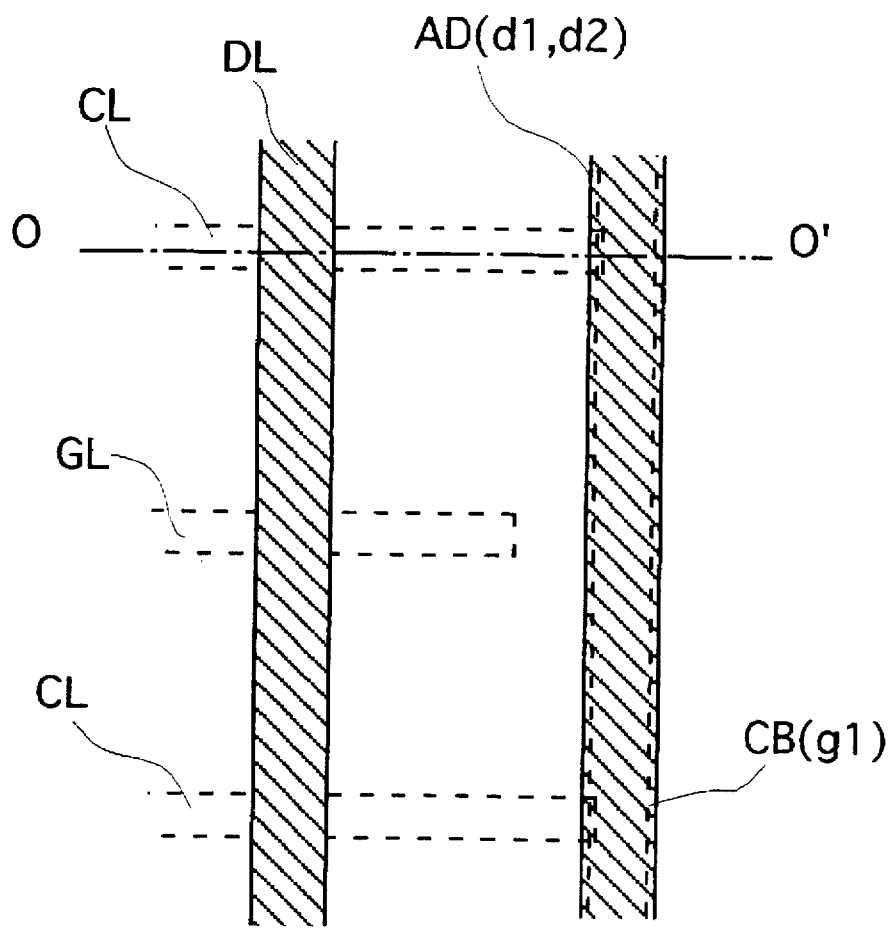
FIGS. 37A and 37B are a plan view and a sectional view illustrating the connection of the counter voltage signal line CL and the common bus line CB at a point corresponding to point B on the matrix substrate of FIG. 27 in the liquid crystal display device of embodiment 4.
Figure 37B:
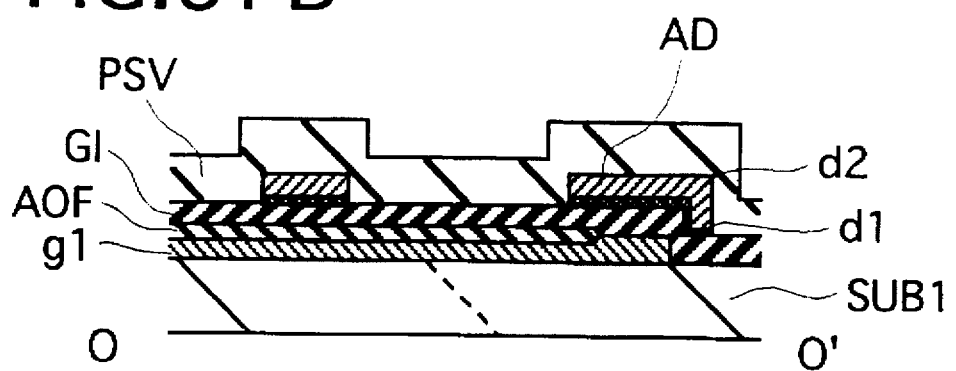

FIGS. 37A is a plan view illustrating the connection of the counter voltage signal lines CL and the common bus line CB at a point corresponding to point B on the matrix substrate of FIG. 27 in the liquid crystal display device of embodiment 4. FIG. 37B is a sectional view cut along the line O-O' in FIG. 37A. At a point corresponding to point B of FIG. 27, as shown in FIG. 37A, the scanning signal lines GL, counter voltage signal lines CL and common bus line CB are simultaneously formed on the matrix substrate by using the aluminum layer g1 and, then, the video signal lines DL and thickness adjustment film AD are formed via the gate oxide film AOF. The thickness adjustment film AD is formed on the common bus line CB.

Figure 38A:
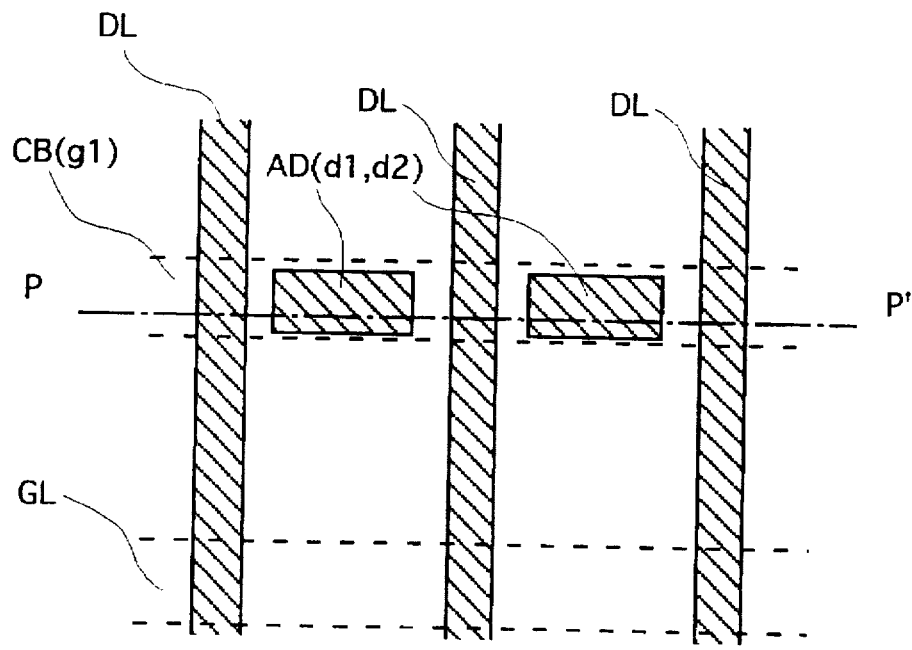
FIGS. 38A and 38B are a plan view and a sectional view illustrating the intersection of the video signal line DL and the common bus line CB at a point corresponding to point C of the matrix substrate of FIG. 27 in the liquid crystal display device of embodiment 4.
Figure 38B:
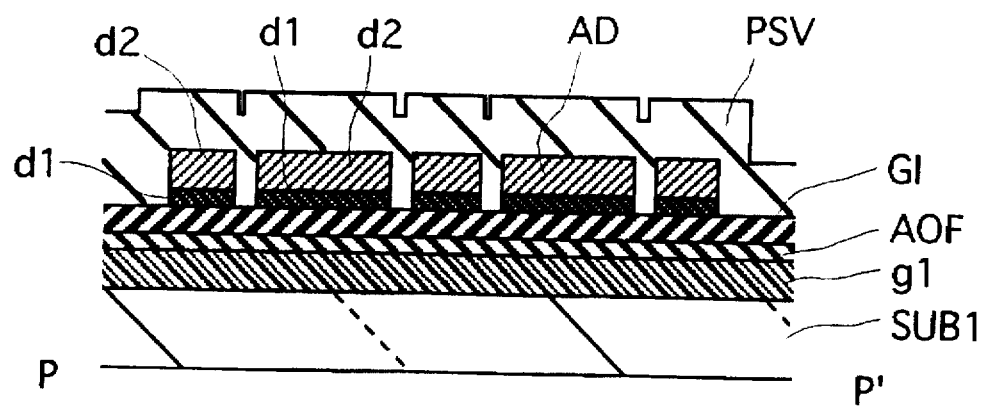

FIGS. 38A is a plan view illustrating the intersection of the video signal line DL and the common bus line CB at a point corresponding to point C of the matrix substrate of FIG. 27 in the liquid crystal display device of embodiment 4. FIG. 38B is a sectional view cut along the line P-P' in FIG. 38A. At a point corresponding to point C of FIG. 27, as shown in FIG. 38A, the scanning signal lines GL and counter voltage signal lines CL are formed on the matrix substrate by using the aluminum layer g1, and the video signal lines DL and thickness adjustment film AD are formed on the gate oxide film GI.

The thickness adjustment film AD is formed in the form of islands at least among the video signal lines DL but are not electrically connected to the video signal lines DL. The thickness adjustment film AD is also formed on the common bus line CB. With the thickness adjustment film AD inserted, the portion where the common bus line CB is formed possesses the same sectional structure and the same thickness. This makes it possible to uniformalize the thickness of the common bus line CB formed along the edge of the substrate, to decrease variation in the thickness of the edges of the substrate, to maintain constant the gap length between the two substrates and, hence, to decrease variation in the gap length of the liquid crystal display device.

Figure 39:
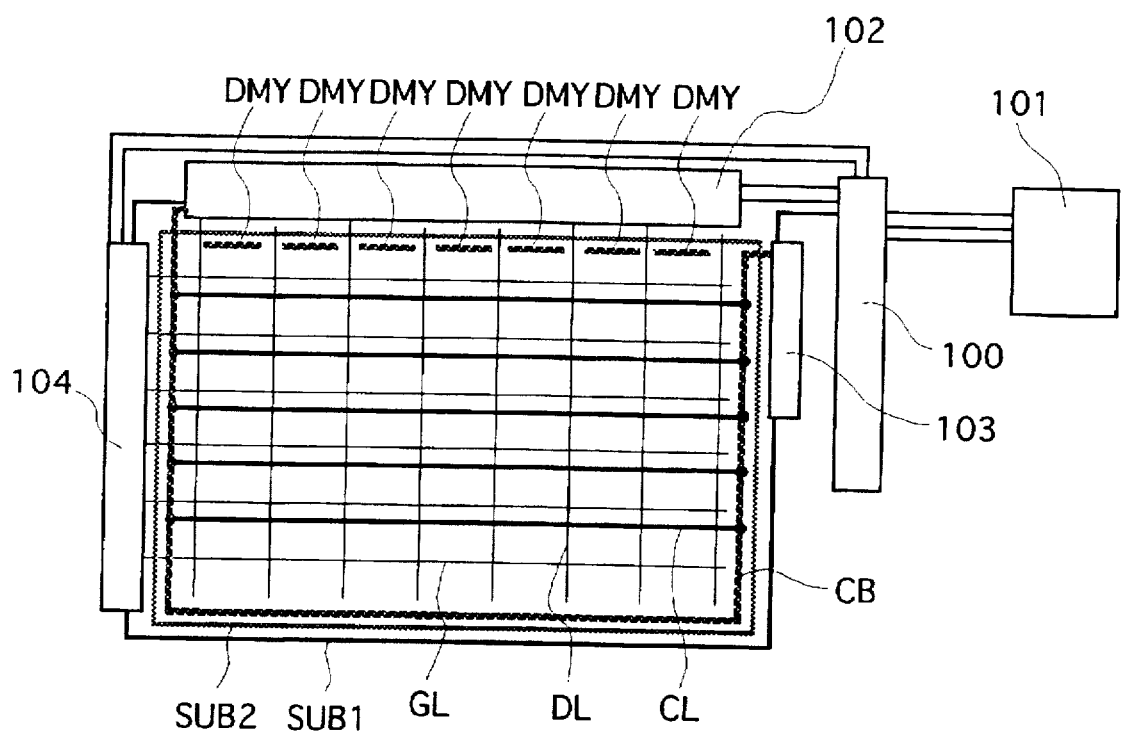
FIG. 39 is a plan view illustrating another arrangement of the common bus line CB of embodiment 4.

FIG. 39 is a diagram illustrating another arrangement of the common bus of embodiment 4.

In forming the common bus line CB along the edges of the panel, dummy signal lines DMY may be formed using the same material and maintaining the same thickness as those of the common bus line CB in the regions where no common bus line CB is arranged, as shown in FIG. 39, in order to decrease variation in the thickness along the edges of the panel.

[Display panel PNL and drive circuit substrate PCB1]

Figure 21:
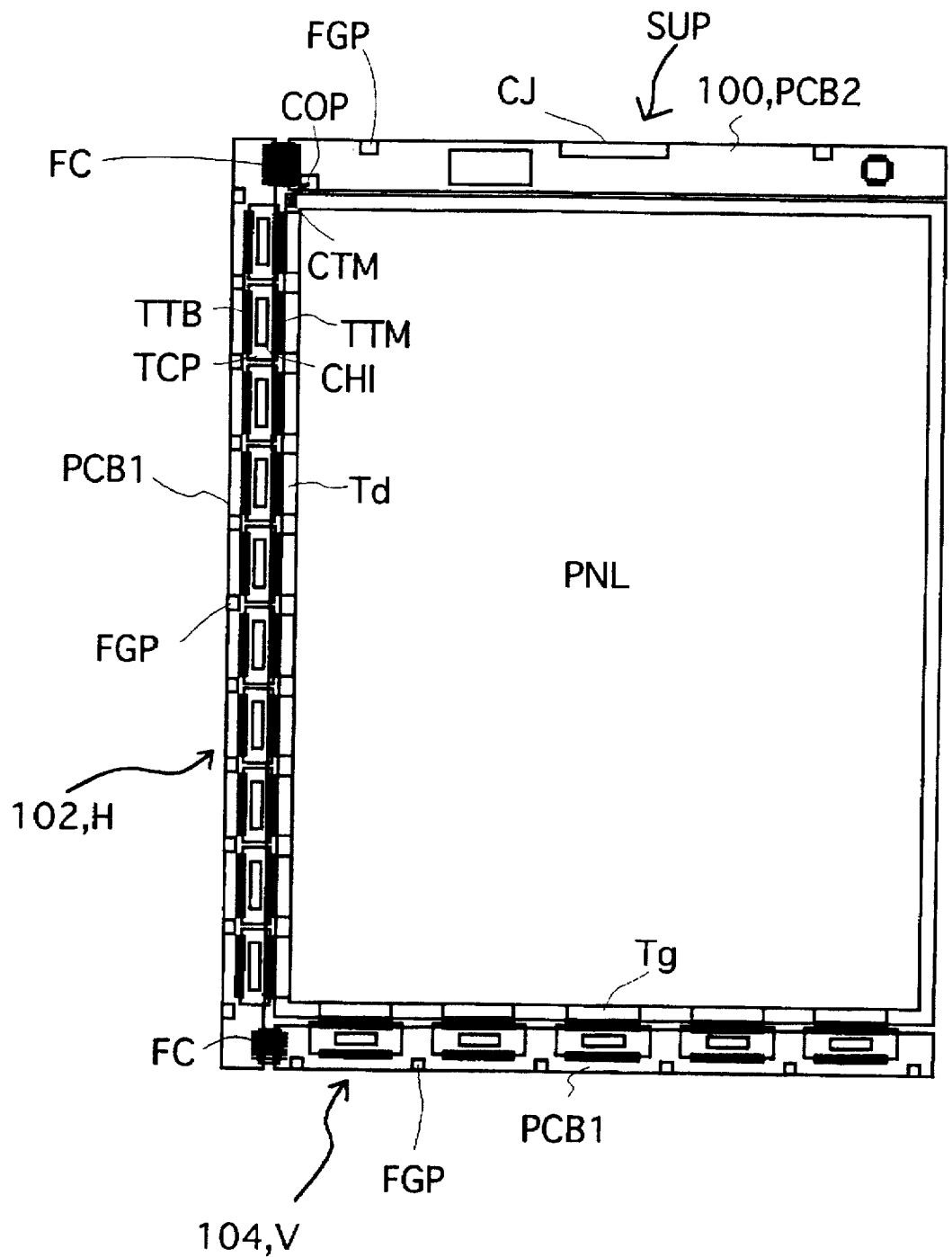
FIG. 21 is a top view illustrating the state where the peripheral driver units are mounted on a liquid crystal display panel.

FIG. 21 is a top view illustrating a state where a video signal (drain) driver unit H and a vertical scanning (gate driver) unit V are connected to the display panel PNL shown in FIG. 10.

Symbol CHI denotes driver IC chips (the lower five are driver IC chips on the side of the vertical scanning circuit, and the left ten are driver IC chips on the side of the video signal driver circuit) for driving the display panel PNL. Symbol TCP denotes tape carrier packages in which driver IC chips are mounted by a tape-automated-bonding method (TAB), and PCB1 denotes a driver circuit substrate on which TCPs and capacitors are mounted, which is divided into two for the video signal driver unit and the scanning signal driver unit. Symbol FGP denotes a frame ground pad to which are soldered spring-like pieces formed by cutting a shielding case SHD, and FC denotes a flat cable for electrically connecting the lower driver circuit substrate PCB1 and the left driver circuit substrate PCB1 together. The flat cable FC has, as shown, a plurality of lead wires (phosphor-bronze wires plated with tin) that are supported and sandwiched by a polyethylene layer and a polyvinyl alcohol layer of a striped shape.

[Structure for connecting TCP]

Figure 22:
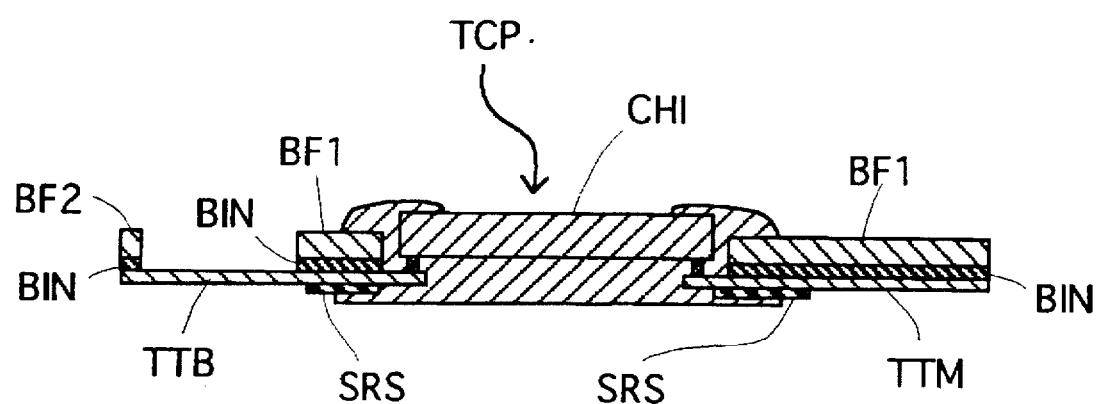
FIG. 22 is a diagram illustrating, in cross section, the structure of a tape carrier package TCP in which an integrated circuit chip CHI constituting the driver unit is mounted on a flexible wiring substrate.
Figure 23:
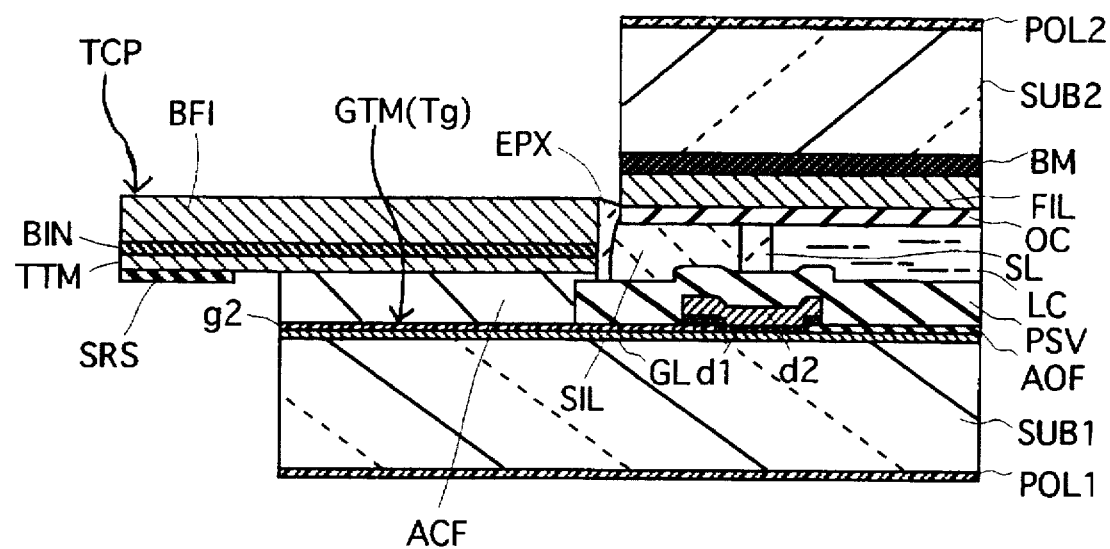
FIG. 23 is a sectional view illustrating essential portions in a state where the tape carrier package TCP is connected to a terminal GTM for a gate signal circuit in the liquid crystal display panel PNL.

FIG. 22 is a diagram illustrating, in cross section, the structure of a tape carrier package TCP in which an integrated circuit chip CHI is mounted on a flexible wiring substrate to constitute the scanning signal driver unit V and the video signal driver unit H, and FIG. 23 is a sectional view illustrating essential portions in a state where the tape carrier package TCP is connected to a terminal GTM for a signal circuit in the liquid crystal display panel PNL.

In the drawing, symbol TTB denotes an input terminal/wiring unit of the integrated circuit CHI, and TTM denotes an output terminal/wiring unit of the integrated circuit CHI, which are made of, for example, copper. To their ends (usually called inner leads) on the inside are connected bonding pads PAD of the integrated circuit CHI by a so-called facedown bonding method. The ends (usually called outer leads) on the outer sides of the terminals TTB and TTM correspond to the inputs and outputs of the semiconductor integrated circuit chip CHI, and are connected by soldering to a CRT/TFT converter circuit/power source circuit SUP, and are further connected by anisotropic conductive film ACF to the liquid crystal display panel PNL. The package TCP is connected to the panel in a manner that the ends thereof covers the protective film PSV through which are exposed the connection terminals GTM on the side of the panel PNL. Therefore, the external connection terminals GTM(DTM) are covered by either the protective film PVS1 or the package TCP, and are strong against electrolytic corrosion.

Symbol BF1 denotes a base film made of polyimide or the like, and SRS denotes a solder resist film for masking so that the solder may not be applied to undesired portions during the soldering. The gap between the upper and lower glass substrates on the outer side of the sealing pattern SL is protected, after washing, by an epoxy resin EPX and the like. The gap between the package TCP and the upper substrate SUB2 is filled with a silicone resin SIL to provide multiple protection.

[Driver unit substrate PCB2]

On the driver unit substrate PCB2 are mounted electronic parts such as ICs, capacitors and resistors. On the driver unit substrate PCB2 are mounted a circuit SUP inclusive of a power source circuit for producing a plurality of stable voltages by dividing a voltage from a voltage source and a circuit that converts the data for CRT (cathode-ray tube) from the host (higher arithmetic unit) into the data for the TFT liquid crystal display device. Symbol CJ denotes a connector connection unit, to which is connected a connector that is connected to an external unit but that is not shown.

The driver unit substrate PCB1 is connected to the driver unit board PCB2 through the flat cable FC.

[Whole constitution of the liquid crystal display module]

Figure 24:
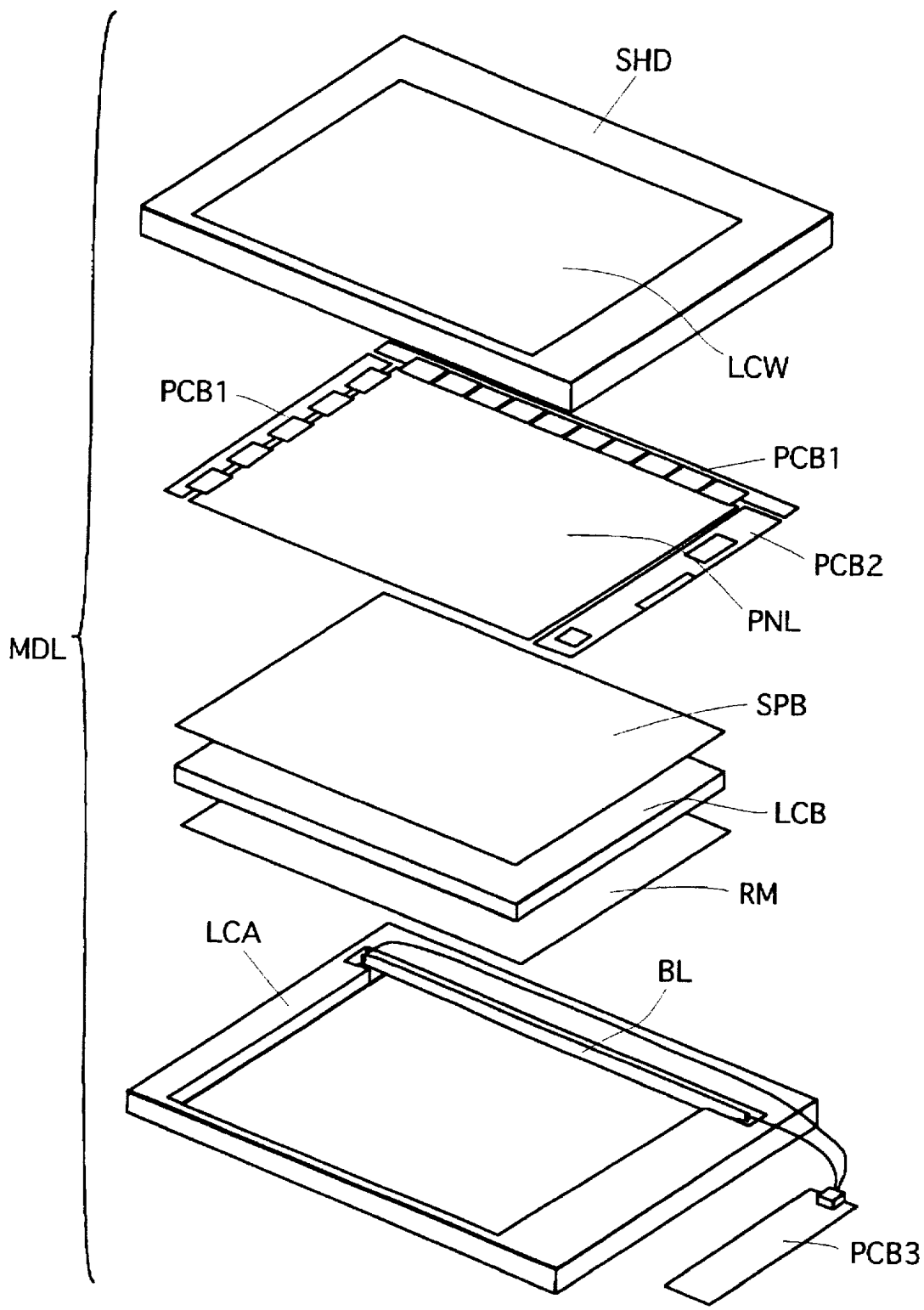
FIG. 24 is an exploded perspective view illustrating a liquid crystal display module.
Figure 25:
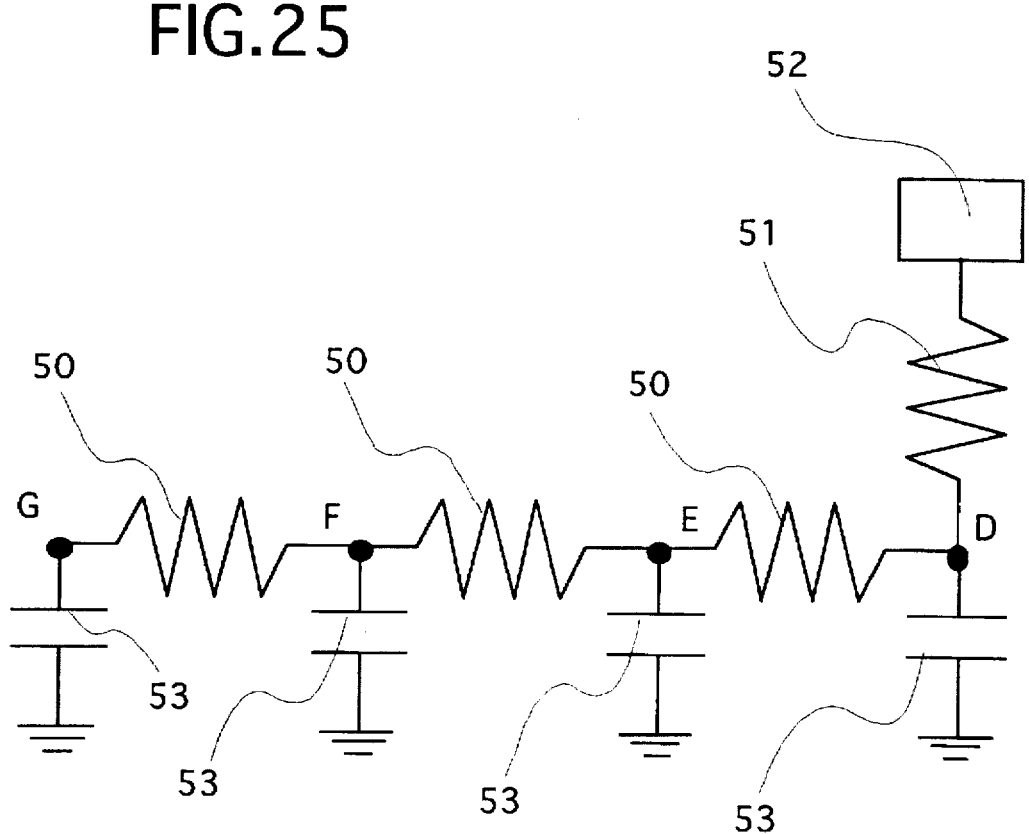
FIG. 25 is a diagram illustrating an equivalent circuit of a passage for transmitting a drive voltage to the counter electrodes CT in the liquid crystal display device of FIG. 19.
Figure 26:
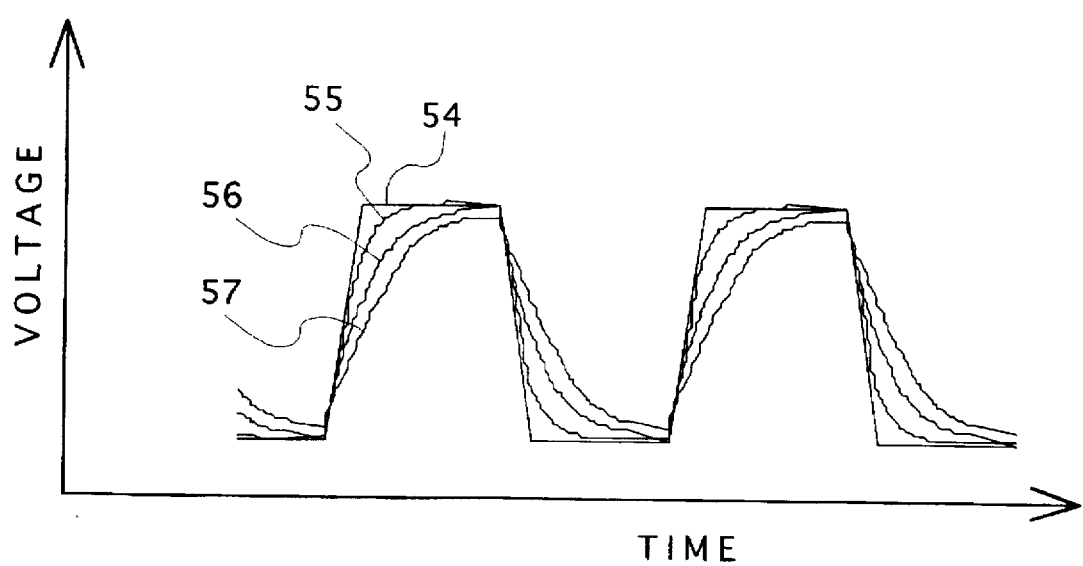
FIG. 26 is a diagram of characteristics illustrating waveforms of the drive voltage at each of the points shown in FIG. 25.

FIG. 24 is an exploded perspective view illustrating the constituent parts of the liquid crystal display module MDL.

Symbol SHD denotes a frame-like shielding case (metal frame) made of a metal plate, LCW denotes a display window thereof, PNL denotes the liquid crystal display panel, SPB denotes a light diffusion plate, LCB denotes a light conductor, RM denotes a reflector plate, BL denotes a backlight fluorescent tube, and LCA denotes a backlight case, which are stacked vertically as shown to assemble a module MDL.

The whole module MDL is secured by pawls and hooks provided in the shielding case SHD.

The backlight case LCA contains the backlight fluorescent tube BL, light diffusion plate SPB, light conductor LCB and reflector plate RM. Light emitted from the backlight fluorescent tube BL disposed on one side of the light conductor LCB is rendered backlight which is uniform on the display surface through the light conductor LCB, reflector plate RM and light diffusion plate SPB, and is emitted to the side of the liquid crystal display panel PNL.

To the backlight fluorescent tube BL is connected an inverter circuit substrate PCB3 which is a power source for the backlight fluorescent tube BL.

As will be obvious from the foregoing description, the following representative effects are obtained from the liquid crystal display device of the present invention.

(1) Rise in the drive voltage is suppressed, and so-called crosstalk (smear) decreases. There is therefore provided a liquid crystal display device which offers a wide angle of view like that of cathode-ray tubes, operates on a low voltage, consumes a decreased amount of electric power, and maintains a good picture quality.

(2) The width of wiring is broadened without decreasing the opening areas of the pixels that contribute to the display, the resistance of the wiring is decreased to improve the picture quality, and the driver unit consumes a decreased amount of electric power.

Besides, the number of places or the areas where the wirings intersect is decreased, the probability of short-circuiting among the wirings is decreased, and the parasitic capacitances are decreased among the wirings, making it possible to improve the quality of picture and to decrease the consumption of electric power by the driver unit.

By utilizing the effect of using the drain electrode. SD2 in common, furthermore, it is possible to increase the number of thin-film transistors in a pixel without increasing the areas where the wirings intersect. By providing a plurality of thin-film transistors for a plurality of pixel electrodes PX, furthermore, it is possible to obtain normal display even when a pixel electrode PX is disconnected at a portion. Even when one of the thin-film transistors is defective, normal display is obtained by cutting out the defective thin-film transistor.

(3) Both ends of the counter voltage signal lines CL are connected to the common bus line CB, and the resistance of the common bus line CB is set to be smaller than the resistance of the counter voltage signal lines CL. It is therefore made possible to decrease distortion in the waveform of the voltage for driving the counter electrodes CT fed from the common voltage driver unit 52, to nearly uniformalize the electric field intensity between the pixel electrode and the counter electrode CT in the pixels in the panel, and to decrease variation in the brightness that occurs along the counter voltage signal lines CL. With both ends of the counter voltage signal lines CL connected to the common bus line CB, furthermore, the common voltage can be supplied to both ends of the counter voltage signal lines CL and liquid crystals in the pixels can be driven even in case any counter voltage signal line CL is broken disconnected at a portion. Unlike the prior art, therefore, it does not happen that liquid crystals in the pixels after the disconnected portion are not driven, and the quality of display is not impaired.

(4) The region where the common bus line CB is arranged has a cross-sectional structure which is the same as the cross-sectional structure of the portions where the common bus line CB intersects the scanning signal lines GL or the video signal lines DL. It is therefore made possible to decrease variation in the thickness of the edges of the substrate where the common bus line CB is formed and, hence, to make constant the gap length between the two pieces of substrates to decrease variation in the gap of the liquid crystal display device.

Though the present invention has been concretely described above by way of embodiments, it should be noted that the invention is in no way limited to the above embodiments only but can be modified in a variety of ways without departing from the spirit and scope of the invention. In the above-mentioned embodiments, for instance, amorphous silicon thin-film transistors TFT are used as active elements. It is, however, also allowable to use polysilicon thin-film transistors, MOS transistors on a silicon wafer, or two-terminal elements such as MIM (metal-intrinsic-metal) diodes. The invention can be further adapted even to a liquid crystal display device of the reflection type constituted by a pair of substrates at least one of which is transparent, a reflection means and a polarizing means.

We claim:

1. A liquid crystal display device having a plurality of pixels arranged in the form of a matrix and means for applying voltage signals to change the light transmission factor or light reflection factor of said pixels, said liquid crystal display device comprising:

a liquid crystal layer made of twistable liquid crystal molecules;

a first substrate and a second substrate sandwiching said liquid crystal layer therebetween, at least one of which is transparent;

at least one polarizing means; and at least a pair of a pixel electrode and a counter electrode formed in each of said pixels between said first substrate and said liquid crystal layer in order to control the twisting amounts of liquid crystal molecules of said liquid crystal layer by use of an electric field which is established between said pixel electrode and said counter electrode and has a component in parallel with said first substrate;

wherein the effective thickness deff of said liquid crystal layer, the width Wp of said pixel electrode in a predetermined direction, the width Wc of said counter electrode in predetermined direction, and the gap L between said pixel electrode and said counter electrode satisfy the following relationships, $$1.2 \times \text{deff}, \ Wp \leq L/1.2, \ \text{and} \ 1.2 \times \text{deff} \leq Wc \leq L/1.2$$

2. A liquid crystal display device according to claim 1, wherein the effective thickness deff of said liquid crystal layer further satisfies the relationship of $2.8 \ \mu m \leq \text{deff} \leq 4.5 \ \mu m$.

3. A liquid crystal display device according to claim 1, wherein the effective thickness deff of said liquid crystal layer further satisfies the relationship of $4.2 \ \mu m \leq \text{deff} \leq 8.0 \ \mu m$.

4. A liquid crystal display device according to one of claims 1, 2 and 3, wherein said liquid crystal layer has a dielectric constant anisotropy $\Delta \epsilon$.

5. A liquid crystal display device according to claim 4, wherein said predetermined direction is a short-side direction.

6. A liquid crystal display device according to claim 5, wherein $\Delta \epsilon \leq 0$.

7. A liquid crystal display device having a plurality of pixels arranged in the form of a matrix and means for applying voltage signals to change the light transmission factor or light reflection factor of said pixels, said liquid crystal display device comprising:

- a liquid crystal layer made of twistable liquid crystal molecules;
- a first substrate and a second substrate sandwiching said liquid crystal layer therebetween, at least one of which is transparent;
- at least one polarizing means; and
- at least a pair of a pixel electrode and a counter electrode formed in each of said pixels between said first substrate and said liquid crystal layer in order to control the twisting amounts of liquid crystal molecules of said liquid crystal layer by use of an electric field which is established between said pixel electrode and said counter electrode and has a component in parallel with said first substrate;
- wherein the dielectric constant anisotropy $\Delta\epsilon$ of said liquid crystal layer, the effective thickness deff of said liquid crystal layer, the width Wp of said pixel electrode in the short-side direction, the width Wc of said counter electrode in the short-side direction, and the gap L between said pixel electrode and said counter electrode satisfy the following relationships, $$\Delta\epsilon<0, 4.2\ \mu m \leq deff \leq 8.0\ \mu m,$$

$$1.2\times deff \leq Wp \leq L/1.2,\ and\ 1.2\times deff \leq Wc \leq L/1.2$$

8. A liquid crystal display device having a plurality of pixels arranged in the form of a matrix and means for applying voltage signals to change the light transmission factor or light reflection factor of said pixels, said liquid crystal display device comprising:

- a liquid crystal layer made of twistable liquid crystal molecules;
- a first substrate and a second substrate sandwiching said liquid crystal layer therebetween, at least one of which is transparent;
- at least one polarizing means;
- at least a pair of a pixel electrode and a counter electrode formed in each said pixels between said first substrate and said liquid crystal layer in order in control the twisting amounts of liquid crystal molecules of said liquid crystal layer by use of an electric field which is established between said pixel electrode and said counter electrode and has a component in parallel with said first substrate;
- a black matrix formed between said second substrate and said liquid crystal layer, wherein said black matrix is made of an insulating material; and
- wherein the effective thickness deff of said liquid crystal layer, the width Wp of said pixel electrode in a predetermined direction, the width Wc of said counter electrode in the predetermined direction, and the gap L between said pixel electrode and said counter electrode satisfying the following relationship, $$1.2\times deff \leq Wp \leq L/1.2,\ and\ 1.2\times deff \leq Wc \leq L/1.2$$

* * * * *